(12) United States Patent
Yoakim et al.

(10) Patent No.: US 8,431,175 B2
(45) Date of Patent: Apr. 30, 2013

(54) METHOD FOR PREPARING A BEVERAGE OR FOOD LIQUID AND SYSTEM USING BREWING CENTRIFUGAL FORCE

(75) Inventors: Alfred Yoakim, St. Legier la Chiesaz (CH); Jean-Paul Denisart, La Conversion (CH); Antoine Ryser, Lausanne (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 147 days.

(21) Appl. No.: 12/776,155

(22) Filed: May 7, 2010

(65) Prior Publication Data

US 2010/0239734 A1 Sep. 23, 2010

Related U.S. Application Data

(63) Continuation-in-part of application No. 12/602,542, filed on Dec. 1, 2009, and a continuation-in-part of application No. 12/602,553, filed on Dec. 1, 2009, and a continuation-in-part of application No. 12/602,562, filed on Dec. 1, 2009, and a continuation-in-part of application No. 12/602,568, filed on Dec. 1, 2009, now Pat. No. 8,409,646, and a continuation-in-part of application No. 12/602,577, filed on Dec. 1, 2009, and a continuation-in-part of application No. 12/602,730, filed on Dec. 2, 2009.

(30) Foreign Application Priority Data

| | | | |
|---|---|---|---|
| Jun. 5, 2007 | (EP) | ................................... | 07109579 |
| Jun. 5, 2007 | (EP) | ................................... | 07109580 |
| Feb. 29, 2008 | (EP) | ................................... | 08102147 |
| Feb. 29, 2008 | (EP) | ................................... | 08102148 |
| Feb. 29, 2008 | (EP) | ................................... | 08102149 |
| Aug. 28, 2009 | (EP) | ................................... | 09168885 |
| Apr. 19, 2010 | (EP) | ................................... | 10160249 |

(51) Int. Cl.
*A23F 5/00* (2006.01)

(52) U.S. Cl.
USPC ............. 426/433; 426/432; 426/431; 99/295; 99/302 C

(58) Field of Classification Search .............. 426/77–80, 426/431–433; 99/302 C, 295, 323, 279–280; 422/270
See application file for complete search history.

(56) References Cited

U.S. PATENT DOCUMENTS 239,659 A 4/1881 Houston
(Continued)

FOREIGN PATENT DOCUMENTS

AT 197553 B 5/1958
(Continued)

OTHER PUBLICATIONS

BE 894031 Machine Translation: Accessed from EPO Jul. 10, 2012.*
(Continued)

*Primary Examiner* — Drew Becker
*Assistant Examiner* — Luana Z Long
(74) *Attorney, Agent, or Firm* — Winston & Strawn LLP

(57) ABSTRACT

A capsule, device, system and method for preparing a liquid food or beverage. The capsule comprises an enclosure containing one or more extractable or infusible ingredients and configured and dimensioned to have a perimeter and be radially symmetrical about a central axis to facilitate rotation; and an opening arrangement that allows liquid food to leave the capsule after passing through the ingredient(s), wherein the opening arrangement is configured and positioned near or upon the perimeter of the enclosure to allow the liquid food to leave the capsule radially due to the application of the centrifugal forces. The method and device introduce liquid into the capsule to form the liquid food while applying centrifugal forces to the capsule to urge the liquid to pass through the ingredient(s).

24 Claims, 34 Drawing Sheets

U.S. PATENT DOCUMENTS

| | | | | |
|---|---|---|---|---|
| 1,963,476 | A | * | 6/1934 | Smith ............................ 210/377 |
| 2,778,739 | A | * | 1/1957 | Rodth ............................. 426/77 |
| 3,025,781 | A | | 3/1962 | Bossi |
| 3,233,535 | A | | 2/1966 | Fowlie |
| 3,566,770 | A | | 3/1971 | Crossley ........................ 99/289 |
| 3,654,852 | A | | 4/1972 | Rosan, Sr. |
| 3,812,773 | A | | 5/1974 | Hultsch ........................... 99/290 |
| 3,822,013 | A | | 7/1974 | Van Der Veken ............ 206/233 |
| 3,967,546 | A | | 7/1976 | Cailliot .......................... 99/286 |
| 3,985,069 | A | | 10/1976 | Cavalluzzi ..................... 99/295 |
| 4,426,919 | A | | 1/1984 | Rhoten .......................... 99/289 |
| 4,464,982 | A | | 8/1984 | Leuschner et al. ............. 99/287 |
| 4,473,002 | A | | 9/1984 | Leuschner et al. ............. 99/302 |
| 4,545,296 | A | | 10/1985 | Ben-Shmuel ................ 99/289 P |
| 4,584,101 | A | | 4/1986 | Kataoka ......................... 201/474 |
| 4,806,375 | A | | 2/1989 | Favre ............................. 426/433 |
| 4,846,052 | A | | 7/1989 | Favre et al. |
| 4,859,337 | A | | 8/1989 | Woltermann ................. 210/474 |
| 4,962,693 | A | | 10/1990 | Miwa et al. .................... 99/283 |
| 5,047,252 | A | | 9/1991 | Liu et al. ........................ 426/79 |
| 5,265,517 | A | | 11/1993 | Gilbert ........................... 99/280 |
| 5,300,308 | A | | 4/1994 | Louridas ........................ 426/112 |
| 5,325,765 | A | | 7/1994 | Sylvan et al. .................. 99/295 |
| 5,566,605 | A | | 10/1996 | Lebrun et al. .................. 99/302 |
| 5,637,335 | A | | 6/1997 | Fond et al. ..................... 426/84 |
| 5,649,472 | A | | 7/1997 | Fond et al. ..................... 99/295 |
| 5,755,149 | A | | 5/1998 | Blanc et al. .................... 99/289 |
| 5,773,067 | A | | 6/1998 | Freychet et al. ............... 426/506 |
| 5,948,455 | A | | 9/1999 | Schaeffer et al. .............. 426/77 |
| 6,007,853 | A | | 12/1999 | Lesser ............................ 426/77 |
| 6,607,762 | B2 | | 8/2003 | Lazaris et al. ................. 426/79 |
| 6,777,007 | B2 | | 8/2004 | Cai ................................ 426/78 |
| 6,786,134 | B2 | | 9/2004 | Green ............................ 99/289 P |
| 7,017,775 | B2 | | 3/2006 | Zettle et al. .................... 220/781 |
| 7,216,582 | B2 | | 5/2007 | Yoakim et al. ................. 99/295 |
| 7,469,627 | B2 | | 12/2008 | Li ................................... 99/286 |
| 7,770,512 | B2 | | 8/2010 | Albrecht ........................ 99/295 |
| 8,151,694 | B2 | | 4/2012 | Jacobs et al. .................. 99/302 R |
| 2003/0145736 | A1 | | 8/2003 | Green ............................ 99/280 |
| 2005/0150390 | A1 | | 7/2005 | Schifferle ...................... 99/295 |
| 2006/0110507 | A1 | | 5/2006 | Yoakim et al. ................. 426/433 |
| 2006/0236871 | A1 | | 10/2006 | Ternite et al. .................. 99/295 |
| 2007/0079708 | A1 | * | 4/2007 | Li ................................... 99/279 |
| 2009/0032454 | A1 | | 2/2009 | Rapparini ...................... 210/337 |
| 2009/0136639 | A1 | | 5/2009 | Doglioni Majer ............. 426/431 |
| 2009/0155422 | A1 | | 6/2009 | Ozanne .......................... 426/89 |
| 2010/0064899 | A1 | | 3/2010 | Aardenburg ................... 99/295 |
| 2010/0173056 | A1 | | 7/2010 | Yoakim et al. ................. 426/433 |
| 2010/0176004 | A1 | | 7/2010 | Schneider et al. ............. 205/687 |
| 2010/0178392 | A1 | | 7/2010 | Yoakim et al. ................. 426/80 |
| 2010/0178404 | A1 | | 7/2010 | Yoakim et al. ................. 426/431 |
| 2010/0186599 | A1 | | 7/2010 | Yoakim et al. ................. 99/295 |
| 2010/0203198 | A1 | | 8/2010 | Yoakim et al. ................. 426/80 |
| 2010/0203208 | A1 | | 8/2010 | Yoakim et al. ................. 426/431 |
| 2011/0041702 | A1 | | 2/2011 | Yoakim et al. ................. 99/302 R |
| 2011/0052761 | A1 | | 3/2011 | Yoakim et al. ................. 426/77 |
| 2011/0189362 | A1 | | 8/2011 | Denisart et al. ................ 426/433 |
| 2011/0217421 | A1 | | 9/2011 | Perentes et al. ................ 426/80 |
| 2011/0244099 | A1 | | 10/2011 | Perentes et al. ................ 426/431 |

FOREIGN PATENT DOCUMENTS

| | | |
|---|---|---|
| BE | 894 031 | 2/1983 |
| DE | 2151920 A1 | 4/1973 |
| DE | 32 41 606 | 3/1984 |
| DE | 35 29 053 | 2/1987 |
| DE | 35 29 204 | 2/1987 |
| DE | 37 19 962 | 6/1988 |
| DE | 42 40 429 | 6/1994 |
| DE | 44 39 252 | 5/1996 |
| DE | 10355671 A1 | 6/2004 |
| DE | 10 2005 007 852 | 8/2006 |
| EP | 0242556 A1 | 10/1987 |
| EP | 0 250 810 A1 | 1/1988 |
| EP | 0 367 600 | 5/1990 |
| EP | 0 512 470 A1 | 11/1992 |
| EP | 0521187 A1 | 1/1993 |
| EP | 0 607 759 | 7/1994 |
| EP | 0 651 963 | 5/1995 |
| EP | 0 749 713 | 12/1996 |
| EP | 0 806 373 B1 | 11/1997 |
| EP | 1208782 B1 | 5/2002 |
| EP | 1 299 022 B1 | 4/2003 |
| EP | 1 654 966 B1 | 5/2006 |
| EP | 1 774 878 | 4/2007 |
| EP | 1 813 333 A2 | 8/2007 |
| EP | 2 000 062 A1 | 12/2008 |
| EP | 2155021 B1 | 3/2011 |
| FR | 2 132 310 | 11/1972 |
| FR | 2 487 661 | 2/1982 |
| FR | 2 513 106 | 3/1983 |
| FR | 2 531 849 | 2/1984 |
| FR | 2 535 597 | 5/1984 |
| FR | 2 624 364 | 6/1989 |
| FR | 2 685 186 | 6/1993 |
| FR | 2 686 007 | 7/1993 |
| FR | 2 726 988 | 5/1996 |
| GB | 1 506 074 A | 4/1978 |
| GB | 2 416 480 | 4/1985 |
| GB | 2 227 405 A | 8/1990 |
| GB | 2 253 336 | 9/1992 |
| GB | 2 416 480 A | 2/2006 |
| JP | 50016225 A | 2/1975 |
| JP | 62254719 A | 11/1987 |
| JP | 63034581 U | 3/1988 |
| JP | 02124111 A2 | 5/1990 |
| JP | 02189114 A2 | 7/1990 |
| JP | 06339431 A2 | 12/1994 |
| JP | 3034606 | 2/1997 |
| JP | 2001061663 A | 3/2001 |
| JP | 2002189115 A | 7/2002 |
| JP | 2002215414 A | 8/2002 |
| JP | 2003144973 A2 | 5/2003 |
| JP | 2004517654 A | 6/2004 |
| JP | 2005516602 | 6/2005 |
| JP | 2005199071 A2 | 7/2005 |
| JP | 2005525146 A | 8/2005 |
| JP | 2006515764 A | 6/2006 |
| JP | 200618226 A | 8/2006 |
| WO | WO 94/02059 A1 | 2/1994 |
| WO | WO 02/35977 A1 | 5/2002 |
| WO | WO2004/030500 A1 | 4/2004 |
| WO | WO2005/066040 A2 | 7/2005 |
| WO | WO 2006/082064 A1 | 8/2006 |
| WO | WO 2006/112691 | 10/2006 |
| WO | WO2007/014584 A1 | 2/2007 |
| WO | WO 2007/041954 | 4/2007 |
| WO | WO 2007/085921 A2 | 8/2007 |
| WO | WO 2007/110768 A2 | 10/2007 |
| WO | WO 2008/087099 A2 | 7/2008 |
| WO | WO 2008/148601 A1 | 12/2008 |
| WO | WO 2008/148604 | 12/2008 |
| WO | WO 2008/148646 | 12/2008 |
| WO | WO 2008/148650 | 12/2008 |
| WO | WO 2008/148656 | 12/2008 |
| WO | WO 2008/148834 | 12/2008 |
| WO | WO 2009/050540 A1 | 4/2009 |
| WO | WO 2009/106175 A1 | 9/2009 |
| WO | WO 2009/106598 A1 | 9/2009 |
| WO | WO 2009/133134 A1 | 11/2009 |
| WO | WO 2010/026045 A1 | 3/2010 |
| WO | WO 2010/026053 A1 | 3/2010 |
| WO | WO 2010/038213 A2 | 4/2010 |
| WO | WO 2010/041179 A2 | 4/2010 |

OTHER PUBLICATIONS

DE 4240429 Machine Translation: Accessed from EPO Jul. 10, 2012.*
Written Opinion of the International Searching Authority and International Search Report, PCT/EP2008/056968, mailed Oct. 7, 2008.
Written Opinion of the International Searching Authority and International Search Report, PCT/EP2008/054401, mailed Sep. 11, 2008.
Written Opinion of the International Searching Authority and International Search Report, PCT/EP2008/056310, mailed Oct. 8, 2008.
Written Opinion of the International Searching Authority and International Search Report, PCT/EP2008/056345, mailed Oct. 1, 2008.

Written Opinion of the International Searching Authority and International Search Report, PCT/EP2008/056412, mailed Sep. 11, 2009.
Written Opinion of the International Searching Authority and International Search Report, PCT/EP2008/054810, mailed Oct. 24, 2008.
Non Final Office Action, U.S. Appl. No. 12/602,577, dated Mar. 20, 2012.
Non Final Office Action, U.S. Appl. No. 12/602,562, dated Feb. 13, 2012.
Final Office Action, U.S. Appl. No. 12/602,562, dated Jun. 22, 2012.
Non Final Office Action, U.S. Appl. No. 12/602,542, dated Apr. 13, 2012.
Non Final Office Action, U.S. Appl. No. 12/602,730, dated May 17, 2012.
Non Final Office Action, U.S. Appl. No. 12/860,705, dated Mar. 16, 2012.
Restriction Requirement, U.S. Appl. No. 12/602,553 dated May 11, 2012.
Non Final Office Action, U.S. Appl. No. 12/602,568, dated Mar. 20, 2012.
Green Mountain Coffee, New K-Cup Samplers Offer More Variety; Jul. 11, 2008, pp. 1-5. Accessed Mar. 6, 2012 from http://www.greenmountincafe.com/2008/07/new-k-cup-samplers-offer-more-variety/.
European Search Report, EP 09174573.7, mailed Apr. 9, 2010.
Chilean Patent Application No. CL-1652-2008, filed Jun. 5, 2008 (English in U.S. equivalent 2010/0173056 and WO2008/148601).
Chilean Patent Application No. CL-1653-2008, filed Jun. 5, 2008 (English in U.S. equivalent 2010/0186599 and WO2008/148604).
Chilean Patent Application No. CL-1655-2008, filed Jun. 5, 2008 (English in U.S. equivalent 2010/0178404 and WO2008/148646).
U.S. Appl. No. 12/856,369, filed Aug. 13, 2010.
U.S. Appl. No. 12/860,705, filed Aug. 20, 2010.
International Search Report mailed Feb. 9, 2010 for Application No. PCT/EP2009/060697 filed Aug. 19, 2009.
International Search Report mailed Feb. 8, 2010 for Application No. PCT/EP2009/060771 filed Aug. 20, 2009.
U.S. Appl. No. 12/602,542, filed Dec. 1, 2009.
U.S. Appl. No. 12/602,553, filed Dec. 1, 2009.
U.S. Appl. No. 12/602,562, filed Dec. 1, 2009.
U.S. Appl. No. 12/602,568, filed Dec. 1, 2009.
U.S. Appl. No. 12/602,577, filed Dec. 1, 2009.
U.S. Appl. No. 12/602,730, filed Dec. 2, 2009.
U.S. Appl. No. 13/061,558, filed Mar. 1, 2011.
U.S. Appl. No. 13/061,567, filed Mar. 1, 2011.
Non Final Office Action, U.S. Appl. No. 13/061,558, dated Dec. 6, 2012.
Final Office Action, U.S. Appl. No. 12/602,542, dated Oct. 4, 2012.
Final Office Action, U.S. Appl. No. 12/602,730, dated Sep. 18, 2012.
Non Final Office Action, U.S. Appl. No. 12/602,553, dated Aug. 23, 2012.
Non Final Office Action, U.S. Appl. No. 12/602,568, dated Oct. 19, 2012.
Final Office Action, U.S. Appl. No. 12/602,568, dated Jul. 16, 2012.
Final Office Action, U.S. Appl. No. 12/602,577, dated Jul. 20, 2012.
Final Office Action, U.S. Appl. No. 12/860,705, dated Jul. 18, 2012.

* cited by examiner

METHOD FOR PREPARING A BEVERAGE OR FOOD LIQUID AND SYSTEM USING BREWING CENTRIFUGAL FORCE

CROSS-REFERENCE TO RELATED APPLICATIONS

This application is a continuation-in-part of each of the following applications: Ser. No. 12/602,542 filed Dec. 1, 2009, Ser. No. 12/602,553 filed Dec. 1, 2009, Ser. No. 12/602,562 filed Dec. 1, 2009, Ser. No. 12/602,568 filed Dec. 1, 2009 now U.S. Pat. No. 8,409,646, Ser. No. 12/602,577 filed Dec. 1, 2009, and Ser. No. 12/602,730 filed Dec. 2, 2009. Each prior application is expressly incorporated herein by reference thereto.

FIELD OF INVENTION

The present invention relates to a capsule, device, system and method for preparing a beverage or food liquid from a food substance which is brewed or extracted by using centrifugal forces exerted on a capsule which contains the substance.

BACKGROUND

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367600B1. Such devices have many disadvantages. Firstly, the coffee powder must be properly dosed manually in the receptacle. Secondly, the centrifuged coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself. Also, depending on the manual dosage of coffee and the brewing conditions (e.g., centrifugal speed, receptacle size) the cup quality can vary a lot. Therefore, these systems have never reached an important commercial success.

EP1208782A1 relates to a device for preparing coffee beverages from capsules of different dimensions. The volume of the capsules is obtained by extending the body of the capsule at its open side thus creating capsules of different larger diameters. As a result, the capsule adaptation in the device is complex and requires moving elements to ensure proper tightness. In a centrifuge device, this would create wearing between the device after a certain period of use and would create vibrations when the capsule is centrifuged.

In a centrifugal system, an additional risk exists to create vibrations if the capsules is not properly supported in the centrifugal device. For a set of capsules presenting different volumes and containing different amounts of ingredient, there is an increased risk of unbalance and, consequently a risk of producing vibrations. The brewing device can move when it vibrates and it may generate a very important noise. Furthermore, a lack of support in the capsule holder can cause deformation of the capsule during centrifugation and create potential failure of the container, in particular, for plastic capsules. Therefore, there is a need for providing a capsule system that is able to deliver conveniently a wider variety of beverages, in particular coffees having different characteristics (taste, crema, etc.) in the centrifuge brewing device.

DE 102005007852 discloses a machine comprising a removable holder into which an open cup-shaped part of the receptacle is placed; the other part or lid being attached to a driving axis of the machine. However, one disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; GB2253336; FR2686007; EP0749713; DE4240429; EP0651963; FR2726988; DE4439252; FR2132310; FR2513106; FR2487661; DE3529053.

However, the effect of centrifugal forces to brew coffee or other food substances presents many advantages compared to normal type brewing methods using high pressure pumps. For example, in "espresso" coffee type brewing methods, it is very difficult t o master all the parameters which influence the quality of extraction of the delivered coffee extract. These parameters are typically the pressure, the flow rate which decreases with the pressure, the compaction of the coffee powder which also influences the flow characteristics and which depends on the coffee ground particle size, the temperature, the water flow distribution and so on.

Therefore, there is a need for proposing a new extraction process and a capsule adapted therefore for which the extraction parameters can be better and more independently controlled and therefore can be better mastered for controlling quality of the final brewed beverage or food liquid product.

There is also a need for providing a system capable of brewing different kinds of beverages, in particular, coffee beverages, for example, espresso, filter coffee or café latte, while adjusting the brewing characteristics of each beverage so that the optimum beverage can be obtained. In particular, there is a need for a versatile system which provides an easy, simple way of controlling the brewing parameters, in particular, the brewing pressure range on the bed of substance.

At the same time, there is a need for a way of preparing a beverage or food liquid which is more convenient compared to the prior art centrifugal coffee preparing devices and which provides a better in-cup quality with a higher control of important quality parameters such as freshness and accurate dosage of the substance in the receptacle.

The present invention now satisfies these needs and provides novel capsules, devices, systems and method of use for centrifugally preparing beverages or other food liquid products.

SUMMARY OF THE INVENTION

The invention relates to a capsule, device, system and method for preparing a liquid food or beverage. The capsule comprises an enclosure containing one or more extractable or infusible ingredients and configured and dimensioned to have a perimeter and be radially symmetrical about a central axis to facilitate rotation; and an opening means or arrangement that allows liquid food to leave the capsule after passing through the ingredient(s), wherein the opening means or arrangement is configured and positioned near or upon the perimeter of the enclosure to allow the liquid food to leave the capsule radially due to the application of the centrifugal forces. The method and device introduce liquid into the capsule to form the liquid food while applying centrifugal forces to the capsule to urge the liquid to pass through the ingredient(s).

The enclosure generally includes a top, bottom and side wall and the opening means or arrangement comprising one or more outlet openings located in the top or the side wall near or upon the perimeter of the enclosure, with the opening(s) either being (a) initially present in the enclosure along with a gas-tight covering or (b) formed by centrifugal forces during preparation of the liquid food after injection of the liquid into the capsule by movement of the liquid food to exert a flexure on at least one deflectable portion of the capsule, with the deflectable portion including an elastic lip acting in closure on the side wall of the capsule or inserted in a peripheral cavity of the enclosure.

The enclosure advantageously has a flared design with a widening side wall located between top and bottom walls, and an outer surface or structure for engaging external rotational driving means of a centrifugal device with the outer surface or structure configured to offer resistance to torque during rotation of the capsule or for frictionally engaging or receiving a complementary surface or structure of the driving means to enable the driving means to rotate the capsule, and the opening means or arrangement comprises a series of spaced radial outlets positioned or created at or close to the largest perimeter of the flared design of the enclosure. The enclosure can instead have a flared design with a widening side wall located between top and bottom walls and with capsule further comprising a collecting cavity for receiving the prepared liquid food with the cavity positioned adjacent to the largest perimeter of the flared design of the enclosure, and a filter part separating the extractable or infusible ingredient(s) and the collecting cavity food with the filter part optionally spaced from the top wall by a gap.

The capsule may further include an injection tubular portion having a water inlet on a top surface of the capsule and a water outlet communicating internally in the capsule, wherein the water outlet is close to or in contact with the bottom of the capsule. The extractable or infusible ingredient(s) are typically provided in the form of particles, with the opening means or arrangement comprising a porous material or a series of slits slots or holes distributed substantially evenly around the enclosure with the porous material, slits, slots or holes having open dimensions that are smaller than the particles of the extractable or infusible ingredient(s). When the opening means or arrangement provides access to the interior of the cavity prior to use, the capsule further comprises a sealing membrane or foil covering the opening means or arrangement to make the capsule gas-tight before use with the sealing membrane or foil being peelable or puncturable by a piercing member for injecting liquid into the capsule.

In preferred embodiments, the enclosure may include at least one peripheral recess that forms a collector for liquid food passing through the opening means or arrangement, wherein the collecting recess extends around the perimeter of the enclosure at its greatest circumference. The opening means or arrangement may include flow restriction means comprising outlet openings of less than 200 microns for providing a pressure drop of at least 0.5 to 6 bar of relative pressure during the centrifugal rotation of the capsule to enable the liquid to have a higher residence time in contact with the extractable or infusible ingredient(s) in the capsule.

The enclosure is typically thermoformed of a food grade plastic and includes a top wall or lid that includes at least one inlet port defining a passage for receiving a liquid that is to be introduced into the capsule, with the inlet port aligned with the central axis of the capsule, wherein the liquid to be injected into the capsule is water and wherein the extractable or infusible ingredient(s) is ground coffee, soluble coffee, a dairy based powder, a dairy or non-dairy creamer, cocoa, a sweetener, leaf tea, herbal tea, a culinary powder, a soluble or dispersible nutritional composition, a liquid food concentrate or combinations thereof.

The device of the invention conveniently prepares the liquid food from any of the capsules disclosed herein that contain one or more extractable or infusible ingredients. The device comprises means for receiving the capsule; means for introducing a liquid into the capsule; and means for centrifugally rotating the capsule about an axis of rotation. The capsule receiving means positions and references the capsule in a removable manner in the device and in an operational relationship with the liquid introducing means with the central axis of the capsule in alignment with the axis of rotation of the centrifugal rotating means such that upon introduction of the liquid, the centrifugal rotation of the capsule urges the liquid to flow through the ingredient(s) in a radial or centrifugal flow path to prepare the liquid food.

The liquid introducing means preferably comprises at least one needle for injecting liquid into the capsule at or near its central axis and the receiving means comprises a capsule holder associated with the centrifugal rotating means for allowing the capsule to be rotated around its central axis at a centrifugal speed of at least 500 rpm. The device may further include means for piercing the capsule to allow the liquid food to exit the capsule with the capsule piercing means radially positioned with respect to the axis of rotation of the capsule in the device and comprising a series of needles positioned in a circular pattern and arranged in relation to the capsule to pierce radial holes in the capsule.

The device advantageously includes a control unit adapted to vary the speed of the centrifugal rotation means for rotating the capsule at at least two different centrifugal speeds to provide different centrifugal pressures of water in the capsule, wherein the liquid introducing means is operatively associated with a pump and injection tube connected to a reservoir for injection of the liquid into the capsule under the effect of rotational momentum. The centrifugal rotating means generally comprises an electrical motor and drive shaft operatively associated with the capsule holder for rotating the capsule holder about the axis of rotation. If desired, the device can include a collector for collecting the liquid food, the collector including a by-pass conduit arranged to add water into the collector without passing into the capsule.

The device itself, rather than the capsule, can include flow restriction means arranged in the flow path of the liquid food for providing a pressure drop of at least 0.5 to 6 bar of relative pressure during the centrifugal rotation of the capsule to enable the liquid to have a higher residence time in contact with the extractable or infusible ingredient(s) in the capsule. The flow restriction means generally comprises a valve which is arranged in the flow path adjacent an outlet of the capsule, wherein the valve makes, opens or enlarges a passage in response to increasing pressure of centrifuged liquid so that the liquid food can exit the capsule and the device through the passage.

The capsule receiving means of the device comprises a capsule holder which advantageously has an interior surface or structure for engaging the capsule with the interior surface or structure configured to offer resistance to torque during rotation or for frictionally engaging or receiving a complementary surface or structure of the capsule to enable the driving means to rotate the capsule.

The device is useful for preparing beverages from a plurality of different capsules, in which case it further comprises identification means for identifying the different capsules, and control means capable of operating the device in centrifugation for any of the different capsules according to predetermined liquid food preparation parameters including the flow rate and the volume of liquid to be injected into the capsule, with the identification means comprising capsule recognition means which are recognized by sensing means connected to the control means of the device to control the preparation parameters accordingly.

The method of the invention prepares liquid food from the capsules containing one or more extractable or infusible ingredients. The method comprises passing a liquid through the substance(s) in the capsule while applying centrifugal forces to the capsule to urge the liquid to pass through the ingredient(s) in a radial or centrifugal flow path to prepare the liquid food. The capsule is preferably rotated centrifugally at a centrifugal speed of at least 500 rpm, and the liquid is introduced into the capsule at or near its central axis at substantially no pressure. An outlet in the capsule is provided at least after the liquid food is prepared (if not before) at a peripheral location of the capsule to enable the liquid food to leave the capsule.

The method may include restricting flow of the liquid food to provide a pressure drop of at least 0.5 to 6 bar of relative pressure during the centrifugal rotation of the capsule to enable the liquid to have a higher residence time in contact with the extractable or infusible ingredient(s) in the capsule prior to collecting the centrifuged liquid food from the capsule. Generally, the capsule is initially sealed in a gas tight manner before preparation and the extractable or infusible ingredient(s) comprises ground coffee powder, soluble coffee, tea, chocolate, whitener, flavours or combinations thereof. The extractable or infusible ingredient(s) may be present in an amount for forming one or two servings of the liquid food, and with the capsule being rotated at an axis of rotation that is vertical or inclined relative to vertical at an angle that is less than 90 degrees.

The method can be used for preparing a liquid food from capsules having different extractable or infusible ingredient(s), wherein predetermined parameters for preparing the liquid food are adjusted as a function of the volume of the extractable or infusible ingredient(s) contained in the capsule; including at least one of liquid flow rate, speed of rotational, volume of liquid introduced into the capsule, temperature of injected liquid and combinations thereof. The capsule generally comprises identification means for adjusting the liquid food preparation parameters. Also, the volume of the capsule may differs as a function of the volume or type of liquid food to be prepared. Preferably, the volume or type of liquid food represents at least two, preferably three or more different beverages, e.g., coffee.

BRIEF DESCRIPTION OF THE DRAWINGS

Additional features of the invention will appear in the detailed description of the figures which follows.

DETAILED DESCRIPTION OF THE PREFERRED EMBODIMENTS

Figure 1:
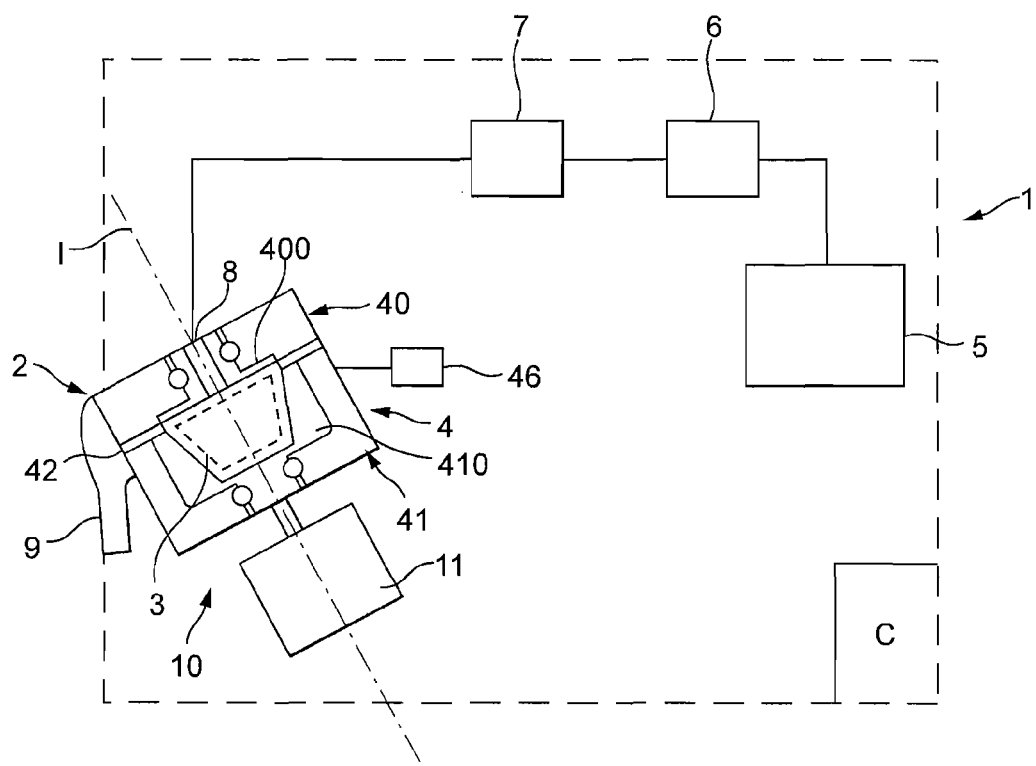
FIG. 1 is a schematic representation of system of the invention.

As used herein, the term "food liquid" has here a broad meaning and encompasses: a culinary liquid such as soup or sauce, a beverage liquid such as coffee extract (obtained from ground and/or instant coffee powder), liquid chocolate, milk (obtained from powder and/or liquid concentrate), tea extract (obtained from instant and/or leaf), etc., or a nutritional liquid such as an infant formula and combinations thereof.

As used herein, the term "sealed" capsule means that the capsule is made of materials having gas barrier properties and is sealed in a fluid tight manner so that ingress of air in the capsule is prevented.

As used herein, the terms "brewing" or "brewed" is not to be taken in the narrow sense of extracting under pressure a liquid from a non-entirely soluble substance (such as ground coffee or leaf tea) but is to be taken in a broader sense as encompassing the interaction processes of a food substance and a liquid, preferably water, including the processes of extraction, infusion, adsorption, dissolution, dilution, dispersion, mixing, emulsifying, foaming and the like.

As used herein, the term "piercing" is to be taken in its broad sense and it includes the mechanical and/or thermal processing for providing a through-opening in a wall of the capsule.

As used herein, the "extraction yield" reflects the extraction efficiency and is defined as the weight of total solids in the liquid extract divided by the total weight of starting coffee ingredients in the capsule (e.g., roast and ground coffee). This value is typically expressed in percentage.

As used herein, the average particle size "$D_{4,3}$" represents the mean volumetric diameter of the coffee grind as obtained by laser diffraction method using a Malvern® optical instrument and butanol as dispersing agent for the particles.

As used herein, the term "cylindrical" is intended to cover a sidewall of tubular circular section, forming an angle of 90 degrees, with a tolerance of + or −5 degrees, relative to the upper wall of the capsule.

As used herein, the term "insertion diameter" refers to a diameter of reference measured on the external surfaces of the body of the capsule.

As used herein, the term "angle" means the angle of the portion in the axial direction of the capsule relative to the central axis of rotation of the capsule.

As used herein, the term "upper portion" means the portion of the body closer to the free rim of the body.

As used herein, the term "lower portion" means the portion of the body towards the bottom of the body of the capsule.

As used herein, the term "roasting" includes any suitable thermal treatment of coffee beans to create flavors that are indicative of coffee.

In one embodiment, the invention provides for a method for preparing a beverage or food liquid from a food substance contained in a filtering receptacle by passing water through the substance using brewing centrifugal forces comprising:

feeding water in the receptacle, driving the receptacle in centrifugal rotation to force water to flow through the substance in a centrifugal flow path to outlet means of the receptacle, wherein the receptacle is formed by a sealed capsule before its use which is opened for water to be introduced in the capsule; said capsule containing a predetermined dose of food substance and being discarded after use.

The capsule can be sealed in a gastight manner to preserve freshness of the substance contained in its enclosure. The capsule can be opened in the device itself, e.g., by piercing of the capsule, or alternatively before the capsule is inserted in the device, e.g., by piercing of the capsule or removing a sealing foil of the capsule.

The capsule can be opened for water to be introduced in the capsule, after insertion of the capsule in the beverage preparation device, by piercing of the capsule.

The capsule can also be opened for water to be introduced in the capsule, before insertion of the capsule in the beverage preparation device by providing at least one passage, by piercing or removing a sealing foil of the capsule.

The method more particularly relates to the preparation of a food liquid or beverage, in a beverage preparation device, from a food substance contained in a filtering receptacle by passing water through the substance using brewing centrifugal forces comprising:

feeding water in the receptacle, driving the receptacle in centrifugal rotation to force water to flow through the substance in a centrifugal flow path to outlet means of the receptacle, wherein the receptacle is formed by a capsule which is sealed before use;

wherein the capsule contains a dose of food substance;

wherein the capsule is placed in the beverage preparation device, wherein the capsule is opened for water to be introduced in the capsule;

wherein the capsule is removed from the beverage preparation device for being discarded after the liquid has been brewed from the capsule by centrifugation of the capsule in the beverage preparation device.

The sealed capsule is made of materials having gas barrier properties and is sealed in a fluid tight manner so that ingress of air in the capsule is prevented. Furthermore, the capsule preferably contains an inert gas that improves the freshness of substance in the capsule. The capsule can also be wrapped with an outer protective membrane which is removed before the capsule is placed in the device.

Preferably, the capsule contains a dose of substance for preparing one or two servings (e.g., cups) of beverage. Cups of beverage are usually sized between about 25 to 220 mL.

The dose of substance for a single cup of coffee may be, for instance, between 4 to 8 grams of roast and ground coffee.

It must be noted that surprising improved brewing results are obtained by this method which can lead to amounts of coffee solids in the cup which are higher than known methods using brewing water pressurized by a pump. Without being bound by theory, it is supposed that water flow is more uniformly distributed by centrifuge effect and it creates less or no preferential flow paths in the coffee bed as compared to traditional methods using a positive pressure obtained by a pressure pump.

The food substance in the capsule can be ground coffee powder, soluble coffee, tea, chocolate, whitener, flavours and combinations thereof.

The capsule is preferably driven in rotation at a centrifugal speed of at least 1000 rpm, more preferably between 2500 and 20000 rpm, most preferably between 5000 and 16000 rpm. Surprisingly, at such high rotational speeds, improved coffee crema is obtained with a capsule containing ground coffee. Crema has a more creamy consistency like a real emulsion of oil and water compared to usual crema obtained by traditional methods which is more watery with larger bubble size.

Of course, the speed also depends on the nature of the food ingredient. For leaf tea, the centrifugal speed is preferably low to provide infusion rather than a pressure extraction. In particular, for leaf tea, the centrifugal speed is comprised between 10 and 1000 rpm, more preferably between 50 and 500 rpm.

The capsule can comprise a sealing lid. The sealing lid can comprise a flexible membrane. The membrane can comprise gas barrier and support layers made of polymers, aluminium and/or aluminium alloys.

The capsule can also comprise a cup-shaped body onto which the sealing lid is sealed. The cup-shaped body may also comprise gas barrier materials, such as metal, e.g., thin aluminium and/or plastic.

In another embodiment, the capsule is made of two sealed flexible foils. The foils can be symmetrically arranged forming two identical sides and welded at a peripheral seam.

In another mode, the capsule comprises a plastic lid attached to a cup-shaped body. The plastic lid and body can be attached through a clipping member comprising a deflectable sealing lip. The deflectable lip is designed so that it opens under the effect of the centrifugal forces transferred to the brewed liquid exiting the capsule. In a variant of this mode, the capsule comprises a plastic lid welded on a cup-shaped body whereas a series of premade peripheral outlets are provided in the lid and/or body for the brewed liquid to leave the capsule under the effect of the centrifugal forces. The premade peripheral outlets may be a series of small slits of small size to also filter the brewed liquid and maintain solid particles of the substance in the capsule. The lid and body can thus be welded by ultrasounds or any suitable connection method.

The method of the invention comprises an operation wherein hot water is introduced into the capsule at substantially no pressure. Water can be brought by a hot water feed mechanism using a principle of aspiration or vaporisation.

Alternatively, for a higher flow consistency, hot water can be introduced using a low pressure pump such as a peristaltic pump or a diaphragm pump and the like.

The method also encompasses an operation during which at least one peripheral liquid outlet is made before or when water is introduced in the sealed capsule.

The outlets can be pierced on a lid of the capsule. Outlets can also be pierced on a sidewall of the capsule.

In a mode, a plurality of outlets is formed by piercing at a peripheral area of the capsule. This method has the advantage to require a simpler capsule. The number of outlets can be chosen to control the flow rate of the brewed liquid. Since the outlets are radially oriented in series, a high pressure layer or jets of the brewed liquid is formed that is expelled out of the capsule.

Preferably, in the method of the invention, the brewed liquid is also collected to form a homogeneous flow of the food liquid or beverage which can be directed to the cup.

In one embodiment of the invention, at least one peripheral outlet is formed in the capsule by an opening occurring under the effect of the pressure of liquid carried out by the centrifugal forces.

The invention also concerns a system for preparing a beverage or food liquid from a food substance contained in a filtering receptacle by passing water through the substance using centrifugal forces comprising:

a device comprising:

water feed means for introducing water in the receptacle, and driving means for driving the receptacle in centrifugal rotation, wherein the receptacle is formed by a capsule which contains the food substance and is insertable in the device for brewing of the food liquid and then removable from the device after brewing of the food liquid, wherein the system further comprises referencing means for positioning and referencing the capsule in a removable manner in the device and in operational relationship with the water feed means and along an axis of rotation along the driving means.

Preferably, the capsule is a gastight sealed receptacle before being inserted in the device.

In one aspect of the system of the invention, the capsule comprises trunconical sidewalls which promote the drainage of the brewed liquid across the substance to the outlet(s) of the capsule.

In another possible aspect, the capsule has a rigid lid resiliably attached to a cup-shaped body. The lid can be plastic. The lid and body can be attached via a radial deflectable sealing means which opens by effect of the centrifugal effect to let the brewed liquid pass. For example, the deflectable sealing means can comprise at least one peripheral plastic lip of the lid engaging in a seat of the cup-shaped body or vice versa.

The invention also relates to a device for preparing a beverage or food liquid from a food substance contained in a capsule by passing water through the substance in the capsule comprising:

water feed means for introducing water in the capsule, wherein it further comprises referencing means for positioning and referencing the capsule along an axis of rotation in the device and driving means for driving the capsule in centrifugal rotation.

The referencing means are designed for receiving the capsule in a removable manner. They are designed for receiving the capsule in the device in operational relationship with the water feed means and the driving means. The referencing means comprise a capsule holder comprising a cavity which is drivable in rotation. The capsule holder can be driven in rotation at a speed of more than 7500 rpm. The capsule holder is, for instance, connected to a motor via a drive shaft arranged for driving the capsule holder about a central rotational axis. The referencing means comprise a water injection lid closing on the injection surface of the capsule. The lid and capsule can co-act in closure about the capsule while leaving a collecting chamber. The driving means comprise a motor and a shaft associated in rotational arrangement with the capsule holder and/or lid. The capsule holder and lid can swivel along bearings. The collecting chamber preferably comprises surfaces that surround the capsule radially. The collecting chamber can be associated to a duct for directing the flow of brewed liquid to a recipient (e.g., a cup).

The device may optionally comprise a by-pass conduit arranged to add a part of water in the collector without this part of water passing in the capsule. The additional part of water enables to prepare beverages of larger volumes with a part of brewed liquid and a part of water. For large coffee, for instance Americano-type, since the total volume of the coffee beverage is not passed through the capsule, an over-extraction of the ground coffee can be avoided and bitterness can be reduced. This results in a large coffee beverage having an improved taste.

According to another aspect of the invention, the device comprises a control unit adapted to vary the speed of the driving means for driving the capsule in centrifugal rotation therefore providing different centrifugal pressures in the capsule. As a result, the brewing pressure conditions in the capsule can be easily tailored to the type of beverages to be brewed. More preferably, the control unit is programmed to provide at least two different centrifugal speeds. In an example, a first rotational speed is comprised within a value range of 500 to 15000 rpm and a second rotational speed is comprised within a value range of 1500 and 20000 rpm, more preferably, 5000 and 20000 rpm. For example, low speed values can be set by the control unit to brew coffee with less or no foam such as long coffee or American coffee. The higher speed values can be set by the control unit to brew coffee with a higher amount of foam such as espresso or lungo coffee. The foam (e.g., coffee crema) is obtained by shearing the liquid through the passages in the capsule and also by the brewed liquid which impacts on the surfaces of the collector at a higher energy therefore creating an emulsion with entrapment of gas. Therefore, the kinetic energy of the liquid impacting on a surface is decisive for the improvement of the foam. In the usual brewing methods using brewing water pressurized by a pump, this phenomenon does not take place since there is no sufficient speed of the liquid leaving the capsule.

The invention also concerns a capsule for preparing a beverage or food liquid from a food substance contained in the capsule by passing water through the substance using brewing centrifugal forces, which comprising:

an enclosure containing a predetermined dose of substance, means for connecting the capsule to external rotational driving means wherein said means are configured to offer a resistance to torque during rotation of the capsule for maintaining the capsule in a reference rotational position.

In one embodiment, the connecting means of the capsule preferably comprises a tubular portion protruding from the capsule.

In another embodiment, the connecting means comprises at least one recess portion.

In another embodiment, the surface of the capsule comprises a roughened portion.

The roughened portion thus creates a sufficient resistance to the driving surface of the device that enables it to drive the capsule in rotation.

In yet another embodiment, the surface of the capsule comprises a toothed structure.

In an aspect of the invention, the capsule comprises opening means for letting the brewed liquid leave the capsule, wherein the opening means opens under the effect of the fluid being moved by the centrifugal forces when the capsule is driven in rotation.

For instance, the opening means forms at least one radial outlet for the brewed liquid.

Preferably, the capsule has a flared design and the at least one radial outlet is positioned or created at or close to the larger side of the flared design. This design and outlet arrangement promotes the flow of the centrifuged brewed liquid in the capsule, its collection and its removal from the capsule.

In a convenient embodiment, the outlet can be obtained by the centrifugal forces which exert a flexure on at least one deflectable portion of the capsule.

The capsule may comprise a cup-shaped body and a lid that closes the body.

For instance, the deflectable portion is an elastic lip acting in closure on a surface of the capsule. The deflectable lip is integral to at least one wall of the capsule. It can be moulded in plastic with a part of the capsule, i.e., a lid or body of the capsule. The lip can, for instance, be inserted in a peripheral cavity or groove of the capsule. The groove may be formed in the body or lid. The lip can be formed on the opposed part where the groove is formed, i.e., the lid or body of the capsule.

In another mode, the invention relates to a capsule for preparing a beverage or liquid food by passing water through a substance contained in the capsule by using brewing centrifugal forces comprising:

a gastight enclosure containing a predetermined dose of substance, at least one outlet placed at the periphery of the enclosure for the brewed liquid to leave the capsule when centrifuge forces are exerted in the capsule.

In this mode, premade radial outlets for the brewed liquid are provided in the capsule. For instance, a series of slits are provided in the lid and/or body. When the capsule is driven in rotation, the brewed liquid can pass through the slits whereas the solid particles are retained in the capsule. An additional filtering layer can be used to filter the liquid depending on the size of the outlets.

Furthermore, the capsule can comprise an injection tubular portion for transporting water in the capsule. The tubular portion has a water inlet on a surface of the capsule and a water outlet communicating internally in the cavity of the capsule. Preferably, the capsule has flared sidewalls. Preferably, the water outlet is close to the bottom of the capsule so that water arrives inside the cavity containing the substance at the bottom side. The bottom refers to the more narrow side of the capsule by reference to the flared design.

The invention also concerns a system for preparing a beverage or liquid food from a food substance contained in a filtering receptacle by passing water through the substance using centrifugal forces comprising:

a device comprising:
water feed means for introducing water in the receptacle,
driving means for driving the receptacle in centrifugal rotation, and
referencing means for positioning and referencing the receptacle in the device in operational relationship with the water feed means and the driving means.

According to an aspect of the invention, the receptacle is formed by a capsule which comprises means for connecting the capsule to the driving means.

The device also comprises complementary connecting means for engaging the connecting means of the capsule.

The system 1 of the invention is illustrated in FIG. 1 in the more general sense. The system comprises a device 2 and a capsule 3. The device has a brewing module 4 into which the capsule can be inserted for being brewed and is removed after use for being discarded (e.g., for waste or recycling). The module is in fluid communication with a water reservoir 5 containing fresh or, alternatively heated water. A fluid transport means such as a low pressure pump 6 can be provided in the water circuit to transport water from the reservoir to the module. A water heater 7 is further provided to heat water to the desired temperature. It can be noted that water could be heated in the reservoir itself and water could be transported from the reservoir by effect of vaporisation. Water can be fed into the module 4 at low or substantially no pressure. For example, a pressure between 0 and 2 bars above atmospheric pressure can be envisaged at the inlet 8 of the module.

The brewing module 4 can comprise referencing means 40, 41 for retaining the capsule in a predetermined position in the module. The capsule can be maintained in a slightly inclined position to promote the exit flow of the brewed liquid to a brewed liquid outlet 9. For instance, an angle of inclination relative to vertical can be between 2 and 65 degrees. The referencing means can comprise a capsule holder 410 and an injection lid 400. Both holder 410 and lid 400 are mounted to rotate along an axis of rotation I. The capsule holder comprises a cavity having the shape of the capsule to be received. The lid is designed to assemble against the capsule holder in a removable manner. A liquid passage 42 can be created in the module to enable liquid to be drained and collected from the capsule to the fixed outlet 9.

Driving means 10 are provided for driving the lid 400 and capsule holder 410 together in rotation and, by way of consequence, the capsule too. For this, the driving means includes an electrical motor 11 having a shaft connected to the capsule holder to force the capsule holder 41 in rotation. Since the lid 40 is attached to the capsule holder 41, the lid is also driven in rotation at the same speed as the capsule holder.

The surfaces of the collecting means of the device can be regulated in temperature so that the brewed liquid exiting the capsule is maintained at a proper temperature and does not cool down before reaching the cup. For this the lid assembly 40 and for capsule holder assembly 41 can be associated to heating elements 46 for maintaining the capsule holder at a heated regulated temperature, such as with heating wires or thick films and the like.

Figure 2:
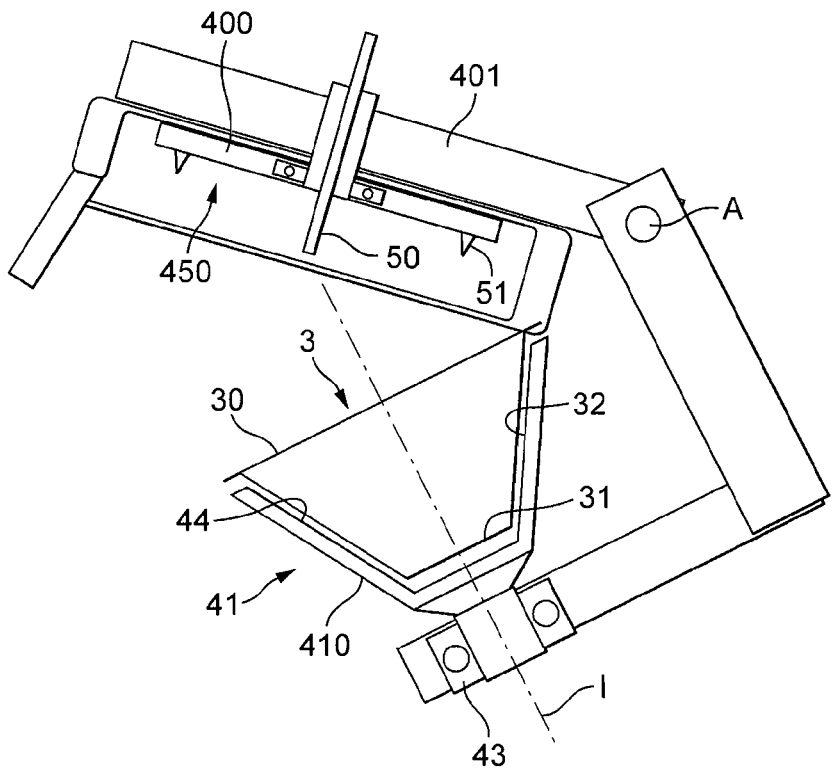
FIG. 2 is a schematic representation of a brewing module in open position of the system of the invention into which is inserted a capsule.
Figure 3:
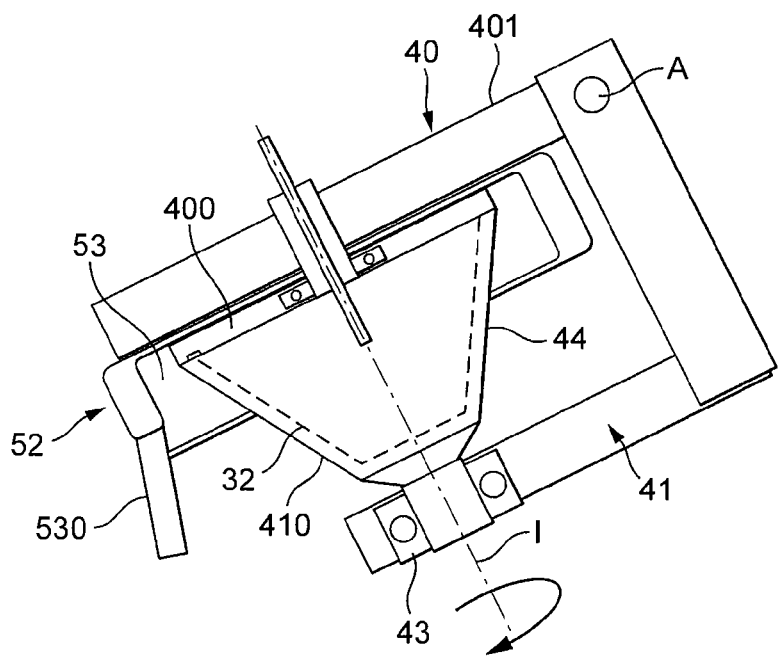
FIG. 3 is a schematic representation of a brewing module in closed position of the system of the invention which encloses a capsule.

FIGS. 2 and 3 show a detailed view of the principle of centrifugation of the capsule. The device comprises a capsule holder assembly 41 with a holder 410 having a trunconical housing 44 in which the capsule 3 is inserted. The holder is mounted along an axis of rotation I by a bearing 43. The injection lid assembly 40 is provided with an internal lid 400 which can be mounted on a fixed support part 401 of the lid assembly 40 in a pivotable manner along the axis I when the device is closed (FIG. 3).

The lid assembly and capsule holder assembly are associated along a transversal axis A between an open position as illustrated in FIG. 2 and a closed position of FIG. 3.

At the inside surface of the injection lid 40 is placed a piercing structure 450 which has the function of piercing the injection side 30 of the capsule. A water injector or lance 50 is provided which traverses the injection side 30 and which comprises an injection conduit for carrying water from the water circuit into the capsule. The water injector 50 is preferably located in the centre of the capsule. Water can thus be injected in the capsule at a location placed between the capsule lid 30 and the capsule bottom 31. The outlet of the water injector is placed closer to the bottom 31 than to the lid so that water can first wet the substance in the bottom area of the capsule. The lid further comprises outlet piercing elements 51 which are placed on the inside of the lid at a radial position. Preferably, a series of piercing elements 51 are placed uniformly along the periphery of the lid. Further the capsule comprises an inclined sidewall 32 which widens from the bottom 31 to the top 30 in direction of the radial openings or outlets pierced by the piercing elements 51. The lid is further provided with a collecting assembly 52 comprising an inside chamber 53 surrounding the capsule's radial openings and a nozzle 530 forming a tube for directing the beverage or food liquid to the recipient or cup. It can be noted that there is no need for a hermetical arrangement between the upper and lower parts 40, 41 of the device. Since water is pushed by the effect of gravity, water flows radially and uniformly to the sidewall 32 of the capsule to traverse the substance toward the periphery of the capsule and upwards to the radial opening along the sidewall 32. The brewed liquid so impacts the outward surface of the collecting assembly 52 and is so collected and pushed still by effect of gravity to the collecting nozzle 530. The advantage of the system is that there is a low axial pressure therefore there is less need for high mechanical closure forces. The technology is relatively simple since a motor working at low current is sufficient to provide the necessary momentum to carry out the brewing process. Furthermore, several types of heaters can be used such as thermos or gas.

Figure 4:
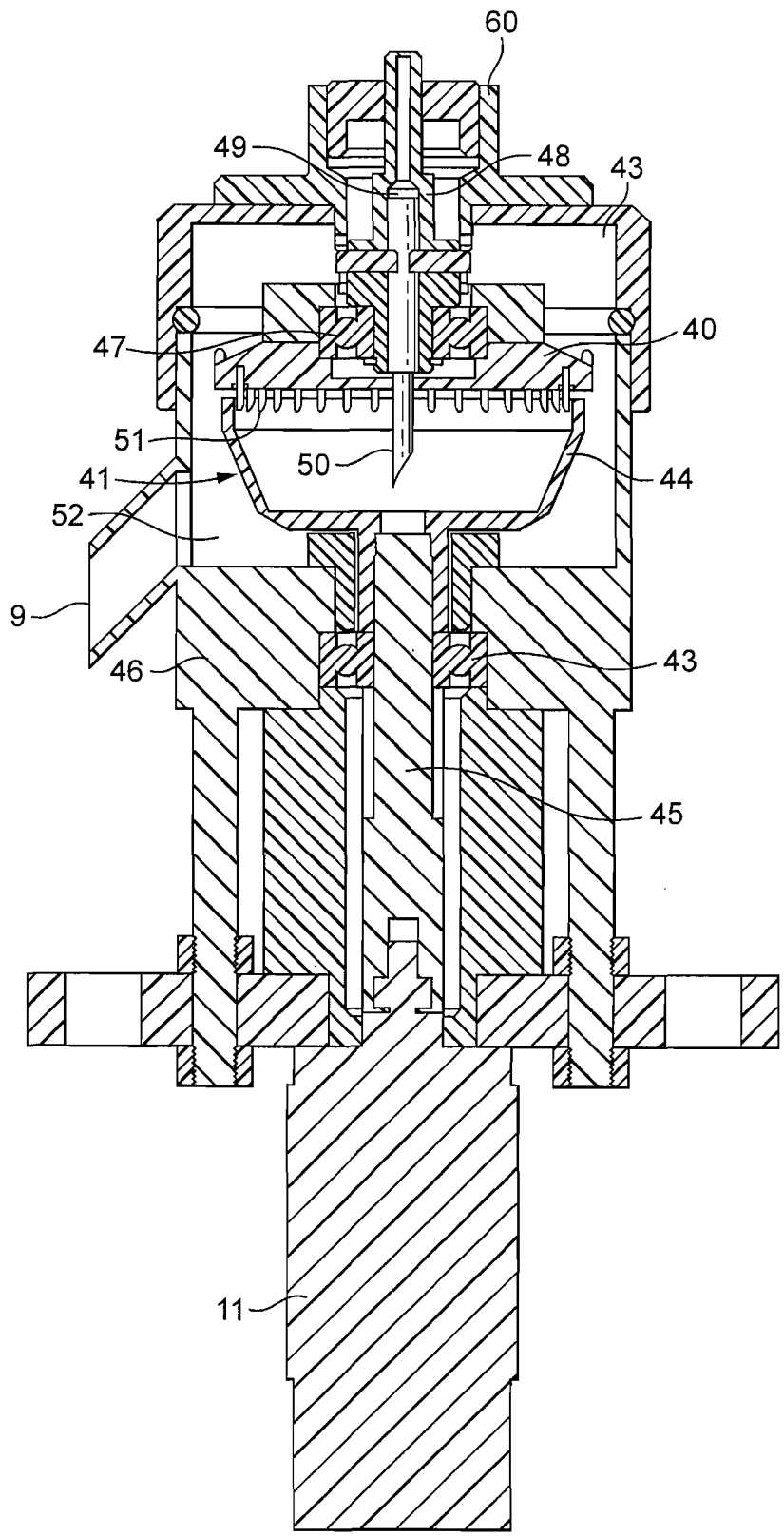
FIG. 4 is a detailed cross sectional view of the system of the invention in a first embodiment.

FIG. 4 shows a more sophisticated system of the invention. The system comprises a capsule holder 41 which is associated to a central rotating rod 45 mounted along a lower bearing 43, which is supported on a support 46. On the lower end of the rod 45 is associated an electric rotary motor 11. At the opposite side, a lid 40 is associated to an upper bearing 47, along a hollow rotating rod 48 for the entry of water in the capsule through a conduit 49 traversing the rotating rod 48. The rotating rod 45 is mounted on an upper frame 60 of the system. A series of needles 51 is also positioned on the side of the lid 40 to form small perforations at the periphery of the upper side of the capsule. The number of needles can be set between 5 and 50, preferably between 10 and 30. The higher the number of needles, the more uniform the distribution of liquid can be. When the needles 51 are engaged in the capsule, the lid is driven in rotation by the capsule itself which is also driven by the rotor 45.

The rotational speed can be set between about 1000 and 20000 rpm: For this a control unit C (FIG. 1) is provided in the device for adjusting the rotational speed as a function of the beverage to be brewed. The higher the rotational speed, the more radial pressure is exerted in the capsule by the liquid and the more the substance is compacted on the sidewall of the capsule. Also, the higher the speed, the lower the residence time of the liquid in the capsule.

For example, for tea, the rotational speed can be minimal to enable a slow transfer of water through the mass of tea leaves and to provide an infusion of the tea.

For ground coffee, the speed should be relatively high, i.e., higher than 1500 rpm, more preferably higher than 5000 rpm, preferably within a range of about 8000-16000 rpm, in order to perform optimal extraction conditions in term of coffee solid contents in the cup and quality of the crema. It has been surprisingly found that crema obtained is much creamier than by using the standard espresso brewing methods.

The rotational speed ranges differ as a function of the coffee type to be delivered in order to deliver optimized results, for ristretto (25 ml), espresso (40 ml), lungo (110-120 ml), Americano or long coffee (180-400 ml). In another mode, the flow rate differs as a function of the coffee type. The flow rate of injected liquid in the capsule can be controlled by measuring it with a flow meter. In order for this flow rate to be maintained within a given range or value during beverage centrifugation, the rotational speed is monitored continuously or at very short time intervals. Since the flow rate influences directly the residence time of liquid in the capsule, thereby the brewing conditions, it is preferred to control the flow rate at predetermined values as a function of the desired beverage (e.g., coffee type) rather than controlling the rotational speed at predetermined values.

Therefore, as much as two, three, four or even more different flow rates and/or speed ranges can be provided in function of the types of coffee to be delivered. Therefore, depending on the types of beverage to be brewed, the control unit can be programmed to adjust the optimal centrifugal conditions. For instance, the control unit may be associated to a capsule recognition system enabling to recognize the types of capsules, i.e., espresso, lungo, cappuccino, long coffee (e.g., 180-400 ml), latte, tea, etc., and to adjust the speed and/or other brewing parameters (e.g., water temperature) according the capsule which is inserted in the device. A recognition system uses a code on the capsule and recognized by the device, such as a color, a barcode, an RFID, a magnetic code, ferromagnetic micro-wires or labels, shapes and combinations thereof.

Different types of capsules such as for brewing different coffee types (ristretto, espresso, lungo, Americano, latte, etc.) contains appropriate amounts of ground powder for mixing with the appropriate amount of water. Generally, the amount of water varies from about 20 to 400 ml depending upon the desired beverage, with the amount of ground coffee powder provided as necessary to create the anticipated properties of the beverage. Typically, higher amounts of coffee powder may be desired for larger coffee cups or for stronger coffee beverages. Also, the characteristic of coffee roasting level and/or coffee grind size is adapted to ensure that the desired or expected properties of these different coffee variants are achieved. The appropriate amounts can be determined by routine experimentation by a skilled artisan.

The brewed liquid is collected in a collecting chamber 52 of the support 46 and drained through a collecting tube 9.

Figure 5:
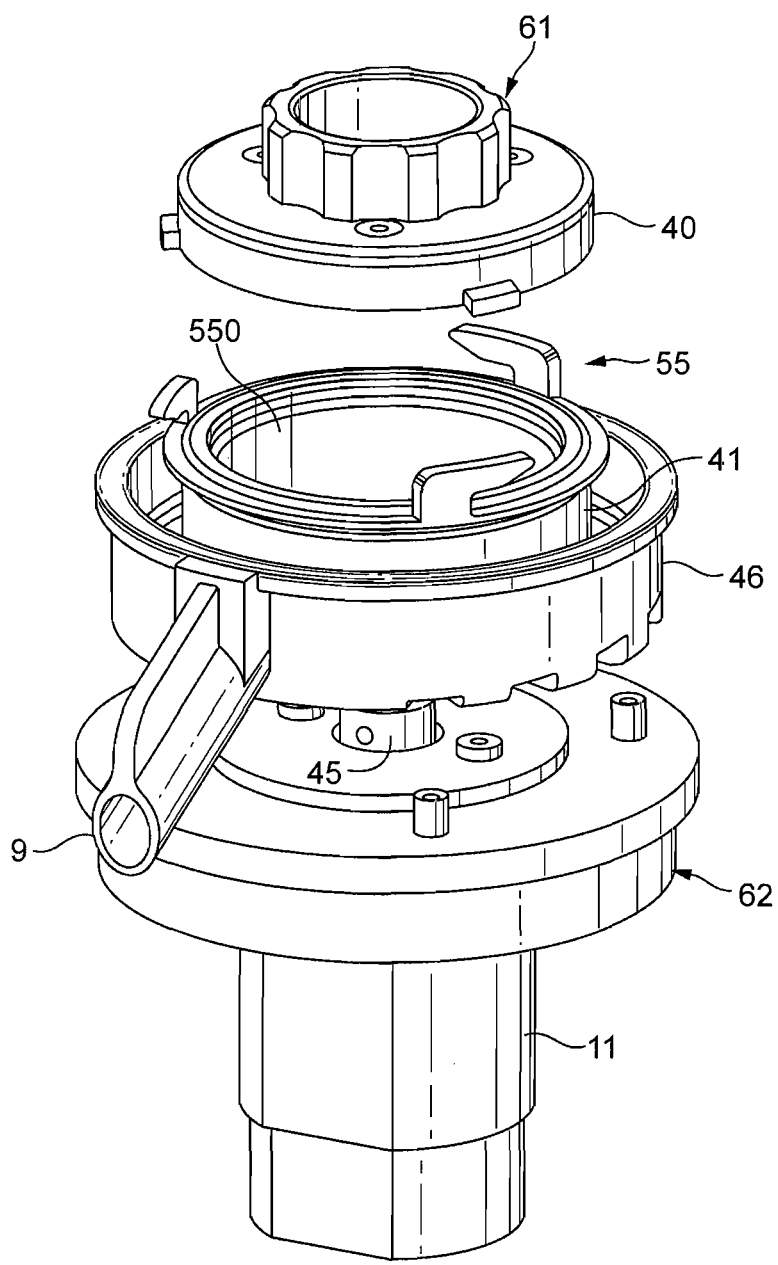
FIG. 5 is an exploded view of another embodiment of the device of the invention.

FIG. 5 illustrates another embodiment in which the injection lid 40 is connected to the capsule holder 41 by a bayonet type connection 55 or any equivalent connection means. In this embodiment, only one lower bearing (not shown) is necessary. The capsule holder 41 and the lid 40 are thus connected together and both turn along a lower rotational axle 45.

The capsule holder comprises a cavity 550 for receiving the capsule. The injection lid is then connected to the capsule holder along a helicoidal tightening momentum by the bayonet means 55. For example, the bayonet means can comprise a series of radially extending protrusions on the lid which fits into a series of hooks carried on the edge of the capsule holder. Tightening may be performed by a gripping portion 61 placed on the upper side of the lid. However, the assembly must let liquid pass between the lid and the holder. A sealing joint between the lid and holder is therefore not desirable. A predefined clearance may also be ensured for controlling the exit flow of the brewed liquid by foreseeing slots or grooves of predetermined dimensions at the interface between the lid and holder.

A collecting assembly 46 having the shape of a cup larger than the capsule holder is also placed about the brewing enclosure 40, 41 for collecting the brewed liquid. The collecting assembly takes support on a base 62 of the device onto which is connected the motor 11. A liquid duct 9 is provided on a side of the cup which is slightly inclined downwards for the liquid to flow in the direction of a receptacle (e.g., a beverage cup).

Figure 6:
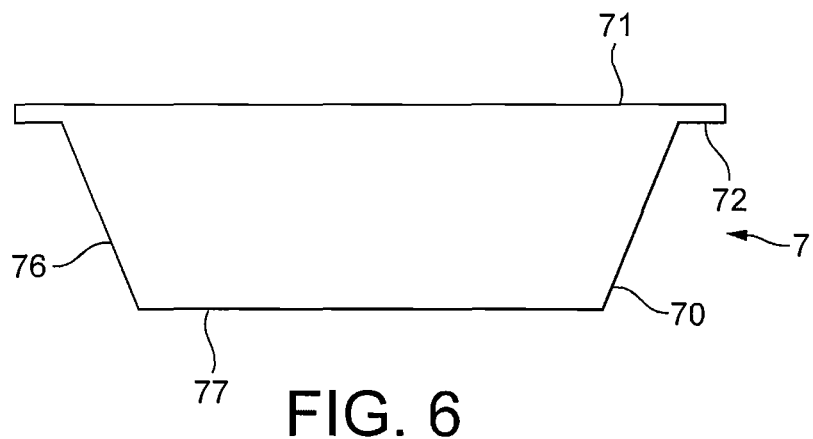
FIG. 6 shows a sealed capsule which can be used in the device of the invention according to FIG. 4 or 5.
Figure 7:
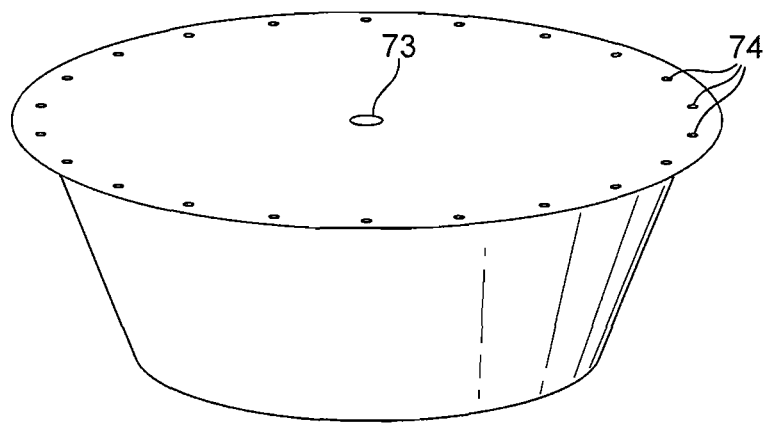
FIG. 7 shows a capsule after its use in the system of the invention.

FIGS. 6 and 7 illustrate a capsule that can suit the device according to the different embodiments of FIGS. 2 to 5. In FIG. 6, the capsule 7 comprises a cup-shaped body 70 with upwardly oriented sidewall 76 and a bottom wall 77. The sidewall forms a portion of cone which promotes the collection of the brewed liquid internally. The body terminates by an upper edge 72 raising outwards onto which is sealed a lid 71. The lid may be a flexible pierceable membrane of several microns in aluminium and/or plastic. The lid can be welded on the upper edges 72 of the body. It can be pointed out that the membrane and body preferably comprise gas barrier layers such as aluminium and/or EVOH.

The capsule contains a substance chosen among the list consisting of ground coffee, soluble coffee, tea, a whitener such as dairy or non-dairy ingredient(s), herbal tea, nutritional substance, culinary ingredients and a mixture thereof.

FIG. 7 illustrates the capsule after brewing of the substance in the device. A central water inlet 73 is pierced through the lid for passage of the water injector 50. On the side of the lid are pierced outlets 74 communicating with the inside cavity for the brewed liquid to exit the capsule.

Figure 8:
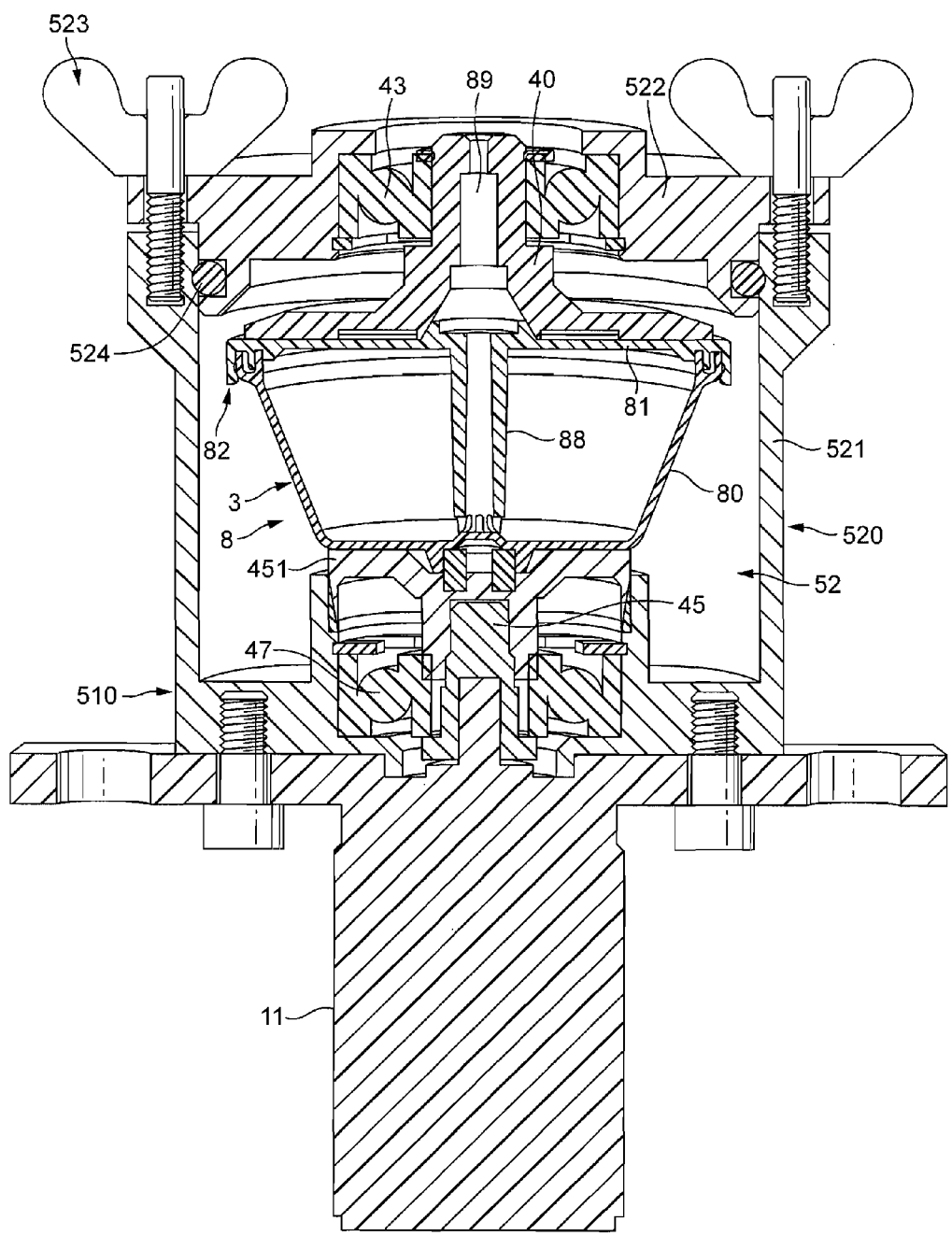
FIG. 8 is a detailed cross sectional view of the system of the invention in a second embodiment.
Figure 9:
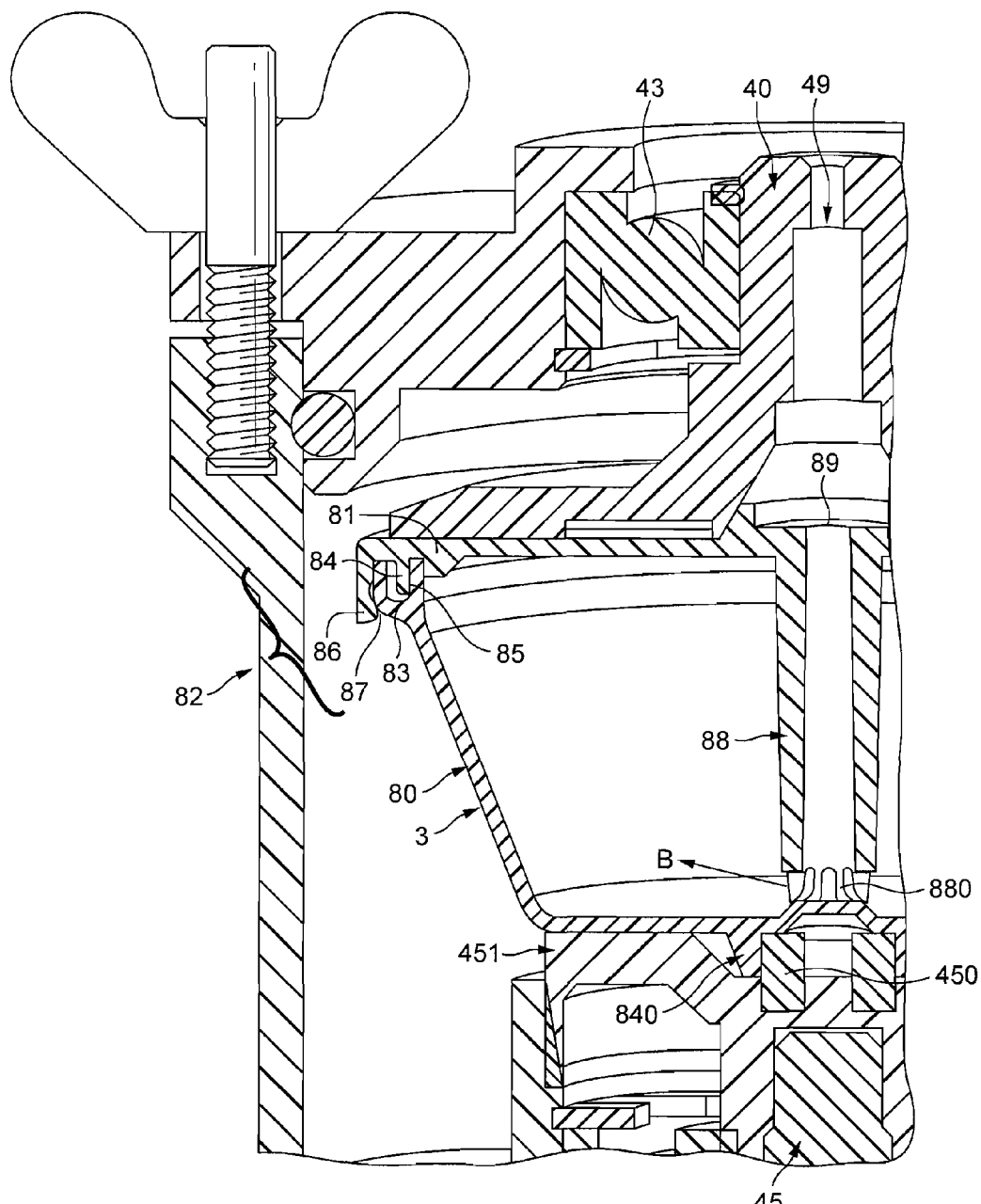
FIG. 9 shows a detail of the system of FIG. 8.
Figure 10:
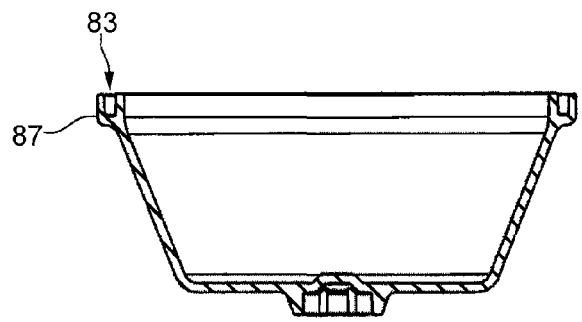
FIG. 10 shows a cross sectional view of the cup-shaped body of the capsule in the system of FIGS. 8 and 9.
Figure 11:
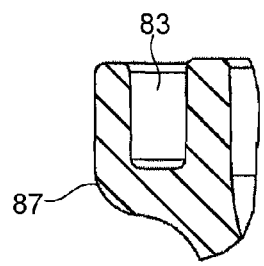
FIG. 11 shows a detail view of the clipping edge of the cup-shaped body.
Figure 14:
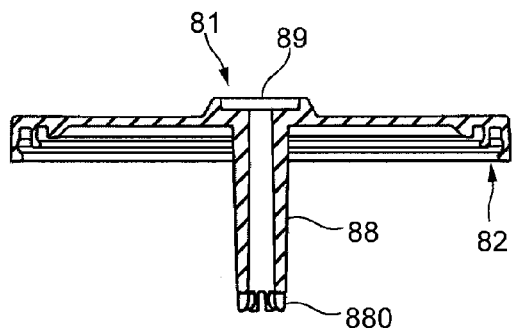
FIG. 14 shows a cross sectional view of the lid of the capsule in the system of FIGS. 8 and 9.
Figure 15:
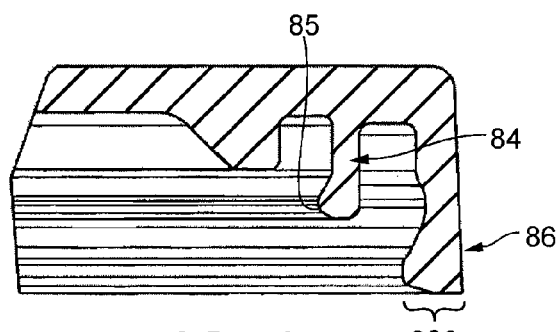
FIG. 15 shows a detailed view of the deflectable sealing means of the lid of FIG. 14.
Figure 16:
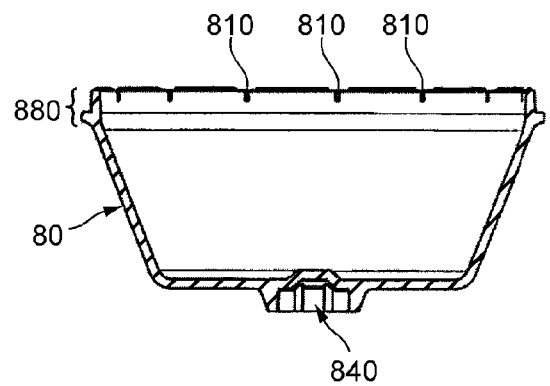
FIG. 16 shows a cross sectional view of the cup-shaped body of the capsule according to another embodiment.

Another embodiment of the present invention is illustrated in relation to FIGS. 8 and 9. In this embodiment, a capsule 8 comprising its own inflow and outflow means. More specifically, the capsule comprises a cup-shaped body 80 made of plastic onto which is secured a plastic lid 81. The lid can be tightly clipped onto the body along its edge by sealing means 82 illustrated in more details in FIGS. 9, 14 and 15. The sealing means act as a valve. More particularly, the edge of the body comprises a peripheral groove 83 formed of two small parallel and circular portions of wall rising upwardly. For this, the lid has a peripheral portion of wall forming a lip 84 that inserts itself in the groove 83. The lip 84 can end by a thicker rounded shape 85 to create a closing pressure on the surface of the groove 83 in the housing, which pressure must be overcome to let the liquid pass through the cavity or annular groove 83. The sealing lip 84 is designed in such a way that it can open a radial passage in the groove for the brewed liquid under the effect of liquid opening them when the liquid is centrifuged.

At the periphery of the lid is provided a secondary closure lip 86 that fits on the outer edge 87 of the body. This second lip 86 is designed to provide locking of the lid on the body of the capsule. For this, the lip 86 comprises an enlarged section 860 which presses on the outer surface 87 of the edge of the body.

The secondary lip 86 creates a clipping function for connection of the lid onto the body and eventually it also forms a second hurdle to be overcome for the brewed liquid to pass. This tortuous path as formed by the series of lips 84, 86 and the groove 83 generates high shear forces on the brewed liquid. The secondary lip can also be traversed by radial slits for promoting the flow of the brewed liquid (not shown). For coffee, this may result in generating a thicker and more stable crema. It can be noted that this lip could be omitted in the context of a simpler structure of the capsule.

In the centre of the capsule's lid is provided a water flow distribution member formed of a tubular portion 88 extending from the lid. This tubular portion 88 has a water inlet 89 which can be fitted to the water injection conduit 49 of the injection lid 40 of the system. The tubular portion 88 ends by flow distributing means 880 formed of several slots directed outwards in the cavity of the capsule. Several slots are distributed at the free end of the tubular portion 88. The tubular support may abut against the bottom surface of the body for demarcating the slots and for directing water in many radial directions. For instance, the number of slots may be comprised between 2 and 10. Therefore, water coming from the top will traverse the tube 88 and will exit the tube at the slots in the radial direction of the arrow B identified on FIG. 9. It can be noticed that water is so injected preferably close to the bottom of the capsule; therefore ensuring a proper wetting of the substance, e.g., coffee powder, and in the direction from the bottom to the top (i.e., between the lid and body) where the brewed liquid leaves the capsule.

The capsule 8 of FIGS. 8 to 15 according to this embodiment can further include means 840 for gripping the bottom of the capsule and so enabling the capsule to be properly driven in rotational motion by the device. For this, the means 840 comprises a small tubular portion protruding in the bottom of the capsule and into which can be inserted a complementary tubular portion 450 of the rotational driving means of the device.

Figure 12:
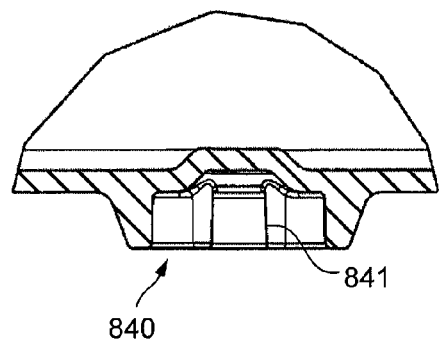
FIG. 12 shows a cross sectional view of a detail, i.e., of the engaging connection, of the cup-shaped body of FIG. 10.
Figure 13:
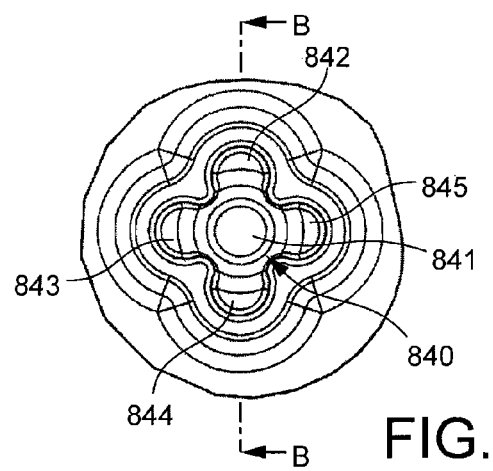
FIG. 13 shows a plane view of the detail of FIG. 12.

The driving means of the device further comprise a drive shaft 45 associated to a support 451 for holding the bottom of the capsule. Of course, the shape of the gripping means can take many other variations without departing from the scope of the present invention. FIGS. 12 and 13 show a gripping structure 840 having a central recess 841 and four arched recesses 842, 843, 844, 845 extending from the central recess 841. This gripping structure forms a lock into which is fitted a complementary engaging structure 450, i.e., a key, of the capsule holder 451. The complementary shapes of the capsule and capsule holder enable to fulfill both the gearing function for driving the capsule at high speeds in rotation and a safety function for ensuring that only capsules adapted to the system can be used and brewed successfully.

In this embodiment for FIGS. 8 and 9, the device itself comprises, as in the preceding modes, upper and lower bearings 43, 47 for enabling the injection lid and support of capsule 451 to rotate in conjunction with the capsule 3. Surrounding the capsule is a collecting assembly 52 with a cup 520 formed of a side and bottom walls 521 and an upper closing cover 522. The cover also serves for receiving the upper bearing 43 while the lower cup 520 has a central recess for receiving the lower bearing 47. The cup 520 and the cover 522 can be assembled in fluid tight manner to avoid uncontrolled projection of brewed liquid. Therefore connection means 523 can be provided and a fluid tight sealing element, such as an O-ring 524, can also serve to ensure tightness between the two parts. Also a beverage outlet tube (not shown) can be provided to drain the beverage outside of the collecting assembly.

As also apparent in FIG. 8, the driving means of the device comprise a lower electrical motor 11 which is coupled to a driving shaft or drive connector 45 which is itself connected to the capsule holder 451. Note that the capsule holder may be a simple plate support or disc 451 or a support shaped as a cup.

The brewing operation of the system of FIGS. 8 and 9 can be shortly explained as follows:

A capsule 3 as described contains a dose of substance is provided. The capsule can be filled with roast and ground coffee. The capsule is inserted in the cup 520 when the cover is removed and placed on the capsule holder 451 with the engaging structure of the engaging structure 450 fitting the recess portion 840 of bottom of the capsule. By the approach and connection of the cover 522 to the cup 520, The injection lid 40 is then connected or associated to the capsule's lid 81 with the water conduit 89 coming in communication with the water injection tube 88 of the capsule. When the device is in the closed position of FIG. 8, water can be injected at low pressure or just poured into the conduit through the tubular portion 88. Preferably, some water is poured to start wetting the substance in the capsule before the capsule is driven in rotation by the rotational driving means of the device. Then, the control unit starts the motor and the capsule is so driven in rotation at high speed to perform the centrifugal brewing operation. Under the effect of centrifugal forces, the powder substance tends to compact itself radially whereas water is forced to flow through the substance. This results in the substance being both compacted and intimately wetted by water. Due to high speed rotational movement, the centrifugal forces exert themselves uniformly on the mass of substance. Consequently, the water distribution is also more uniform compared to usual methods using a pressure pump to exert pressure on and through the bed of substance. As a result, there is less risk of preferential flow path through the substance which could lead to areas which are not properly wetted and so not properly extracted. With ground coffee powder, the liquid that reaches the internal sidewall of the capsule is so a liquid coffee extract. This liquid extract is then forced to flow upwards along the side of the capsule up to the sealing means 82. The sealing means 82 are thus submitted to an opening force by the liquid under the centrifuge effect. This results in the lip that tends to bend outwardly to create a passage between the surface 85 and the inner surface of the groove. Similarly, the second lip is also forced to bend or alternatively may allow a certain leakage, for example, with premade slits for letting the liquid escape the capsule. The liquid can thus flow through the small peripheral groove 83 and can exit out of the capsule. The brewed liquid can be so collected by the collector 52 and be guided outside of the device into the recipient.

Figure 17:
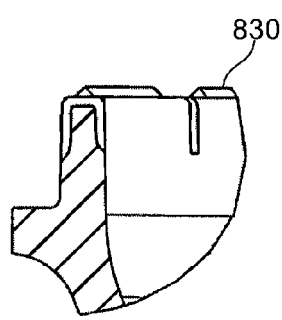
FIG. 17 shows a cross sectional view of a detail of the body of FIG. 16.
Figure 18:
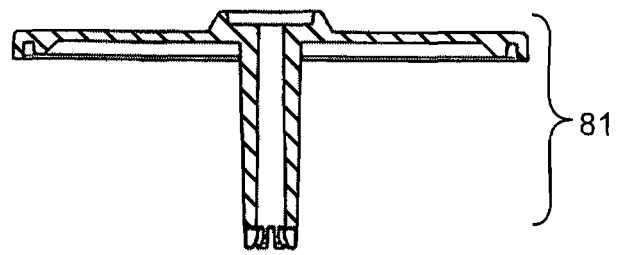
FIG. 18 shows a cross sectional view of the lid of the capsule that connects to the capsule's body of the embodiment of FIGS. 16 and 17.
Figure 19:
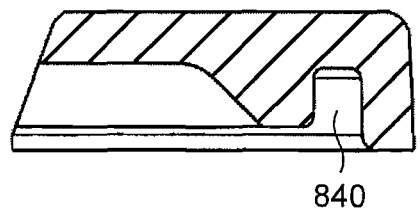
FIG. 19 shows a detail of the lid of FIG. 18.

FIGS. 16 to 19 illustrate another embodiment of the capsule according to the invention. This capsule has a cup-shaped body 80 comprising the same gripping means 840 at its outer surface for enabling the capsule to be driven in rotation in the device. The capsule also comprises a lid 81 shown in FIGS. 18 and 19. Contrary to the capsule of the preceding mode, the lid 80 and body 81 are attached by permanent connecting means such as ultrasonic welding. The brewed liquid that is centrifuged is allowed to pass through a series of slits 810 provided on the upwardly protruding edge 880 of the body. The slits are sized so to act as a filter for retaining the solid particles such as the ground coffee particles but let the liquid leave the capsule. The lid is connected with the edge 880 fitting into a radial groove 840 of the lid 81 (FIG. 19). FIG. 17 also shows small indents 830 serving as energy directors that can melt during the ultrasonic welding. In the present mode, the capsule does not comprise a deflecting sealing lip but it simply has slits 810 for enabling the brewed liquid to traverse the capsule. The capsule of this mode can be used in a device as illustrated in FIGS. 8 and 9.

Figure 20:
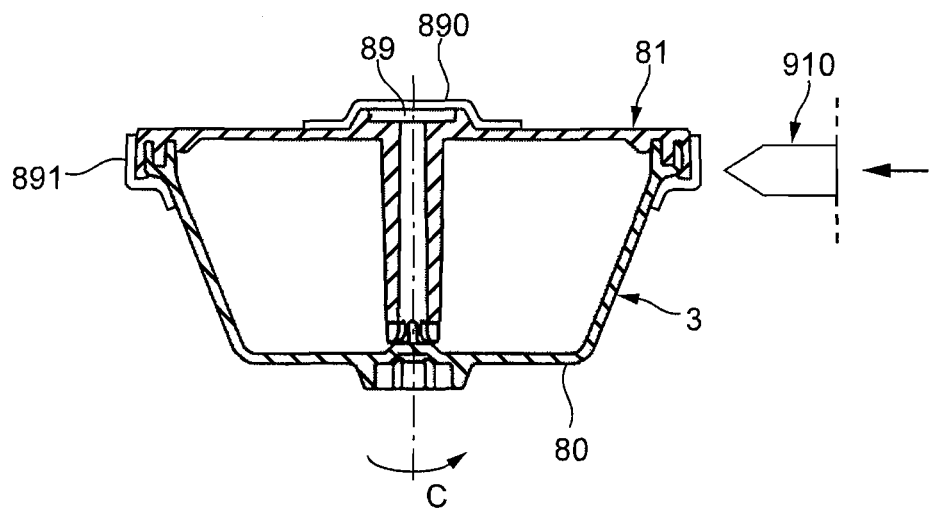
FIG. 20 shows a sealed capsule and an operational mode for removing the seal of the capsule.

In FIG. 20, a sealed capsule of the invention is shown. The capsule is formed, as described in the preceding modes, of a cup-shaped body 80 onto which is assembled a lid 81. The water inlet 89 of the lid is covered by a sealing membrane 890. The radial outlet area placed between the lid and body is also covered by a sealing membrane 891. Note that the same sealing membrane could cover both the water inlet 89 and the outlet area for the brewed liquid. The sealing membrane 891 can be a tamper evidence element such as a ribbon of an adhesive membrane sealed along the line between the lid and body. The ribbon can be cut by a cutting tool 910 in the machine, such as a blade or an equivalent means. As the capsule is driven in rotation (as shown by arrow C), the cutting tool is approached in contact with the ribbon which is thus automatically cut. The capsule is so no longer impervious and liquid can escape the capsule through the radial edge of the capsule as previously explained. One can note that the sealing membrane(s) can also be made of a peelable adhesive material so that the user himself can remove it (them).

Figure 21:
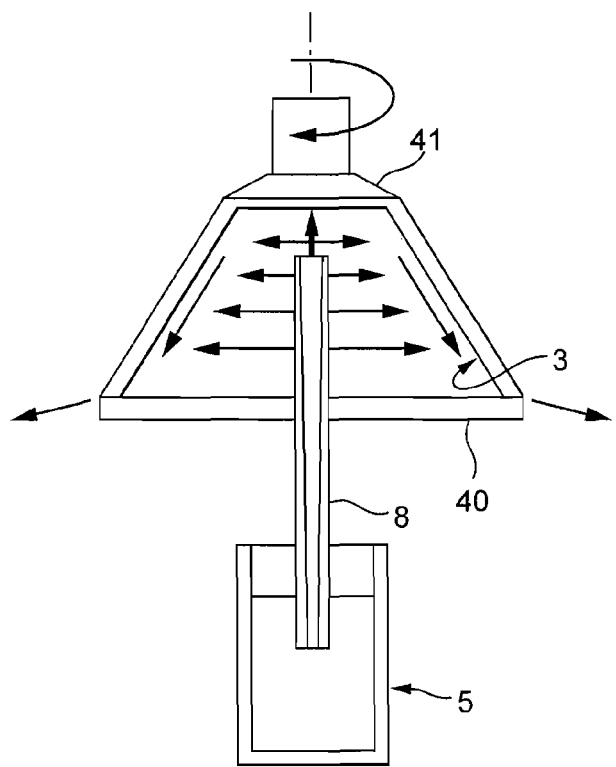
FIG. 21 shows a schematic view of the system of the invention according to another possible embodiment.

According to FIG. 21, the system may also foresee an injection of water by aspiration under the effect of the rotational momentum. For this, a capsule is housed in the referencing means 40, 41. An injection tube 8 connects a water reservoir to the inside of the capsule. The device is so oriented that the reservoir is below the capsule and water is transported by the vacuum that is produced in the centre of the capsule. The injection tube also engages into the capsule up to a region preferably closer to the more narrow side or bottom so that water can wet the whole mass of substance, e.g., ground coffee powder.

Figure 22:
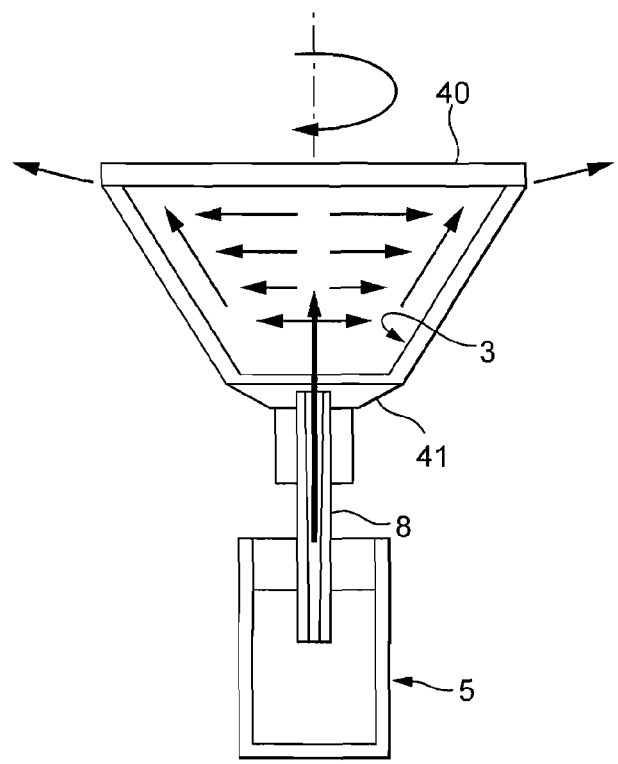
FIG. 22 shows a schematic view of the system according to still another embodiment.

One can note that the capsule can be positioned with its sidewall widening downwardly. In FIG. 22, the system is similar but the orientation of the capsule is simply inverted and it widens upwardly.

In the two embodiments of FIGS. 21 and 22, water is preferably injected near the more narrow side of the capsule, i.e., opposite the widening side, in order for the liquid to flow through the substance in the direction of the wider side of the capsule and to then exit the capsule.

Figure 23:
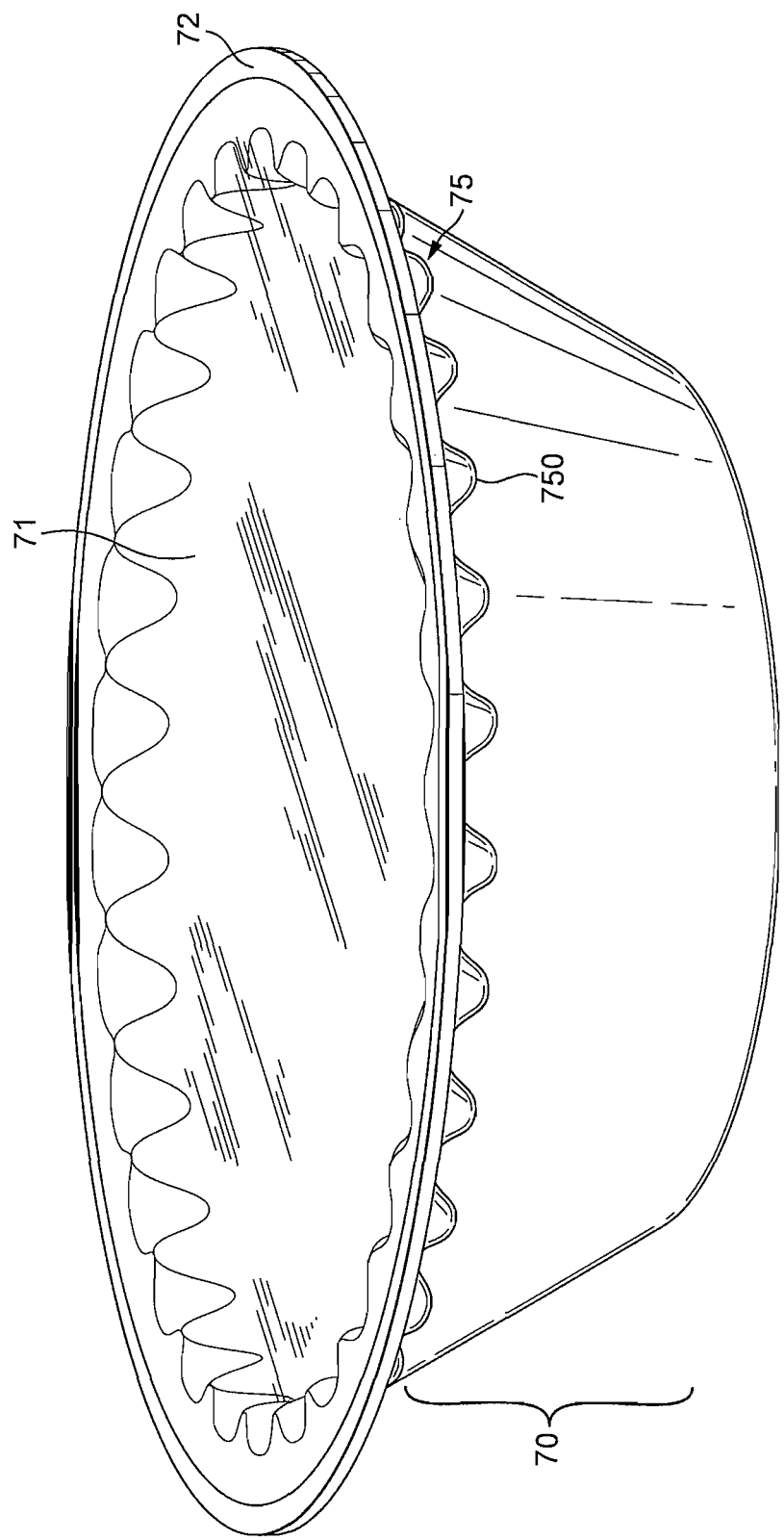
FIG. 23 shows a schematic view of the system according to still another embodiment.

FIG. 23 illustrates another capsule of the invention. The capsule comprises means for connecting it to the external rotational driving means of the device. For this, capsule has a toothed structure 75 on at least one of its outer surface. The capsule has a body 70 comprising an upper edge 72 which can be closed by an upper membrane 71. The toothed structure comprises a series of teeth which is positioned below the edge or rim 72 of the body of the capsule. The teeth are placed along the whole periphery of the body of the capsule. The body of the capsule can be made of plastic and/or aluminium or aluminium alloy. For example, it can be moulded by injection of plastic or deep drawn in aluminium. For example, the shape of the teeth could be slightly triangular, oval, rectangular or pyramidal. It should be noticed that the teeth could be replaced by other equivalent structures such as series of elements in relief and/or hollow. For example, slits, pins or small needles can be envisaged.

Figure 24:
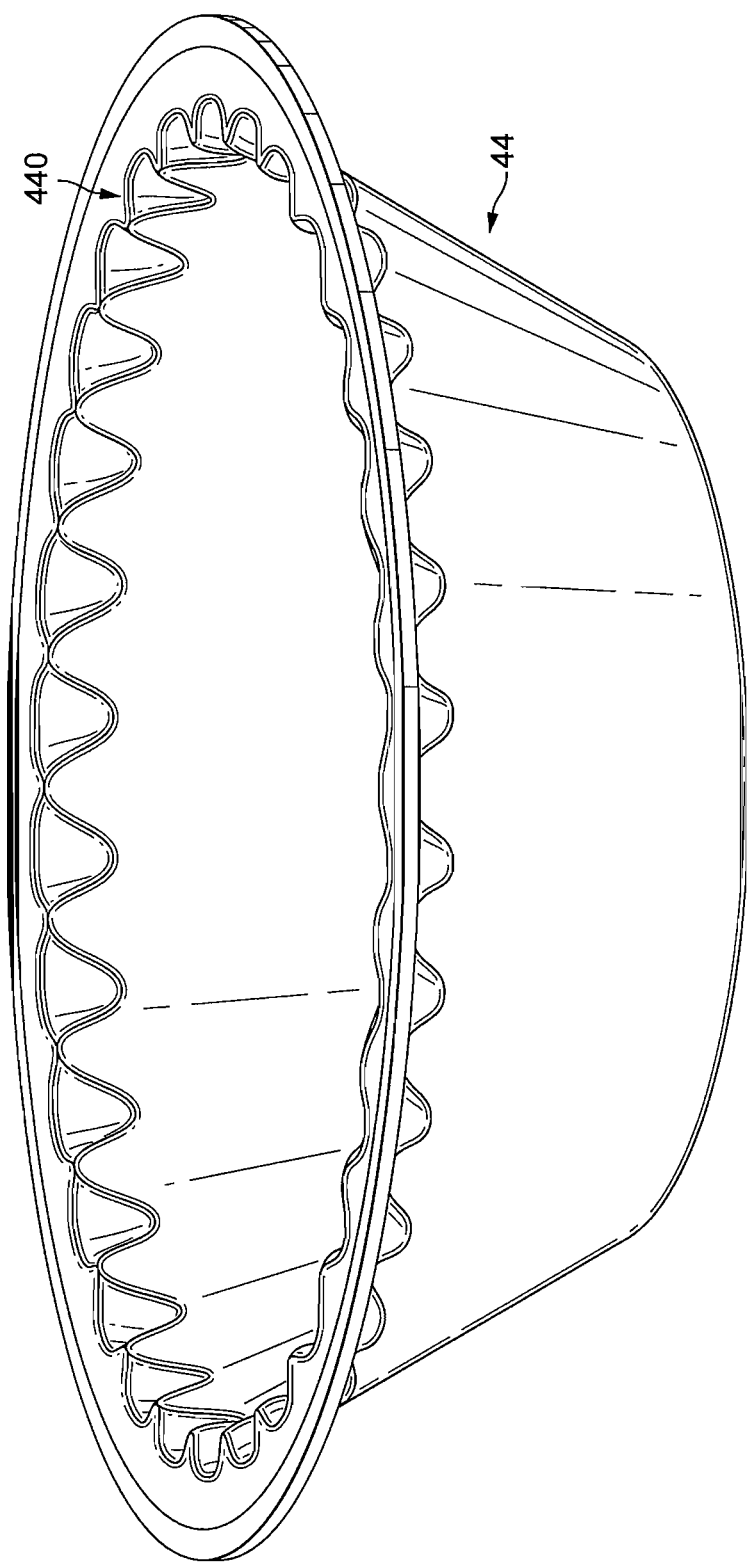
FIG. 24 shows a view of a capsule according to another mode of the invention.

The device itself that receives the capsule of FIG. 23 comprises a toothed surface of complementary shape. FIG. 24 shows a capsule holder 44 adapted to receive the capsule of FIG. 23. The capsule holder has a cavity into which are provided hollow teeth 440. The hollow teeth are arranged to fit the teeth 750 on the outer surface of the capsule.

It should be noted that the connecting or engaging structure of FIG. 23 can replace the structure of the capsule of FIGS. 8 and 9 or reciprocally.

Figure 25:
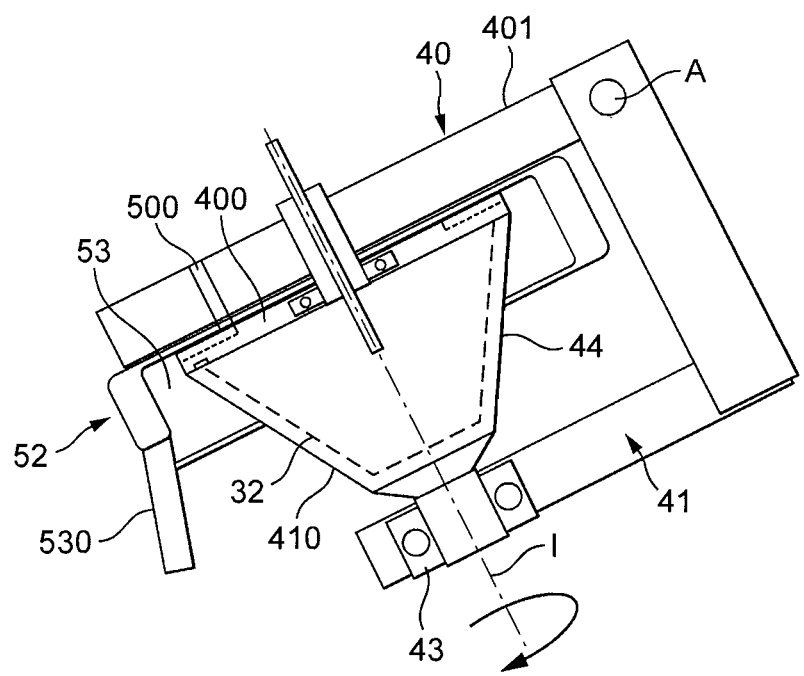
FIG. 25 shows a schematic representation of a brewing module in closed position of the system of the invention according to yet another embodiment of the invention.

In FIG. 25, is illustrated another embodiment of the brewing system of the invention. The difference is here that a water by-pass conduit 500 is provided in addition to the main water conduit 50 for adding a volume of water in the collecting assembly 52. A volume of water may be added before, during or after the centrifugal brewing operation in the capsule. The by-pass conduit ends on the upper surface of the rotating lid 400. The upper surface of the lid 400 may comprise a water distribution structure such as radial grooves or recesses to promote the flow of water toward the surface of the collecting assembly. The control unit may control the delivery of the added volume of water so that the volume is added at the same time as the coffee extract is delivered by centrifugation so that the foam that is created on the top of the beverage is not destroyed.

The invention also relates to a food liquid preparation device for preparing a food liquid from a food substance contained in a single-use capsule, removably insertable in the device, by passing water through the substance in the capsule, comprising a water injection head in the capsule and a capsule holder for holding the capsule in the device, characterized in that it comprises:

a water injector, as part of the water injection head, arranged for introducing water along a central axis relative to the capsule holder, means for driving the capsule holder in centrifugation around an axis of rotation (I) aligned with said central axis of the capsule holder and, at least one opening means for providing at least one liquid delivery outlet in the capsule which is placed in a position relatively offset to said central axis of the capsule holder.

In one mode, the opening means for providing the liquid delivery outlet(s) is at least one piercing member and/or cutting member and/or burning member.

More particularly, the water injecting head comprises a non-moving water injector and a rotary engaging member for engaging the capsule in closure onto the capsule holder. The engaging member thus rotates in conjunction with the capsule holder during centrifugation of the capsule in the device.

In one mode, the opening means of the liquid delivery outlet(s), e.g., piercing members or other means, can be part of the rotary engaging member of the water injection head.

In an alternative possible configuration, the opening means of the liquid delivery, e.g., piercing members or other means, can be part of the capsule holder.

In a mode, the opening means comprises a series of opening means, e.g., piercing members or other means, distributed along a substantially circular path about the central axis.

The opening means, e.g., piercing members, engages the capsule in such a way that the rotational momentum can be transmitted from the device to the capsule.

In a first mode, the opening members, e.g. piercing members, can be arranged in the device in such a manner to pierce the outlet(s) of the capsule during closure of the device about the capsule. In particular, the opening members are mounted on the rotary engaging member or capsule holder to open the capsule, e.g., pierce the liquid inlet(s) in the capsule, during relative engagement or closure of the rotary engaging member and the capsule holder about the capsule. For instance, piercing members are placed sufficiently in relief relative to the surface of the water injection head to pierce the capsule when the head approaches and engages the capsule in closure.

Preferably, the series of piercing members comprises at least four members for forming at least four small liquid delivery outlets at the periphery of the capsule. The piercing members can be distributed at 90-degree intervals therefore providing a homogeneous liquid delivery at the periphery of the capsule.

The piercing members can engage the capsule and so participate to transfer the rotational momentum to the capsule during rotation.

In another mode, the opening members are configured to create the liquid delivery outlet(s) of the capsule after a certain quantity of water is filled in the capsule.

The capsule may comprise a perforable membrane made of an aluminium and/or polymer materials. In particular, the puncturable membrane can have a thickness between 10 and 200 microns.

In a possible aspect of the invention, the water injector also comprises an opening means such as a piercing member. The opening means can be a piercing member arranged as a hollow piercing tube for injecting water in the centre of the capsule.

The piercing member of the water injector has a diameter of less than 5 mm, preferably, between 0.9 and 2.9 mm. Indeed, the pressure in the capsule increases from the centre to the periphery. The pressure of water in the centre can be close to zero but can gradually increase outwardly. Therefore, a small diameter of the injector provides a small inlet in the capsule to reduce the pressure at the inlet side of the capsule.

The driving means of the capsule holder can be directly connected to the capsule holder or indirectly connected to the capsule holder. A direct connection to the capsule holder can be obtained by a rotational drive assembly comprising a rotary motor and a drive transmission connecting the motor to the bottom of the capsule holder. The drive transmission may comprise a suitable gear reduction or amplification to provide the correct transmission rate to the capsule holder in function of the motor speed. An indirect connection to the capsule holder can be obtained by transmission of the rotational momentum from the water injection head to the capsule holder. In this case, the drive transmission of the rotational drive assembly is connected directly to the upper side of the water injection head, in particular to the rotary engaging member of the head.

The device of the invention may receive capsules made of rigid, semi-rigid and/or soft materials. The capsule may be made of materials such as plastics, aluminium, cellulose-based materials or other biodegradable materials, and combinations therefore. Preferably, the capsule has a peripheral wall made of a pierceable membrane. The membrane can form a sealing lid covering a cup-shaped body which receives the food substance to be brewed.

In a mode, a valve means is arranged downstream of the opening means of the at least one liquid delivery outlet of the capsule. The valve means may comprise an annular closure ring and an elastic means for elastically engaging the ring in closure onto a peripheral part, e.g., an edge, of the capsule.

The invention also relates to a method for preparing a food liquid from a food substance contained in a single-use capsule by passing water through the substance comprising:

driving the capsule in centrifugal rotation while introducing water in the centre of capsule, passing water through the substance to form a food liquid, opening at least one liquid delivery outlet in the capsule which is peripherally offset relative to the centre of the capsule and delivering said liquid from said at least one liquid delivery outlet.

In a possible aspect of the method, the at least one liquid delivery outlet is obtained by piercing the capsule in the device. Thus, the capsule can be a gas tightly sealed capsule comprising ingredients such as ground coffee, instant coffee, leaf tea, cocoa, chocolate, a creamer, sweetener, and combinations thereof which can be preserved in protected atmosphere conditions for an extended period of time. The capsule is thus opened at the time of use in the device.

According to an aspect of the method, at least one liquid delivery outlet is obtained by piercing a sealing membrane of the capsule. The membrane can be formed of plastic and/or metal material.

In a mode of the invention, the at least one inlet opening is carried out by mechanical piercing effect of the capsule, e.g., with an external piercing means of the device being displaced relatively to the capsule.

In this case, piercing is carried out when the capsule is inserted in the device such as by effect of the device closing about the capsule.

According to the method, water is introduced in the capsule through an opening of less than 5 mm, preferably between 0.9 and 2.9 mm. As aforementioned, a sufficiently small water inlet is preferred in the capsule in order to reduce the internal pressure of liquid at the inlet side of the capsule and therefore avoid leakage problems.

Preferably, water is introduced in the centre of the capsule after having pierced a water inlet in the centre of the capsule.

According to an aspect of the invention, the food liquid delivered from the capsule is passed via a flow restriction means. The flow restriction means can be configured for providing a pressure drop of at least 0.5 bar of relative pressure during centrifugation. Preferably, the flow restriction means is configured for providing a pressure drop of between 1 and 6 bars, most preferably between 1.5 and 4 bars, of relative pressure during centrifugation. A flow restriction within the flow path of the centrifuged liquid enables to control the release of the centrifuged liquid for improving the interaction of water with the substance within the capsule as well as providing eventually foam to the liquid by the pressure release and the shear stresses which are created at the restriction. More particularly, the flow restriction means enables to maintain a pressure of several bars at the periphery of the enclosure and to retard the release of the liquid.

More particularly, the liquid delivered from the capsule opens a valve for opening when a certain pressure is exerted on the valve by the centrifuged liquid. The valve also regulates the flow of liquid and it reduces the risk of blocking the small outlets provided in the capsule by small size particles, e.g., coffee fines, in particular, at relatively low pressure values. The valve can be part of the capsule or can be part of the device.

As a result, the system of the invention provides a solution for preparing a food liquid wherein a controlled release of the food liquid can be carried out. For example, the release of liquid can be delayed until a certain pressure is exerted on the valve means. A delayed opening of the valve means enables to improve the interaction between water and the substance contained in the capsule and reduces the risk of the flow blocking in the capsule.

For coffee, for example, it may be advantageous to optimize interaction of water and the ground coffee particles to obtain a good extraction of the coffee and aroma compounds. Moreover, the valve means provides a restriction which may improve the creation of foam or coffee crema.

The valve means can be formed by at least one engaging portion of the device which moves relatively to an engaging portion of the capsule under the effect of the pressurized liquid for making a thin annular laminating passage for the liquid. The laminating passage also enables to create a liquid jet of relatively high velocity that impacts on a wall of the device. As a result, a relatively high amount of foam can be created both due to the restriction that is created by the valve means and by the impact of the liquid on the impact surface of the device at a relatively high velocity during centrifugation. Depending on the amount of pressure exerted on the valve means by the centrifuged liquid, the restriction caused by the valve means can differ in amplitude.

In a possible mode, the valve means can be calibrated or adjusted to selectively open a liquid passage through the device at a threshold of pressure in the capsule.

The liquid delivered from the capsule can also be filtered by filtering means provided in the capsule. Such a configuration has many advantages because the device is simplified, the filter does not require cleaning since it is discarded with the capsule.

The invention also relates to a single-use capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:

an upper wall and a bottom wall, a widening side wall connecting to the upper and lower walls and, an enclosure containing a predetermined amount of a food substance.

In a preferred mode, the widening side wall forms an angle Q of less than 80 degrees relative to the upper wall. In particular, the widening side wall forms an angle Q between 50 and 70 degrees, more preferably of about 60 degrees, relative to the upper wall.

Therefore, the angle of the widening sidewall has been determined to promote the exit of the liquid extract from the capsule at the outlet side of the capsule, i.e., at an annular, peripheral portion of the upper wall of the capsule. In particular, an angle of about 60 degrees has shown remarkable results whereas an angle of 85 degrees has shown poor results (i.e., coffee does not come out of the capsule).

Preferably, the upper wall comprises an outlet region dedicated for being opened for release of the beverage. In particular, the outlet region can be a first dedicated peripheral region of said wall.

The upper wall may also comprise a second region which is a central one and which is dedicated for being pierced by a water inlet means of the device. For instance the central region is a circular region of a perforable membrane. Outside of said first and second perforable regions, the upper wall might not be perforable. For this, an inner lid or dish part may be provided below the wall to reinforce it and to prevent accidental perforation of the upper wall, e.g., membrane, by an external piercing means.

In particular, said peripheral outlet region is part of a puncturable membrane which is dedicated for being pierced for providing the beverage outlets. The number of pierced outlets can range of from 1 to 20, preferably of from 3 to 10 outlets. The membrane provides the important advantage that it gives more freedom to create the water inlet and liquid outlets at the suitable locations and in the suitable number.

In order to filter the liquid in the capsule before it is centrifuged out through the (e.g., pierced) outlets, a filter part is positioned in the capsule to separate a cavity containing the substance and a cavity for collecting the centrifuged liquid.

In order to promote the exit of the liquid through the capsule, the filter part can be inclined relative to the widening sidewall. In a particular mode, for a larger filtering area, the filter part can extend across the whole thickness of the enclosure. For instance, the filter part can be substantially cylindrical. More specifically, the filter part can be an integral extension part of an internal lid of the capsule. The capsule can be designed with a limited number of pieces and can be assembled in a more economical and simpler manner. In a different mode, the filter part is substantially parallel to the upper wall. In this case, the filter part is spaced from the upper wall by a small gap. The capsule may thus be designed more compact with an optimized volume of the substance.

According to the preferred configurations of the capsule, the collecting cavity is placed below the peripheral outlet region.

More preferably, the upper and bottom walls have a substantially circular surface. Therefore, the capsule is a member having a form of revolution of central axis which can be inserted in a beverage preparation device for being centrifuged along its axis.

The upper surface can be a puncturable membrane. The lower surface can be the bottom part of a cup-shaped body which also comprises the sidewall and a flange-like rim onto which is sealed the puncturable membrane. The cup-shaped body is preferably made of plastic and/or aluminium materials.

Preferably, the enclosure is partially filled with a substance for enabling the substance to move against a peripheral wall of the capsule during the centrifugation process. The free volume in the enclosure of the capsule is preferably at least partially filled by a protective gas to preserve the freshness of the substance. A suitable protective gas is nitrogen for example. The free volume can also be partially occupied by a gas coming from the substance after degassing of the substance in the capsule. Such gas for ground coffee can be carbon dioxide.

Preferably, the capsule comprises an internal filter portion placed at the periphery of the enclosure. The internal filter portion can be an internal perforated lid and/or a portion of porous material. The cup-shaped body and internal lid can delimit the enclosure of the capsule. The perforated lid has preferably a peripheral portion of wall comprising a plurality of radial slots. The band of porous material can be placed distant from the upper wall inside the capsule. For instance, the perforated portion of lid or porous portion can be placed a few millimeters, e.g., 1-5 mm, away from the upper wall. It can be placed parallel to the upper wall or inclined (e.g. at 90 degrees) with respect to said upper wall. The said portion is not parallel to the widening sidewall but forms an angle with the sidewall of more than 15 degrees, preferably more than 45 degrees. In another mode, the filter could be part of the device or be formed by the puncturable membrane and piercing members.

The capsule can also comprise a collecting recess forming an annular portion below the puncturable membrane. The collecting recess is positioned to collect the centrifuged liquid passing through the filter portion. The collecting recess can be a few millimeters deep, e.g., 1-5 mm and a few millimeters wide, 1-5 mm. The recess also provides a space for enabling outlet piercing elements of the beverage production device to be properly lodged in the capsule.

In a possible mode, the capsule comprises a central tubular portion extending from the upper lid toward the bottom of the enclosure for guiding water in the capsule. More preferably, the central tubular portion has a section which increases toward the bottom for enabling water to force water to move toward the enclosure by centrifugation.

In another aspect, the invention relates to a single-use capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:

an upper wall and a bottom wall, a widening side wall connecting to the upper and lower walls and, an enclosure containing a predetermined amount of a food substance, wherein the upper wall comprises a dedicated peripheral outlet region which is perforable for providing outlets for the release of the liquid.

An alternative embodiment of the invention relates to a capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:

an upper wall and a bottom wall, a side wall connecting to the upper and lower walls and, an enclosure containing a predetermined amount of a food substance, wherein the side wall is cylindrical and, wherein at a least a portion of the side wall forms the outlet side of the capsule for releasing the centrifuged liquid, wherein the capsule also comprises means for sealing it in a gastight manner.

In one characteristic of the capsule, the cylindrical side wall is solid and is intended to be pierced by external piercing means. In this case, the upper wall, lower wall and side wall are connected in a gastight manner.

In another alternative, the cylindrical side wall has outlet openings provided at intervals along its perimeter and a sealing means, e.g., a membrane, which covers the openings in a gastight manner. The outlet openings are preferably provided at about the transversal median plane of the sidewall.

The capsule may comprise a filter means to filter the centrifuged before the liquid is released from the outlets at the sidewall.

In another possible embodiment, the invention relates to a capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:

an upper wall and a bottom wall, a side wall connecting to the upper and lower walls and, an enclosure containing a predetermined amount of a food substance, wherein the side wall has a convex cross section which increases from its junction to the upper and lower walls towards a transversal centre plane of the capsule and, wherein at least a portion of the side wall forms the outlet region of the capsule for releasing the centrifuged liquid.

In a particular design, the side wall is formed of two truncated portions of walls, wherein the larger sections of the truncated portions connect together towards the median transversal plane of the capsule.

In another particular design, the sidewall is formed of a substantially curved convex cross-section such as, for example, a parabolic, ovoid or semi-circular section.

In another particular design, the side wall is formed of a stepped cross section.

In such embodiments, the outlet region of the capsule is preferably provided in the area of the vertex of the convex cross section of the sidewall.

The angle formed by each truncated portion relative to the upper or lower wall it connects to, is preferably lower than 85 degrees.

The capsule may comprise a filter means to filter the centrifuged before the liquid is released from the outlets at the sidewall. Preferably, the filter is distant from the sidewall along the median transversal plane inside the capsule. The filter can be a cylindrical filter extending from the upper wall to the lower wall.

In another possible embodiment, the invention relates to a capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:

an upper wall and a bottom wall, a side wall connecting to the upper and lower walls and, an enclosure containing a predetermined amount of a food substance, wherein the capsule comprises two enclosing members connected at a sealed rim, wherein the sealed rim is configured to open under the effect of pressure of a fluid at the interface of the two members.

An advantage of the preceding embodiment is that a closed capsule can be opened without intervention of the user. Another advantage is that opening can be delayed thus improving the interaction between the substance, e.g., ground coffee, and water in the capsule. The capsule can also be sealed in a gastight manner and include a protective gas to improve freshness of the substance in the capsule.

In particular, the two enclosing members may be two half shelves which are sealed along a transversal median plane. Hence, the capsule can be symmetrical relative to the median plane and it can so be used in two possible orientations. In that respect, it can be noted that the terms "upper" and "lower" are used for practical descriptive reasons but they do not narrow the scope of the protection.

The two members can be flexible foils which are heat or ultrasonically sealed at a flange-like rim. Thus, the sealed rim can break or delaminate by the pressure of liquid that is centrifuged in direction of said rim. The opening by the liquid under pressure enables to control the residence time of the liquid in the capsule and hence improves the interaction of water and substance in the capsule. The time delay may depend on the sealing material at the sealed rim but it also depends on the operational parameters (i.e., rotational speed, water quantity) of the system.

It should be noted that the sealed rim could also be opened by a fluid under pressure which is not the liquid such as by a gas under pressure. A flushing of gas may be provided before the centrifugal operation to open the outlets.

The invention relates to a method for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, wherein the capsule comprises two enclosing members connected at a sealed rim, wherein the capsule is inserted in a centrifuging beverage preparation device and, wherein the sealed rim of the capsule is opened under the effect of the pressure of a fluid at the interface of the two members.

According to the method, the pressure of fluid is the centrifuged liquid.

According to the method, the sealed rim is broken and/or delaminated for creating outlet(s) for the release of the liquid.

The sealed rim may be opened to form discrete outlets or, on the contrary, a continuous peripheral slot.

The opening of the outlets is preferably controlled by engaging surfaces of the beverage preparation device which are distanced from the rim by a controlled gap.

The capsule of the invention provides many advantages over the "open" centrifugal systems of the prior art, in particular:

A higher quality of the delivered liquid obtained by the protection of the substance in the capsule, A more consistent quality of the delivered liquid, Surprisingly, a better crema for coffee (more stable), More beverage variety by the possibility to tailor the capsule technology to the nature of the liquid to be delivered and/or substance in the capsule, A more convenient operation, and A cleaner operation.

In another preferred embodiment, the invention relates to a single-use capsule for preparing a food liquid from a food substance contained in the capsule by introducing water in the capsule and passing water through the substance using centrifugal forces for producing the food liquid which is centrifuged peripherally in the capsule relatively to a central axis of the capsule corresponding to an axis of rotation during the centrifuging operation comprising:

an enclosure containing a predetermined amount of food substance, a plurality of outlet openings of the enclosure for enabling the food liquid to leave the enclosure under the centrifugal forces exerted in the capsule during centrifugation, said outlet openings being arranged at a peripheral portion of wall of the enclosure.

Preferably, the outlet openings are positioned and substantially distributed radially in said portion of wall about the central axis.

Preferably, in order to prolong the freshness of the substance in the capsule during storage, the capsule is made of gastight material. Furthermore, the capsule comprises a sealing foil arranged between the outlet openings and the external environment for closing the capsule in a gastight manner.

In a particular mode, the plurality of outlet openings is provided through an internal portion of wall in the capsule. For instance, the internal portion of wall comprising the outlet openings is closed from the external environment in a gastight manner before the capsule is opened for use in the beverage production device.

Preferably, a collecting recess is provided downstream of the outlet openings of the enclosure to collect the liquid exiting the enclosure in a homogeneous flow. The collecting recess is also preferably an annular portion placed at the periphery of the capsule. The collecting recess is preferably closed on one side by the internal portion of wall and at another side by the sealing foil.

The capsule of the invention is thus designed to enable a liquid to be prepared from a substance contained in an enclosure of the capsule by the effect of centrifugation obtained by rotating the capsule around an axis of rotation which is proper to the capsule.

The plurality of openings provided in the capsule are thus properly arranged for letting the centrifuged liquid leave the enclosure at a location which is substantially peripheral on the enclosure around the axis of rotation of the capsule. Depending on the size of the openings, the plurality of openings may also be given a function to filter the liquid from the solid particles that may be contained in the enclosure such as coffee particles. Furthermore, also when openings are particularly small, i.e., lower than 200 microns, a certain pressure drop, i.e., of about 0.5 to 4 bars of relative pressure, can be created at the peripheral portion of wall.

According to an aspect of the invention, the plurality of outlet openings comprises a series of slots and/or holes provided in said peripheral portion of wall. Slots may be appropriate as they can allow release of liquid at a suitable flow rate while restraining the passage of solid particles.

When slots are provided, the slots may be aligned, e.g., parallel to each other, in at least one array along a peripheral portion of wall of the enclosure. The slots may be of a relatively small length, e.g., of from 0.5 to 5 mm and a small width, e.g., of from 0.08 to 0.6 mm.

Preferably, each of the outlet openings has a diameter or width which is smaller than the average size of the particles forming the food substance.

Therefore, the openings can have a filtering function 'per se'.

The pressure drop at the portion of wall also depends on the size of the openings, the number of openings and the total passage surface area. Therefore, the size of the opening can be designed in the portion of wall to produce a certain pressure drop in the capsule itself. This enables to maintain a certain pressure in the enclosure and so improves the interaction between the food substance and water. Depending on the size of the openings and the centrifugal parameters such as the rotating speed, the characteristics of the beverage can also be tailored, in particular, for coffee beverages.

The diameter or width of the openings may be between 1 and 800 microns, preferably between 10 and 600 microns. The overall surface area of the openings of the peripheral portion of wall is also preferably lower than 50% of the total surface area of said portion of wall, most preferably lower than 40%. In a mode the total surface area of the openings is comprised between 5 and 200 mm$^2$, preferably between 10 and 50 mm$^2$.

A significant pressure drop at the peripheral portion of wall can be obtained when the width or diameter of the holes are less than 200 microns, e.g., between 1 and 200 microns. A pressure drop of from about 1 to 4 bars, more preferably of from 2 to 3 bars, above the atmospheric pressure can be successfully obtained at the portion of wall. For coffee, a liquid extract with a high solids concentration comparable to a ristretto, espresso or lungo-type coffees can be successfully brewed within this range of pressures.

A lower pressure drop is obtained, e.g., lower than 1 bar when the openings have a width or diameter at or above 200 microns and if no flow restriction is placed in the flow path such as an additional valve placed within the liquid flow path in the device that would create a higher pressure drop. In case of a low pressure drop in the liquid flow path, the portion of wall with the large outlet openings can serve to retain the solid particles in the enclosure. However, the liquid tends to leave more quickly the enclosure (i.e., a higher flow rate is created) and less interaction takes place between water and the substance in the enclosure. For coffee, this may lead to a lower solid and aroma concentration of the coffee extracts comparable to a filter-type coffee.

In a possible mode, the portion of wall with the outlet openings can be formed from a paper filter or woven, non-woven fibres, meshed material, porous polymer membrane or combination thereof. In this case, part of the portion of wall can be formed by a band or different parts of the filter, fibres or meshed material. The meshed material can be of metal and/or polymeric wires, for instance. The fibres can be a fabric of polymer and/or natural fibres. In these different cases, the openings can be formed of the pores formed between the fibres of the material. In particular, polymer woven or meshed material or a porous polymer membrane can be both tear resistant and designed with a low porosity, i.e., lower than 200 microns, more preferably between 1 and 100 microns, for providing a significant pressure drop, i.e., within about 1-4 bar. A suitable material can be a PET woven membrane.

In the preferred modes, the capsule also comprises a circumferential beverage collecting recess. The recess can be placed downstream of said plurality of outlet openings, in particular, for collecting the liquid which is projected by centrifugation to the walls of the enclosure and that passes through the outlet openings. The recess can be closed by the sealing lid. Therefore, before leaving the capsule, the centrifuged liquid that leaves the enclosure is collected in the collecting recess. This can ensure that a more homogeneous flow of the liquid leaves the capsule. The recess is also provided to allocate sufficient space in the capsule for enabling piercing members of the beverage preparation device to be introduced in the capsule for making beverage outlets.

According to preferred modes of the capsule, a dished body is provided. The body has, preferably, a sidewall ending by a larger opening section and a closed bottom wall of smaller section. The sidewall thus widens in direction of the opening end.

Preferably, a lid is assembled onto the dished body to close the open end of the body and thus to define with the body, an enclosure which contains the food substance. In particular, the portion of wall comprising the outlet openings can be part of the lid. Such a configuration is relatively simpler to industrially produce and assemble.

In a particular mode, the lid comprises at least one portion of the peripheral recess forming a means for collecting the beverage passing through the outlet openings. For example, the capsule comprises at its periphery, an annular groove of U-shaped section opening outwards, i.e., in a direction opposed to the inside of enclosure, and forming the collecting recessed means. The groove is provided with an inner portion of wall into which are provided the openings, e.g., a series of peripheral slots. The groove can further comprise an outer portion forming an engaging edge which bears onto an inner bearing portion of the dished body. The engaging edge can form a sufficiently sealed interface with the bearing portion of the dished body for preventing liquid from by-passing the openings.

The collecting recess can extend continuously at the periphery of the lid for enabling the centrifuged liquid to better distribute outwardly before leaving the capsule.

In an alternative mode, the collecting recess can be part of the body. For example, the body can be a thermoformed plastic member including the recess. Preferably, the recess is placed at the widened open section of the body.

In a preferred mode, a gastight sealing foil covers at least a portion of the lid. In particular, the sealing foil covers at least the collecting recess. The collecting recess can thus be gas tightly closed before the capsule is used in the beverage production device. As a result, no air from the external atmosphere actually enters the capsule, before its use, through the outlet openings provided in the enclosure, e.g., through the inner portion of lid. The substance, such as coffee or milk, is thus less subject to possible oxidation.

In a mode, the sealing foil is permanently sealed onto the dished body and/or lid and is so made puncturable by piercing water injection means. At the same time, one or more outlets can be formable in the foil for enabling the liquid to leave the capsule, for example, by piercing with one or more piercing/puncturing member foreign to the capsule, e.g., several needles of the beverage production device. For instance, three or four outlets can be pierced in the foil in the region of the collecting recess to enable the centrifuged liquid to leave the capsule an equal number of streams. In another mode, the sealing foil is removably sealed onto the dished body and/or lid and is thus made peelable. In such case, the foil is removed before being inserted in the beverage production device.

In order to enable the sealing foil to be applied onto the dished body, the dished body comprises a peripheral rim for sealing of the foil. Sealing can be applied by ultrasounds or thermal welding for example.

The lid of the capsule can therefore form an inner member which is assembled into the dished body such as by simple insertion or by additional connection means such as welding. When a sealing foil is assembled onto the lid and sealed to the rim of the dished body, the lid can be simply inserted onto a seat of the body, e.g., at the peripheral inner edge of the dished body without further connection, since the foil sealed with sufficient tension at the rim, can prevent the lid from dislodging from the seat of the body.

In additional features of the invention, the lid can comprise at least one inlet port defining a passage for a water injector to be introduced in the capsule. The inlet port in the lid may be normally closed by a puncturable small portion of plastic wall, or can be left open. It may be advantageous to maintain the inlet port closed, e.g., by a breakable plastic part, for preventing substance such as coffee particles from freely leaving the enclosure and occupying the interstice between the lid and the sealing foil. The inlet port is aligned at the central axis of rotation of the capsule. Indeed, when the port is aligned, the water injection part of the beverage production device may be a fixed part of the device and not a rotating part. This greatly simplifies the construction of the device. In another possible feature, the inlet port forms a tubular portion that widens in the direction of the enclosure. Widening of this portion promotes the ejection of water inside the enclosure during the centrifugation.

In the context of the invention, the capsule can contain food substances among a large choice of food ingredients or mixtures of food ingredients. In particular, the substance can be chosen among the ingredients consisting of: ground coffee, soluble coffee, dairy based powder, dairy or non-dairy creamer, cocoa, sweetener, leaf tea, herbal tea, soluble tea, culinary powder, soluble or dispersible nutritional composition, liquid food concentrate and combinations thereof. The capsule can be formed of gastight packaging materials for maintaining the freshness of the substance in the capsule as long as possible. In particular, the dished body can be formed of food grade plastics and at least one gas barrier layer. For example, the dished body is a thermoformed plastic laminate comprising at least one layer of polypropylene (PP) and at least one EVOH gas barrier layer. The dished body and/or lid can be thermoformed or injected in plastics. The lid can be also a porous membrane made of polymer such as PET. In an alternative, the body and/or lid can be deep drawn from thin metal such as aluminium alloy or a complex of plastic and aluminium alloy.

The invention also relates to a capsule for preparing a food liquid from a food substance contained in the capsule by introducing water in the capsule and passing water through the substance using centrifugal forces for producing the food liquid which is centrifuged peripherally in the capsule relatively to a central axis of the capsule corresponding to an axis of rotation during the centrifuging operation comprising:

a cup-shaped body for receiving a predetermined amount of food substance, a portion of wall for delimiting with the body an enclosure containing a food substance, said portion of wall comprising at its periphery a plurality of openings for enabling the food liquid to leave the enclosure under the effect of centrifugation, a closing membrane connected to the body for closing the capsule in a gas-tight manner and, a collecting recess between said portion of wall and said closing membrane.

The invention also relates to a system for preparing a liquid food from a food substance contained in a receptacle by passing water through the substance using centrifugal forces comprising:

a device for receiving the receptacle, said device comprising means for driving the receptacle in centrifugation around an axis of rotation, the receptacle is removable and forms a single-use capsule which comprises an enclosure with a portion of wall comprising a plurality of radial or peripheral outlet openings.

In another preferred embodiment, the invention relates to a system for preparing a food liquid from a food substance contained in a receptacle by passing water through the substance using centrifugal forces comprising:

a device for receiving the receptacle, said device comprising means for driving the receptacle in centrifugation around an axis of rotation, wherein the receptacle is removable and forms a single-use capsule and, wherein a flow restriction means is arranged in the flow path of the centrifuged liquid capable of providing a certain pressure drop during centrifugation.

The flow restriction means can be configured for providing a pressure drop of at least 0.5 bar of relative pressure during centrifugation. Preferably, the flow restriction means is configured for providing a pressure drop of between 1 and 6 bars, most preferably between 1.5 and 4 bars, of relative pressure during centrifugation.

According to an important aspect of the invention, a flow restriction within the flow path of the centrifuged liquid enables to control the release of the centrifuged liquid for improving the interaction of water with the substance within the capsule as well as providing eventually foam to the liquid by the pressure release and the shear stresses which are created at the restriction. More particularly, the flow restriction means enables to maintain a pressure of several bars at the periphery of the enclosure and so retards the release of the liquid.

In a possible mode, the device comprises a flow restriction means which is arranged after the outlet(s) of the capsule.

In particular, the flow restriction means can be part of the device itself.

In a preferred mode, the flow restriction means of the device comprises a valve means which opens or enlarge a liquid passage when a sufficient pressure of the centrifuged liquid is exerted on the valve means so that the liquid can release from the capsule out of the device.

The flow restriction means can be placed at or after the outlet of the capsule.

In a possible mode, a flow restriction means can be arranged in the capsule itself. In particular, a flow restriction means can be formed by openings. The openings may be a series of slots or holes in a peripheral portion of wall of the enclosure. Preferably, the series of slots or holes have a width or diameter that is lower than the average particle size of the substance contained in the enclosure of the capsule.

Preferably, the outlet openings of the enclosure of the capsule have an average diameter or width which is smaller than the average size of the particles forming the food substance.

Therefore, the openings can have a filtering function 'per se'.

The pressure drop at the portion of wall also depends on the size of the openings and free opening surface area of the openings. Therefore, the size of the opening and free opening surface area of the openings can be designed in the portion of wall to produce a certain pressure drop in the capsule itself This enable to maintain a certain pressure in the enclosure and so improves the interaction between the food substance and water. Depending on the size of the openings and the centrifugal parameters such as the rotating speed, the characteristics of the beverage can also be tailored, in particular, for coffee beverages.

Preferably, the diameter or width of the openings may be between 10 and 600 microns. Preferably, the total surface area of the openings is comprised between 5 and 200 mm$^2$. Most preferably, the total surface area is comprised between 10 and 50 mm$^2$.

A significant pressure drop at the peripheral portion of wall can be obtained when the width or diameter of the holes are less than 200 microns, e.g., between 1 and 200 microns. A pressure drop of from about 1 to 4 bar, more preferably of from 2 to 3 bar, above the atmospheric pressure can be successfully obtained at the portion of wall.

For coffee, a liquid extract with a high solids concentration comparable to a ristretto, espresso or lungo-type coffees can be successfully brewed within this range of pressures.

A lower pressure drop is obtained, e.g., lower than 1 bar when the openings have a width or diameter at or above 200 microns and if no flow restriction is placed in the flow path such as an additional valve placed within the liquid flow path in the device that would create a higher pressure drop. In case of a low pressure drop in the liquid flow path, the portion of wall with the large outlet openings can serve to retain the solid particles in the enclosure. However, the liquid tends to leave more quickly the enclosure (i.e., a higher flow rate is created) and less interaction takes place between water and the substance in the enclosure. For coffee, this may lead to a lower solid and aroma concentration of the coffee extracts comparable to a filter-type coffee.

Preferably, the flow restriction means of the device comprises a valve means of the device, which is arranged at or after the outlet(s) of the capsule, for opening when a certain pressure is exerted on the valve means so that the liquid can release from the capsule out of the device.

In a possible mode, both the device and capsule comprise flow restriction means. Alternatively, the flow restriction means is present in the capsule and not in the device.

A valve means in the device provides the advantage of a control of the pressure of liquid exerted in the capsule at the level of the device. The valve means can be designed to open at a certain pressure threshold, for example by calibration or adjustment, for matching the features of various or specific beverages, e.g., coffee extract, tea extract, instant beverages, etc.

As a result, the system of the invention provides a solution for preparing a food liquid wherein a controlled release of the food liquid can be carried out. For example, the release of liquid can be delayed until a certain pressure is exerted on the valve means which is sufficient to form a passage for flow of liquid. A delayed opening of the valve means enables to improve the interaction between water and the substance contained in the capsule. For coffee, for example, it may be advantageous to optimize interaction of water and the ground coffee particles to obtain a good extraction of the coffee and aroma compounds. Moreover, the valve means provides a restriction which may improve the creation of foam or coffee crema.

The valve means can be formed by at least one engaging portion of the device which moves relatively to an engaging portion of the capsule under the effect of the pressurized liquid for making a thin annular laminating passage for the liquid. The engaging portion of the capsule can be, for instance, a radial portion of edge of the capsule. The laminating passage also enables to create a liquid jet of relatively high velocity that impacts on a wall of the device. As a result, a relatively high amount of foam can be created both due to the restriction that is created by the valve means and by the impact of the liquid on the impact surface of the device at a relatively high velocity during centrifugation. Depending on the amount of pressure exerted on the valve means by the centrifuged liquid, the restriction caused by the valve means can differ in amplitude.

According to an aspect of the invention, at least one of said engaging portions of the valve means is spring loaded to move away relatively to the other engaging portion under the force of the centrifuged liquid. In particular, the engaging portion of the device can be associated to a spring loading member. For instance, the spring loading member is a rubber elastic member or a mechanical spring. The spring loading member can be an O-ring, an helicoidal or blade-type spring or any equivalent means.

For example, the engaging portion of the valve means can also comprise an annular pressing edge which is arranged to seal on the engaging portion of the capsule. The pressing edge may take different forms such as a V, W or U shape in order to exert a sufficient sealing pressure on the capsule when the pressure of liquid is still under a predetermined threshold.

In a mode, the annular rim of the capsule can also be deflectable to move away from the engaging portion of the valve means under the effect of the pressurized fluid. The engaging portion of the valve means can also be fixed or resiliently mobile and the engaging portion of the capsule can be deflectable under the effect of pressurized liquid. Thus, the effect of valve can also be obtained partially or totally by a deflecting part of the capsule that deflects under the pressure of liquid that exits the capsule.

In a preferred mode, the device comprises a water injection subassembly for injecting water in the capsule comprising at least one piercing member that is substantially aligned with the axis of rotation of the capsule. Preferably, the piercing member has a tubular passage for injecting water into the capsule along said axis of rotation.

The invention also relates to a liquid food preparation device for preparing a liquid food from a food substance contained in a single-use capsule, removably insertable in the device, by passing water through the substance using centrifugal forces comprising:
water injection means for introducing water in the capsule,
means for positioning and centring the receptacle along an axis of rotation, and
means for driving the capsule in centrifugation around the axis of rotation,
wherein it comprises a flow restriction means which is arranged within the flow path of the centrifuged liquid.

Preferably, the flow restriction means comprises valve means which is arranged at or after at least one outlet of the capsule for opening when a certain pressure is exerted thereon by the pressurized liquid for enabling the liquid to be released from the capsule.

In a possible mode, the valve means can be calibrated or adjusted to selectively open a liquid passage through the device at a threshold of pressure in the capsule.

In a preferred mode, the valve means can be formed by at least one engaging portion of the device which is adapted to move relatively to an engaged portion of the capsule under the effect of the pressurized liquid exiting the capsule, for making a thin annular laminating passage for the liquid.

The valve means can be formed by at least one engaging portion which moves relatively to another engaging portion under the effect of the pressurized liquid exiting the capsule, for making a thin annular laminating passage for the liquid.

In a possible mode, the flow restriction means comprises a peripheral portion of wall of the capsule placed in the liquid flow path exiting the enclosure of the capsule and comprising outlet openings of less than 200 microns, more preferably between 10 and 150 microns. At this size of the openings, a pressure drop of several bars can be maintained in the enclosure which is efficient for enabling an efficient interaction between water and the substance, in particular, for ground coffee. The overall surface area of the openings of the peripheral portion of wall is also preferably lower than 50% of the total surface area of said portion of wall, most preferably lower than 40%.

The invention further relates to a method for preparing a food liquid from a food substance contained in a receptacle by passing water through the substance using centrifugal forces comprising:
driving the receptacle in centrifugal rotation while introducing water in the capsule,
passing water through the substance to form a food liquid, and
collecting the centrifuged food liquid,
characterized in that:
the receptacle is a single-use capsule and,
a flow restriction means is arranged within the flow path of the centrifuged liquid.

In a preferred mode, the flow restriction means comprises a valve means allowing food liquid to be released only when a certain pressure of the centrifuged liquid is reached at the valve means.

Preferably, the selective release of beverage is controlled by a spring-biased valve.

The flow restriction means can comprise a plurality of outlet openings such as slots or holes which can be provided in a peripheral portion of wall of the capsule.

The flow restriction means can comprise the combination of a valve means for controlling the release of centrifuged liquid at a certain threshold of pressure and a plurality of outlet openings provided in the capsule. The plurality of outlet openings is preferably provided in an inner wall of the capsule and a collecting recess of the capsule is placed downstream of the inner wall. The collecting recess can be delimited by the inner wall and a pierceable surface of the capsule The method further comprises controlling the release of food liquid by a spring-biased valve.

In particular, the food liquid leaves the capsule by at least one outlet pierced through an upper pierceable surface of the capsule. In particular, several outlets are pierced in the upper surface of the capsule which are spaced apart on the upper surface and close to the sidewall of the surface. According to the method of the invention, water can be introduced in the capsule along the rotation axis of the capsule. Water can be introduced at relatively low pressure or a pressure close to gravity.

Figure 26:
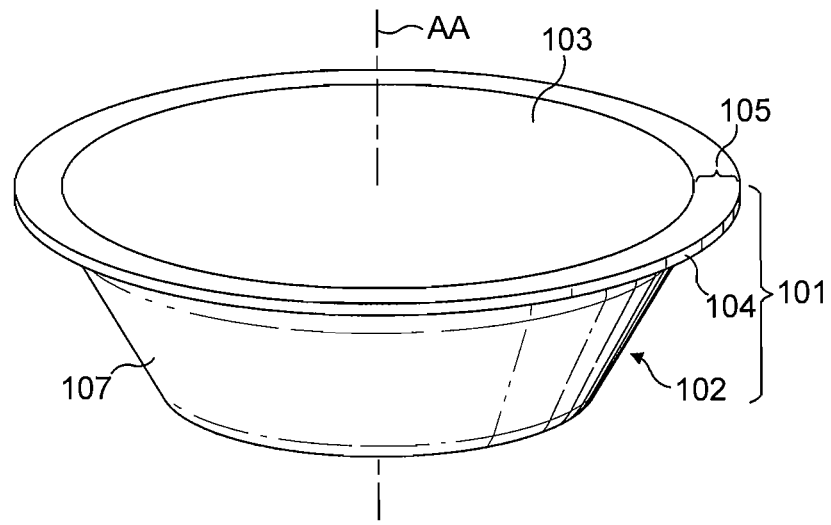
FIG. 26 is a perspective view from above of a capsule of the invention.
Figure 27:
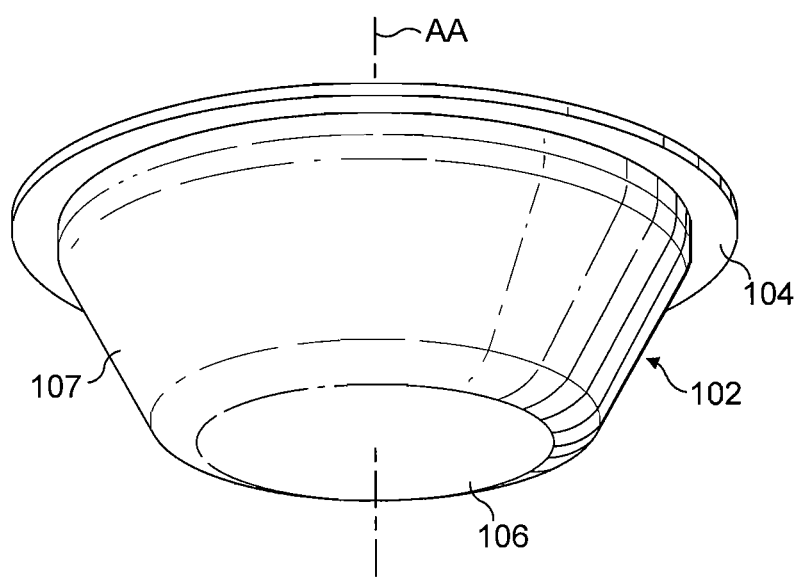
FIG. 27 is a perspective view from below of the capsule of the invention.
Figure 28:
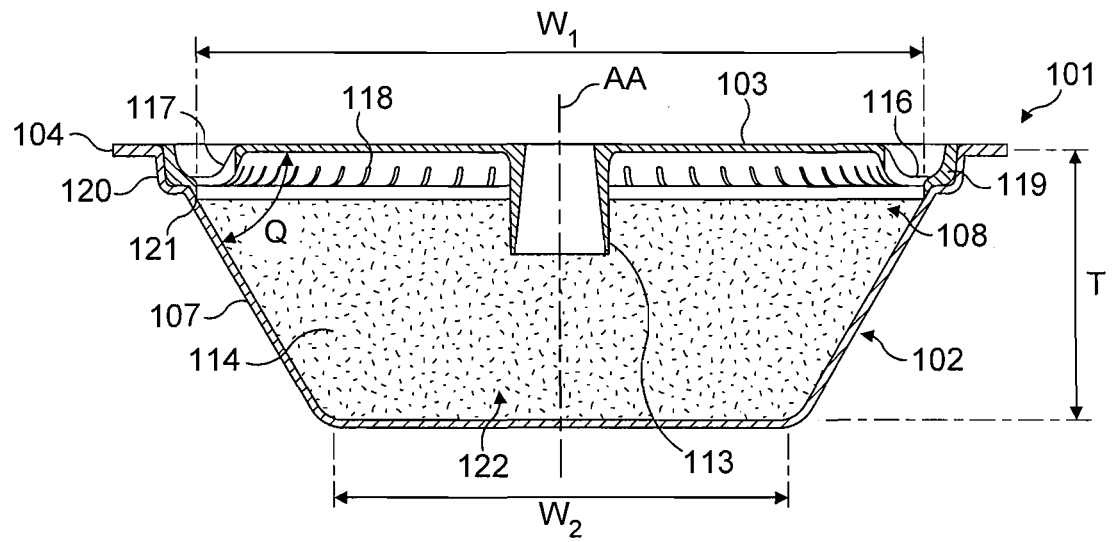
FIG. 28 is a cross-sectional view of the capsule with the sealing foil removed.
Figure 29:
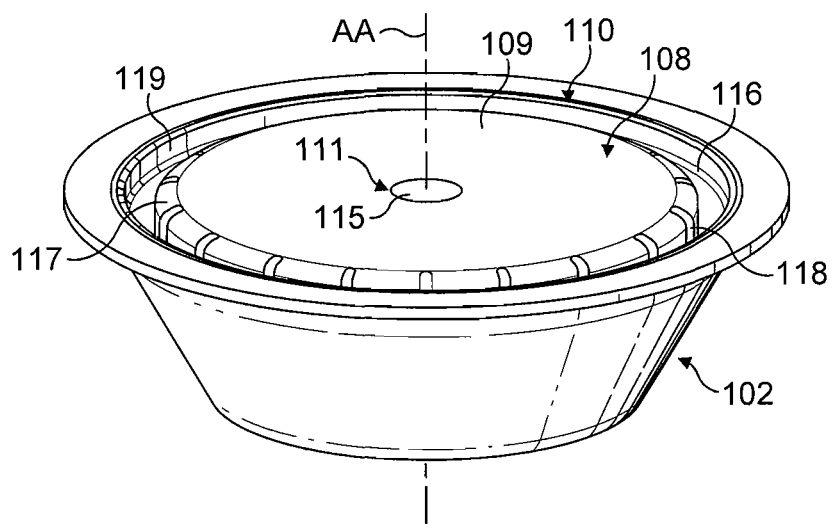
FIG. 29 is a perspective view of the capsule of the invention.
Figure 30:
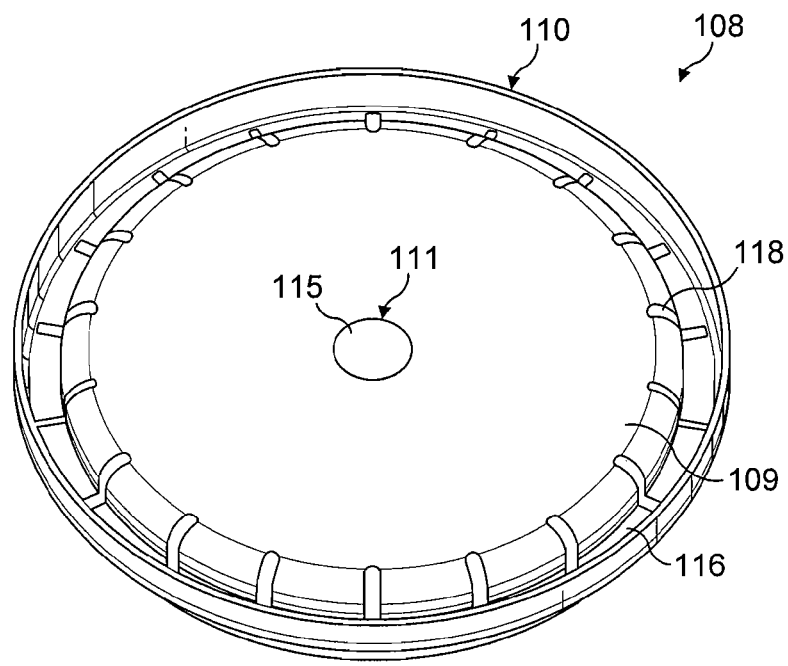
FIG. 30 is a perspective view of the lid from above of the capsule of the invention.
Figure 31:
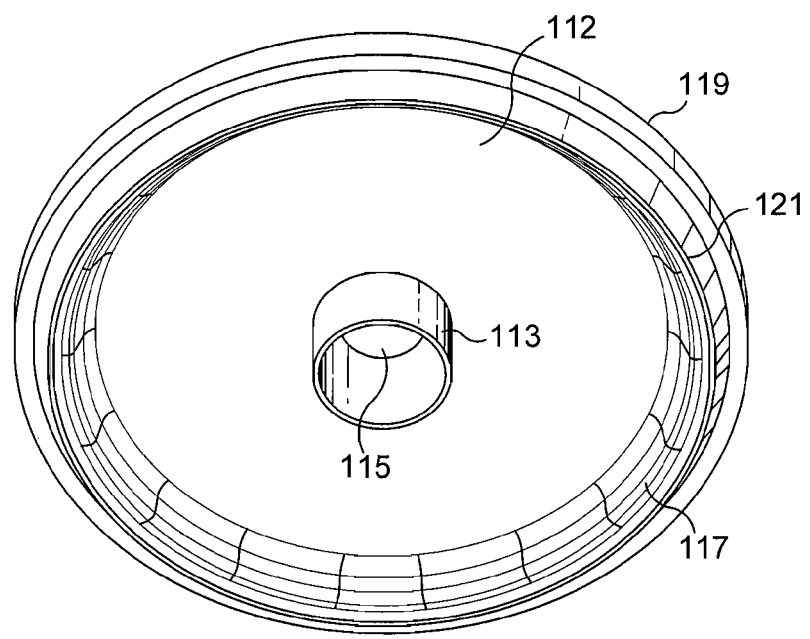
FIG. 31 is a perspective view of the lid from below of the capsule of FIG. 29.

As shown in FIGS. 26 and 27, a preferred capsule 101 of the invention generally comprises a dished body 102 onto which is sealed a sealing foil 103. The sealing foil 103 is sealed onto a peripheral rim 104 of the body at a sealing annular portion 105. The rim 104 can extend outwards forming a small annular portion, e.g., of about 2-5 mm. The dished body comprises a bottom wall 106 and a side wall 107 which preferably widens in direction of the large open end of the body opposed to the bottom wall. The dished body is preferably rigid or semi-rigid. It can be formed of a food grade plastics, e.g., polypropylene, with a gas barrier layer such as EVOH and the like or aluminium alloy or a complex of plastic and aluminium alloy. The sealing foil 103 can be made of a thinner material such as a plastic laminate also including a barrier layer or aluminium alloy or a combination of plastic and aluminium alloy. The sealing foil is usually of a thickness between 30 and 250 microns, for example. The sealing foil member can be pierced for creating the water inlet and the beverage outlet(s) as will be described later in the description.

In relation to the embodiment of FIGS. 28 to 31, the capsule of the invention comprises an inner member forming a lid 108 which is inserted in the dished body. The lid 108 and body 102 delimit together an internal enclosure 114 for receiving the food substance 122. Preferably, the capsule forms a symmetry of revolution around a central axis AA. However, it should be noted that the capsule may not necessarily have a circular section around axis AA but may take another form such as a square or a polygonal form. The lid 108 is illustrated in FIGS. 130 and 131. The lid can take the form of a disc of plastic comprising a central portion 109 and a peripheral portion 110. The central portion can be substantially flat and may comprise a inlet port 111 for enabling the introduction of a water injection member of the beverage production device. In the internal side 112 of the lid, the inlet port can extend by a tubular inlet portion 113 which serves for ensuring the water is guided toward the direction of the bottom of the body to ensure complete wetting of the substance in the enclosure and so reduced risk of leaving for example "dry powder spots". Preferably, the inlet port is closed by a breakable or puncturable closure part 115. This part serves to prevent substance of the enclosure from filling the interstice between the upper surface of the lid and the sealing foil.

The lid further comprises a peripheral portion 110 including a collecting recess 116. The collecting recess forms a U-shape in transversal section (FIG. 28) which opens in the direction of the sealing foil. The recess is preferably continuously extending at the periphery of the lid although it can be replaced by several discontinuous recessed portions which may be separated by reinforcing elements or walls, for example. The collecting recess comprises an inner peripheral portion of wall 117 into which is provided a series of outlet openings 118 forming a fluid communication between the enclosure 114 and the collecting recess 116.

Preferably, the capsule is dimensioned so that it provides an optimal receptacle into which liquid can centrifuge from the central axis towards the peripheral portion 117. In particular, the upper wall formed by the sealing membrane 103 has a width "$W_1$" which is greater than the width "$W_2$" of the bottom wall 106 of the capsule. For example, $W_1$ is comprised between 1.2 and 2 times the width $W_2$, most preferably, 1.3 and 1.8 times $W_2$. The distance "T" between the upper wall and the bottom wall is also preferably comprised between 0.15 and 1.0 times $W_1$. For instance, the enclosure of the capsule has upper wall of $W_1$ (diameter) between 50 and 120 mm, a lower wall of $W_2$ (diameter) between 30 and 80 mm and a thickness "T" of between 10-50 mm. The angle "Q" of the widening side wall is preferably lower than 80 degrees relative to the upper wall, preferably comprised between 50 and 70 degrees.

The outlet openings also form a restriction in the flow of the centrifuged liquid in the enclosure. The centrifuged liquid is forced to pass the openings which can be sized as a function of the type of beverage to be produced. For instance, for espresso or ristretto coffee extract, it can be advantageous to provide smaller openings than for lungo or "Americano" coffee extract. For a same rotational speed, smaller openings create a higher resistance to the centrifuged liquid which remains longer in the capsule. As a consequence, the interaction between water and the coffee particles is higher and liquid can charge more in coffee solids.

As illustrated in this embodiment, the openings may be slots or holes which are distributed at intervals in the inner peripheral portion of wall 117. For example, the number of slots can range of from 5 to 200, preferably of from 10 to 100. These slots have preferably a width that is smaller than the statistical average size of the particles of the substance. For example, the slots have a width of less than 500 microns, preferably lower than 400 microns, most preferably between 50 and 200 microns, for a substance which is ground coffee. The slots may extend if necessary on the central portion 109 or in the bottom of the recess 116. The slots can be replaced by holes of circular section having a diameter smaller than the statistical average size of the particles of the substance.

Figure 38:
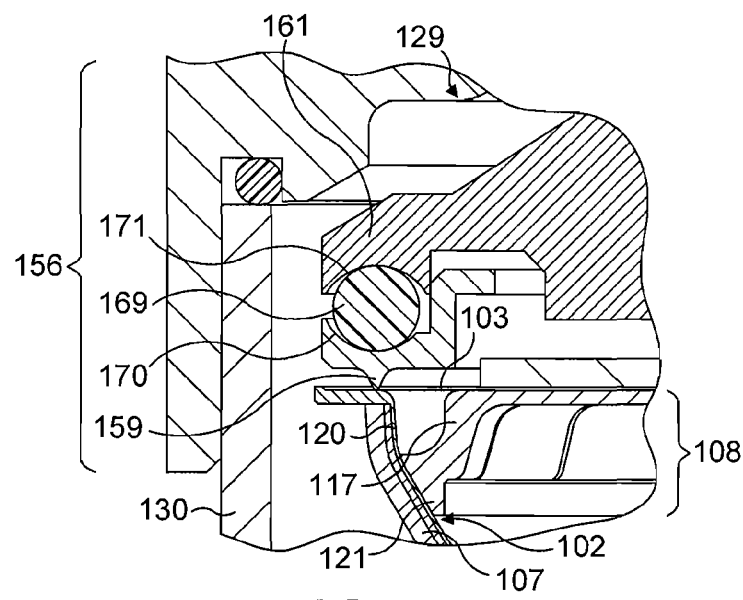
FIG. 38 is a detail view of the module of FIG. 37.

The collecting recess 116 forms a peripheral annular groove of small depth, e.g., between 2 and 10 mm to allow the introduction of piercing members through the sealing foil to produce outlets for the brewed liquid which is produced in the capsule as will explained later in the description. The collecting recess is open upwardly toward the sealing membrane which seals it. The collecting recess 116 further comprises an outer peripheral portion 119 forming an edge bearing onto a seat portion 120 of the dished body. The outer portion 119 can be engaged in the seat portion 120 by a more or less tight fit engagement. An additional sealing portion 121 extending along the internal surface of the side wall of the body and in the direction of the bottom of the dished body can extend from the recess to create further sealing against possible ingress of liquid between the lid and the inner surface of the body of the capsule. Of course, the form of the collecting recessed means can take different configurations without departing from the scope of the invention. For example, the recess 116 can be formed by the lid 108 and the side wall 107 of the dished body (as illustrated in FIG. 38). In this case, the outer peripheral portion 119 can be omitted.

As illustrated in the figures, the series of outlet openings, e.g., slots 118, are preferably placed at or close to the widening part of the enclosure relative to the central axis AA. Therefore, the centrifuged liquid will tend to be guided along the inner surface of the side wall of the body, up to the inner side 112 of the lid, and then through the slots.

The lid 108 is fully closed by the sealing foil 103 when it is sealed onto the rim of the dished body. In a possible alternative, the sealing foil could cover only the collecting recess including the region of the slots.

It should be noticed that the lid 108 can be a rigid or semi-rigid member made of thermoformed or injected plastic for instance. However, this part could also be made of a flexible membrane which is sealed to the inner surface of the dished body without departing from the scope of the invention.

It can also be noticed that a filter wall can also be placed inside the enclosure against the inside surface 112 of the lid. A filter wall can provide an improved filtration, for example, for substance of very thin particle size and/or for delaying the release of the centrifuged liquid out of the enclosure by creating a higher pressure drop. A filter wall can be a paper filter or thin plastic film which is glued onto the surface 112 of the lid.

The lid can be simply inserted in the dished shaped body or be fixed by any suitable connection means such as by ultrasonic welding.

Figure 32:
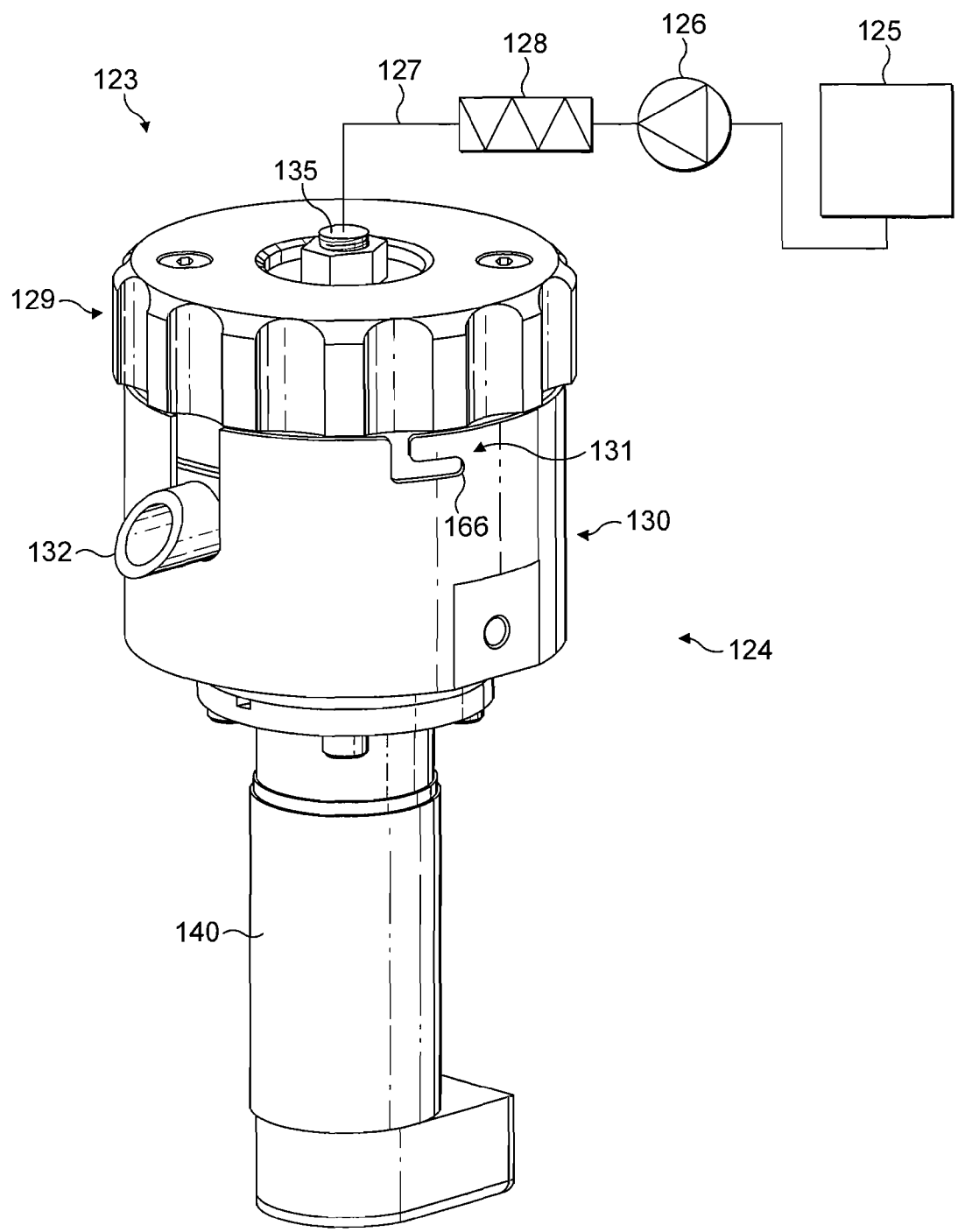
FIG. 32 is a perspective view of the beverage production device of the invention.
Figure 33:
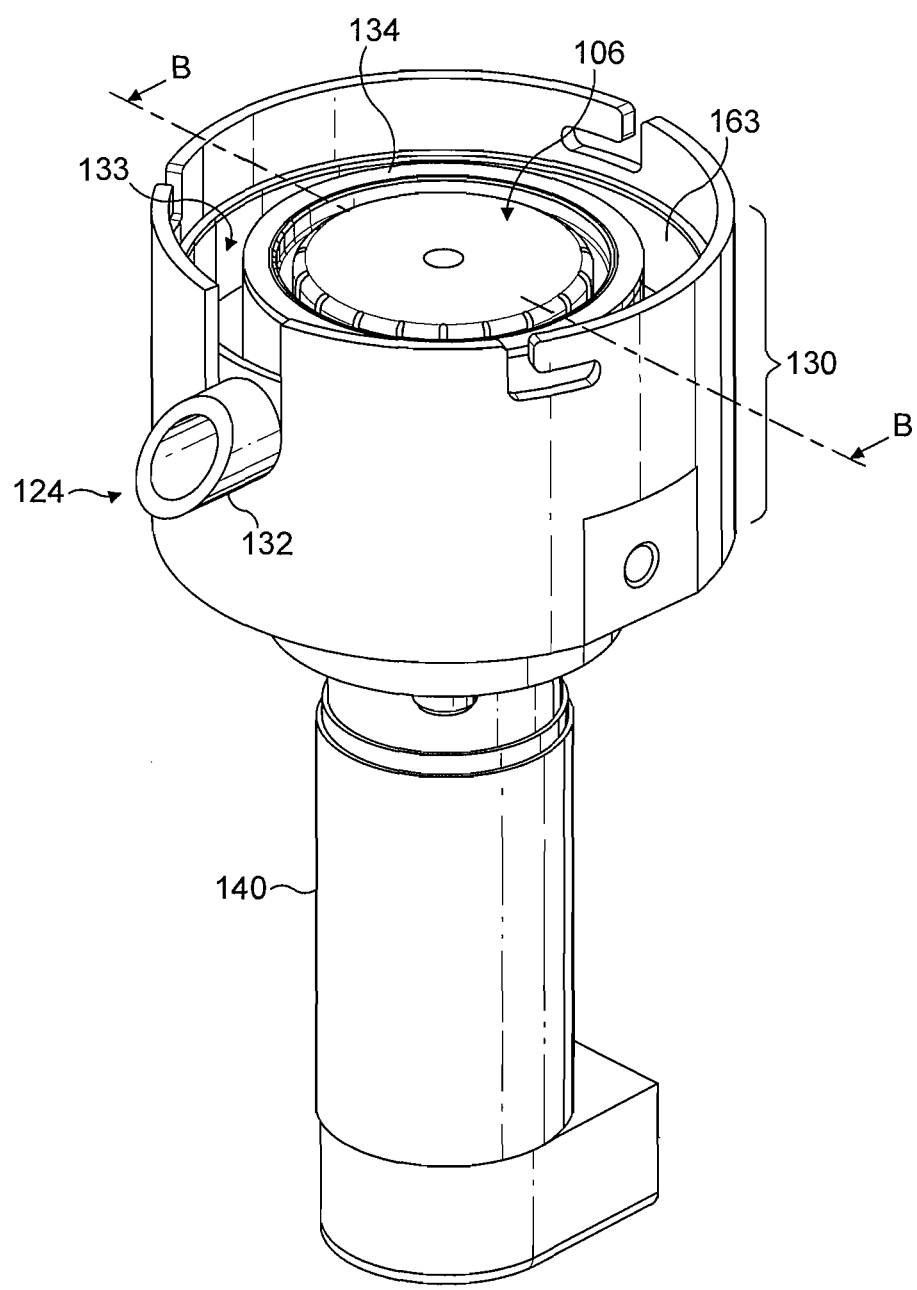
FIG. 33 is a perspective view of the beverage production module in open mode.

In one embodiment of the invention, the system includes a capsule of the invention and a beverage preparation device, as illustrated in FIGS. 32 and 33.

Thus, the system comprises a capsule 101 as aforementioned and a beverage preparation device 123. The device has a module 124 into which a capsule can be inserted. The capsule contains a food substance for being brewed and the capsule is removed from the module after use for being discarded (e.g., for waste or recycling of the organic and inorganic raw materials). The module 124 is in fluid communication with a water supply such as a water reservoir 125. A fluid transport means such as a pump 126 is provided in the fluid circuit 127 between the module and the water supply. A water heater 128 is further provided to heat water in the fluid circuit before water enters the module. The water heater can be inserted in the fluid circuit to heat fresh water coming from the reservoir or alternatively can be in the water reservoir that becomes a water boiler in such case. Of course, water can also be taken directly from a domestic water supply via a water plug connection.

Water can be fed in the beverage preparation module 124 at low pressure or even at gravity pressure. For example, a pressure of between 0 and 2 bar above atmospheric pressure can be envisaged at the water inlet of the module. For instance, the water pump can deliver a water pressure and flow rate sufficient to provide a continuous water flow (i.e., without flow shortage due to the centrifuge pumping effect in the capsule) at the operational centrifugal speeds during centrifugation. Water at higher pressure than 2 bar could also be delivered if a pressure pump is utilized such a piston pump.

The brewing module 124 can comprise two main capsule encasing sub-assemblies 129, 130; mainly comprising a water injection sub-assembly or water injection head and a liquid receiving subassembly including a capsule holder. The two subassemblies form positioning and centring means for the capsule in the device.

The two assemblies close together to encase a capsule therein for example by a bayonet-type connection system 131. The liquid receiving subassembly 130 comprises a liquid duct 132, for example, protruding on a side of the subassembly for guiding the centrifuged liquid coming out of the capsule to a service receptacle such as a cup or glass. The liquid duct is in communication with a liquid receiver 133 forming an annular U- or V-shaped cavity 163 placed about a capsule holder formed by a rotating drum 34 into which the capsule is inserted as illustrated in FIG. 33. The liquid receiver defines with the drum an intermediate cavity 163 for collecting the liquid as will be explained later in the description. Below the liquid receiving subassembly 130, are placed means for driving the capsule receiving drum 134 in rotation inside the subassembly.

The driving means comprise preferably a rotary motor 140 which can be supplied by electricity or gas power.

The water injection subassembly comprises a water inlet side comprising a water inlet 135 communicating upstream with the water fluid circuit 127.

Figure 34:
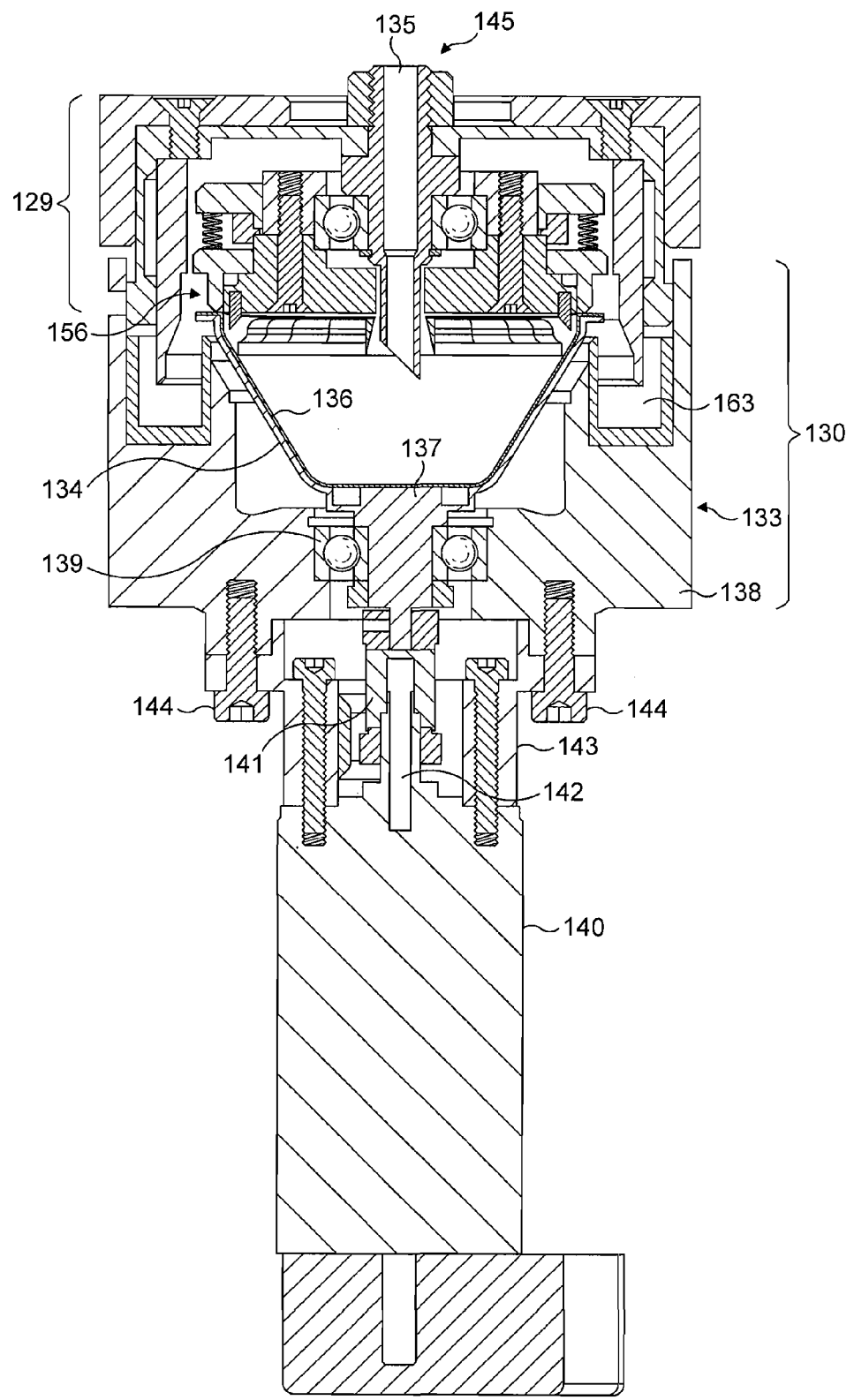
FIG. 34 is a cross-sectional view along line B-B of the beverage production module in a closed mode about the capsule.
Figure 35:
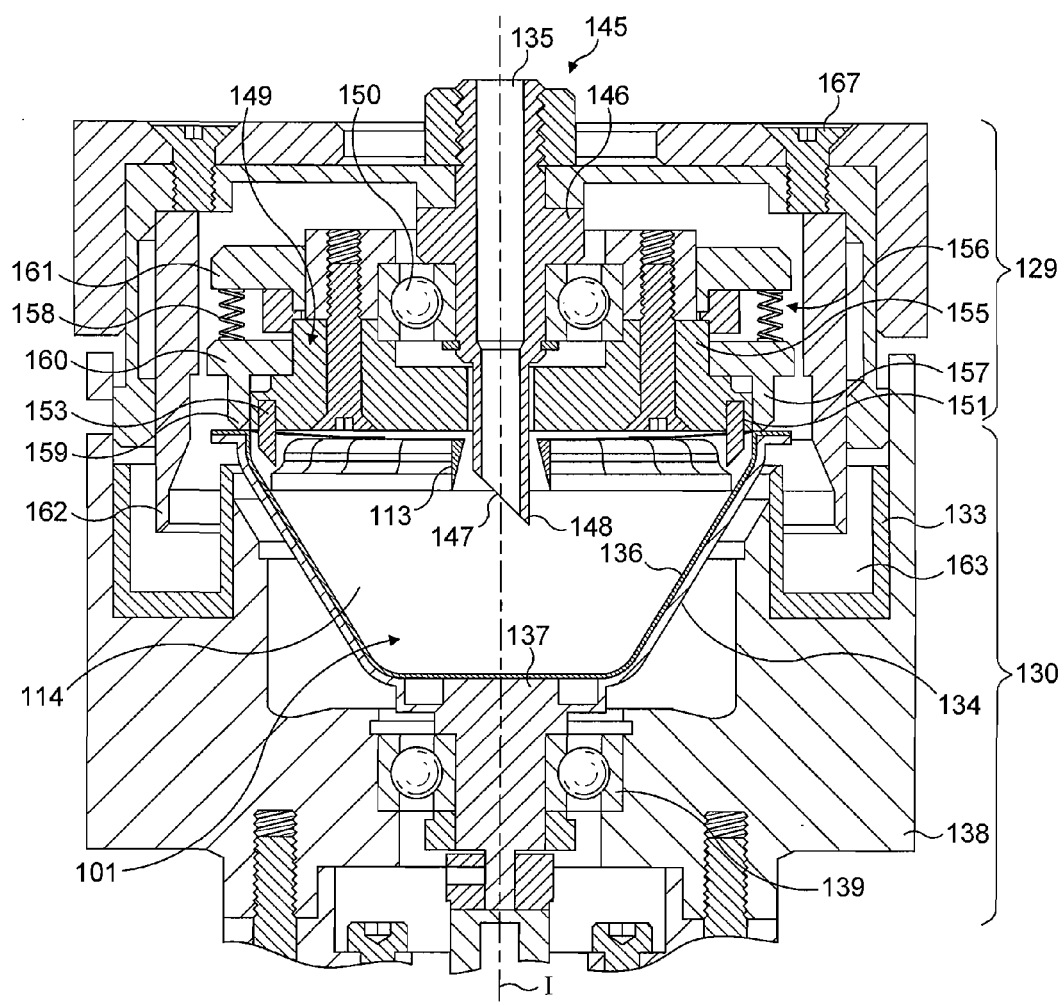
FIG. 35 is an enlarged view of the view of FIG. 34.

In relation to FIGS. 34 and 35, the rotary drum 134 is shaped as a hollow capsule holder with an internal cavity 136 complementary shaped to receive the capsule. The rotary drum 134 prolongs itself axially by a rotating shaft 137 which is maintained in rotational relationship relative to an outer base 138 of the liquid receiver 133 by a rotational guiding means 139 like a ball bearing or needle bearing. Therefore, the rotary drum is designed to rotate around a median axis I whereas the outer base 138 of the receiver is fixed relative to the device. The liquid receiver 133 can be fixed to a housing 143 of the motor by bolts 144 for example. A mechanical coupling 141 is placed at the interface between the rotating shaft 137 of the drum and the shaft 142 of the motor 140.

Figure 36:
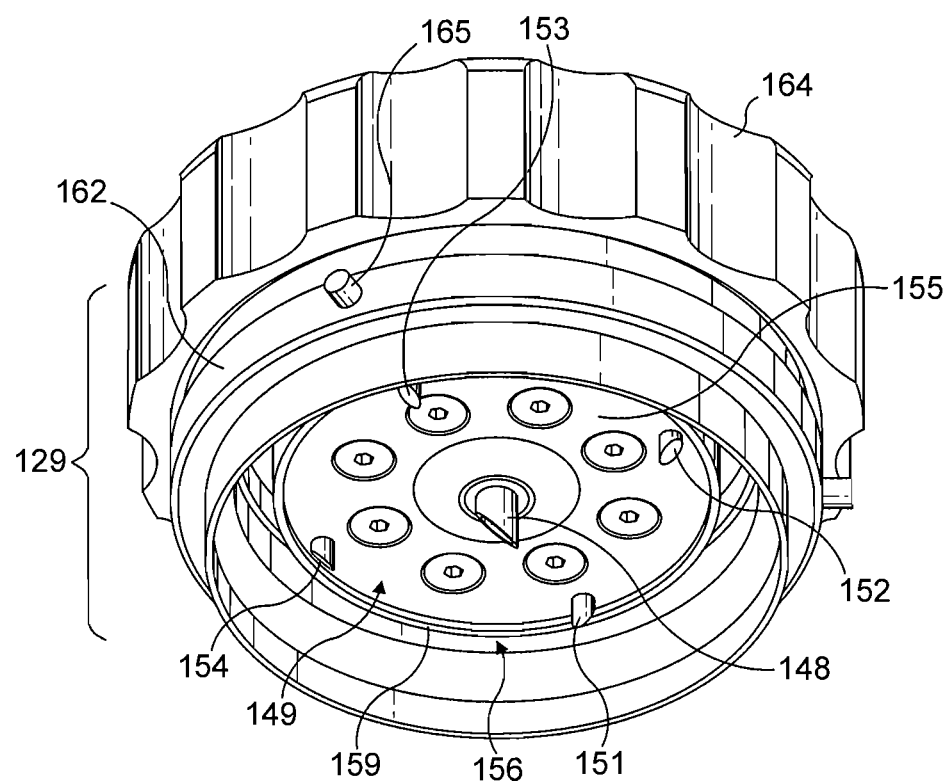
FIG. 36 is a view of the water injection assembly of the module of FIGS. 34 and 35.

Considering the water injection subassembly 129, as illustrated in FIGS. 35 and 36, it comprises a centrally arranged water injector 145 which is fixed relative to longitudinal axis I of the device. The water injector comprises a central tubular member 146 for transporting water from the inlet 135 to a water outlet 147 that is intended to protrude inside the enclosure 114 of the capsule. The water outlet is formed of a puncturing means 148 such as a sharp tubular tip that is able to create a puncture hole through the closing foil of the capsule and through the eventual breakable part of the tubular inlet 113 of the lid.

About the water injector is mounted a capsule rotary engaging part 149. The engaging part 149 has a central bore for receiving the water injector and rotational guiding means such as a ball or needle bearing 150 inserted between the part 149 and the injector 145. The engaging part further comprises outlet piercing members 151, 152, 153, 154 protruding from a disc-shaped engaging wall 155 of the part 149. The piercing members can be small cylindrical portions with a slanted cutting surface able to cut or perforate small holes in the sealing foil 103 of the capsule. The piercing members are arranged at the periphery of the wall 155, preferably evenly distributed to provide several openings in the capsule for the centrifuged liquid to leave the capsule forming several streams of liquid. Of course, it is possible to have the water injector 145 be a rotary element in conjunction with the capsule. In such case, the water injector can be fixed to the rotary part 149 and the two parts can rotate together along axis I.

According to one aspect of the invention, the water injection subassembly 129 further comprises a valve system 156 for controlling the flow of liquid that is discharged from the device. The valve system 156 can be arranged on the capsule rotary engaging part 149 in the form of an annular engaging portion 157 which is biased under the force of elastic loading means 158 such as springs. The annular engaging portion 157 includes a pressing peripheral surface 159 which applies a closing force on the peripheral rim 104 of the capsule to be able to restrict the flow of liquid under the force of the elastic loading means. The surface 159 can form a cone or "V" for increasing the sealing pressure in a localized area. The engaging portion 157 further comprise an internal base portion 160. The elastic loading means 158 is thus inserted in a space located between the base portion 160 and a counter-force portion 161 of the engaging part 149. Therefore, at a rest position, the engaging portion 157 of the valve system keeps closing on the rim of the capsule under the compressive effect of the resilient means 158.

The capsule engaging subassembly 129 may further comprise a tubular portion of skirt 162 which protrudes in the internal annular chamber 163 of the liquid receiving subassembly 130 when the two subassemblies are closed relatively one another about a capsule. This tubular portion of skirt 162 forms an impact wall for the centrifuged liquid under pressure that passes through the valve system. This portion 162 is preferably fixed on the subassembly 129. The subassembly further comprises a handling portion 164 for facilitating the connection on the liquid receiving subassembly 130. This handling portion 164 can have a knurled peripheral surface for handling. The handling portion can be fixed on the fixed base of the subassembly 129 by screws 167.

This portion could of course be replaced by a lever mechanism or a similar handling means.

As already mentioned, connection means are provided for the relative connection of the two subassemblies 129, 130. For example, small pins 165 are provided on the side of the tubular surface of the water injection subassembly 129 which can engage side locking openings 166 on the tubular surface of the liquid receiving subassembly 130. Therefore, connection between the two subassemblies can be carried out by a rotational angular or helical closure movement for enabling the pins to engage the oblong openings 166. Of course, other connection means can be envisaged to replace this bayonet-type connection means. For instance, a threading means or a translational closure means can be envisaged by any person skilled in the art.

The capsule system of the invention works basically according to the following principle. The capsule device is opened by moving the two subassemblies 129, 130 relatively one another, e.g., by disconnecting the bayonet-type connection and separating the two subassemblies 129, 130. As a result, a single-use sealed capsule 101 containing a food substance, such as a dose of roast and ground coffee, can inserted in the device, i.e., placed in the cavity of the rotating drum 136. The capsule can be placed in the device while the capsule being gastight closed by the sealing foil 103. The device is then closed by the subassembly 129 being connected back onto the subassembly 130 and locked by the connection means. In the locked position, the capsule is opened by the water injector that pierces through the sealing foil of the capsule and introducing itself through the water inlet 135 of the capsule. At the same time, several liquid outlets are pierced at the periphery of the sealing foil by the outlet piercing members 151, 152, 153, 154. Water can thus be introduced in the capsule via the central water injector 145. Venting holes can be produced in the injection subassemblies to allow gas to escape the capsule while water is introduced in. The capsule can be driven in rotation by activating the rotary motor 140. The start of the centrifugal operation can be carried out at the same time as water injection start being introduced in the capsule or slightly after or before this water injection operation starts.

For instance, it might be advantageous for brewing ground coffee, to allow during several seconds that water fills in the capsule before starting the centrifugal operation by rotating the capsule. Thus, water can properly infiltrate in the coffee before, the liquid is centrifuged thereby avoiding coffee area to remain dry in the coffee portion.

The centrifugation is carried out by rotating the capsule around the central axis I of rotation of the device that is preferably aligned to the central axis AA of the capsule. The rotational speed is preferably of from 1000 to 12000 round-per-minutes (rpm), more preferably of from 1500 to 9000 rpm. A control unit can be provided in the device for setting the rotational speed according to the nature of the liquid to be brewed and/or the substance in the capsule. The higher the rotational speed, the higher the pressure is exerted at the peripheral wall of the capsule and the more the substance is compacted on the sidewall of the capsule. It is important to notice that higher rotational speeds promote brewing of coffee extract containing a lower solid content since the residence time of liquid in the coffee bed is shorter. Lower rotational speeds provide coffee of higher strength (coffee solid content) since the residence time of liquid in the capsule is longer. Brewing takes place in the capsule by water traversing the substance thereby providing an extraction or partial or total dispersion or dissolution of the substance. As a result, a centrifuged liquid is allowed to pass through the plurality of outlet openings 18 provided in the capsule, e.g., through the lid 108.

Under the effect of centrifugal forces, the substance, such as coffee powder, tends to compact itself radially against the peripheral walls 107, 117 of the enclosure of the capsule, whereas water is forced to flow through the substance. This results in the substance being both compacted and intimately wetted by water. Due to the high rotational movement of the capsule, the centrifugal forces exert themselves uniformly on the mass of the substance. Consequently, the water distribution is also more uniform compared to known methods using a pressure pump to provide a water piston through the coffee in the capsule. As a result, there is lower risk of preferential flow path through the substance which could lead to areas which are not properly wetted and so not properly brewed, dispersed or dissolved. With ground coffee powder, the liquid that reaches the internal sidewall of the capsule is a liquid extract. This liquid extract is then forced to flow upwards along the internal surface of the sidewall of the capsule. The widening of the sidewall 107 of the capsule promotes the upward flow of the liquid in the capsule in direction of the openings.

These outlet openings 118 of the enclosure of the capsule are sized as a function of the substance stored in the capsule. Small openings such as slots of small width or holes of small diameter tend to provide a filtering function to retain the solid particles in the enclosure of the capsule while allowing only the liquid extract to pass the openings. Also as aforementioned, the openings may also provide a flow restriction that impacts on the interaction of water with the substance and on the creation of foam or crema on the top of the beverage. These holes also form sufficient restrictions that create shear forces and consequently generate foam or coffee crema. Some gas contained in the capsule can become entrapped in the liquid and forms, due to the pressure release after the flow restriction, a multitude of small bubbles in the liquid.

Also, the valve system 156 of the device can start opening as pressure of liquid increases on the valve when liquid leaves the capsule. Therefore, a certain time delay before opening can be controlled by the valve system to enable sufficient interaction between water and the substance contained in the capsule. This controlled delay depends on various parameters such as the centrifugal speed, the force exerted by the elastic loading means (i.e., spring stiffness), the pressure drop as created by the substance and outlet openings, etc. The opening of the valve system occurs by the pressing surface 159 of the valve system lifting as pressure of liquid increases on its internal surface. It can be noted that the capsule of the rim can also be substantially flexible to flex under the effect of the pressure of liquid. Therefore, the relative movement between the pressing surface and the capsule create a small annular passage for the liquid to escape out of the small interstice upstream of the valve system. At relatively high rotational speeds, a peripheral jet of liquid can be formed that impacts on the internal surface of the portion of skirt 162. The liquid starts to fill the cavity 168 of the liquid receiving subassembly and liquid can drain through the liquid duct 132 to be collected in a cup or glass placed underneath.

Figure 37:
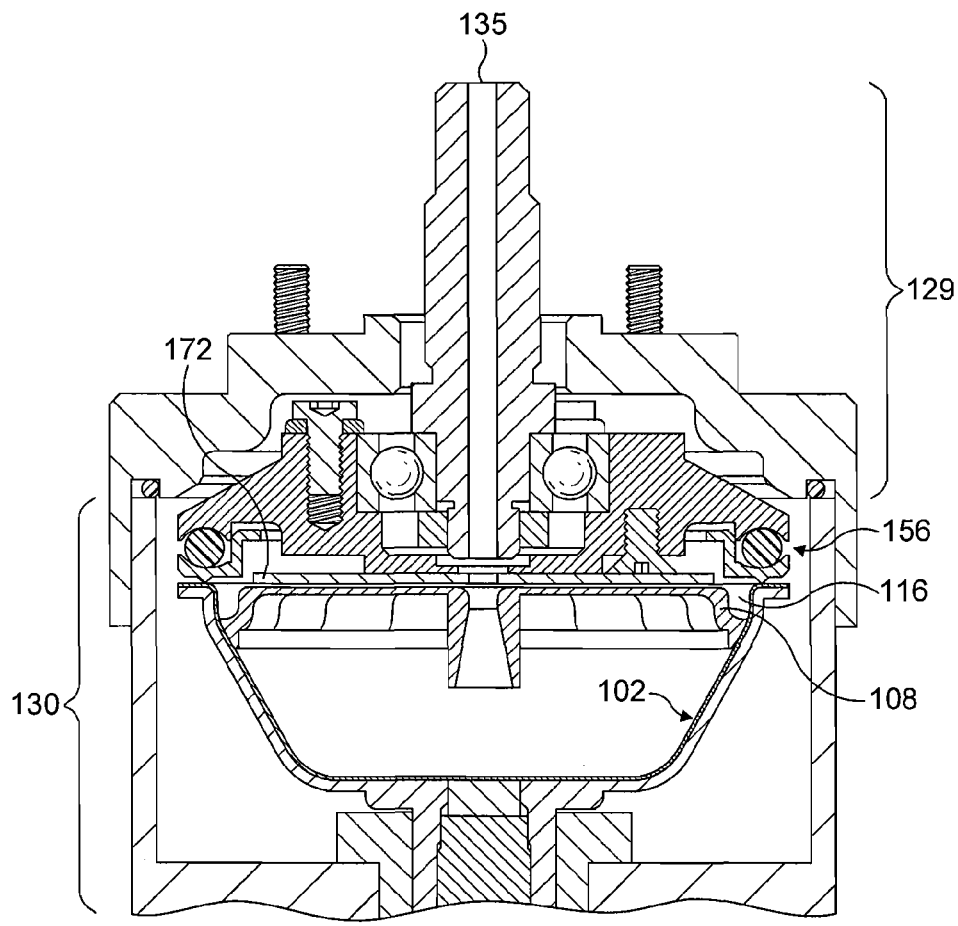
FIG. 37 is a cross sectional view of a beverage production module similar to FIG. 34 but for another embodiment of the invention.

In another mode of the invention illustrated in FIGS. 37 and 38, the same numeral references have been taken to identify the same or equivalent technical means. In this mode, the valve system 156 differs in that the elastic loading means is obtained by a rubber elastic O-ring 169 inserting between a lower member comprising a pinching surface 159 and an upper fixed portion 161 of the water injection subassembly 129. The O-ring is maintained in place between two concave surfaces 170, 171 of the valve system. Again during brewing, the pressure of liquid in the capsule tends to lift the pinching surface 159 to create an annular passage between the rim 104 of the capsule and the pinching surface. The pinching surface can be shaped with a sharp tip or edge that can create a concentration of the pinching forces onto the rim. Of course, it could be imagined that the elastic loading means 169 and the pinching member are the same element. For example, the pinching member can be made of rubber-elastic material.

In the embodiment shown in mode of FIGS. 37 and 38, the water injector can be a simple water outlet connectable to an inlet of the capsule with no puncture means. In this case, the capsule is pre-opened before it is inserted in the device, i.e., the sealing foil is removed by peeling, or a central hole is perforated in the foil before the capsule is inserted in the device. Furthermore, a water-tight sealing engagement of the water injector can be performed by a water-tight sealing means 172 which applies a certain water-tight sealing pressure on the top surface of the capsule. Therefore, water is prevented from leaking along the top surface of the capsule and from by-passing the capsule to release directly through the liquid outlet.

Figure 39:
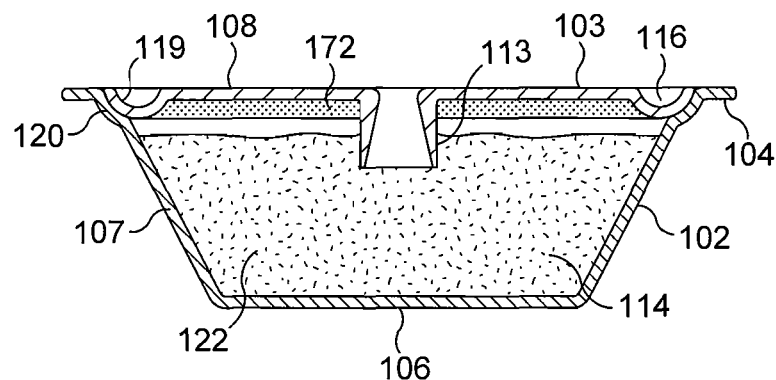
FIG. 39 is a cross section view of a variant of the capsule of the invention.
Figure 40:
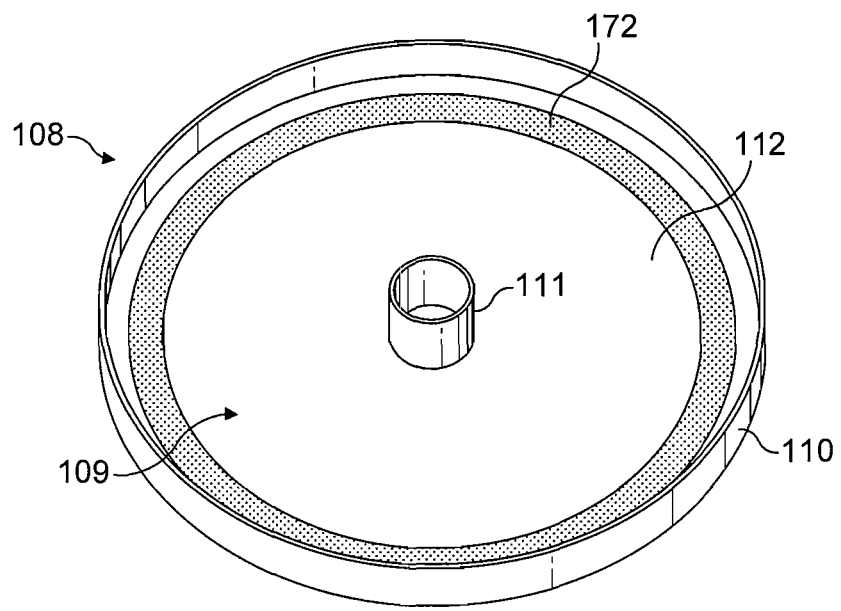
FIG. 40 is a view from underside of the lid of the capsule of FIG. 39.

Another preferred embodiment of the capsule of the invention is illustrated in FIGS. 39 and 40. The general structure of the capsule is the same as for the previous embodiment except that the outlet openings are formed by a filter paper, a woven or non-woven filtering portion or another meshed or porous membrane 720. Thus, the lid 108 which is inserted in the dished body 102 comprises a circumferential band of a porous material. The porous material provides restriction of the flow, creating a certain pressure drop, e.g., between 0.5 and 4 bar, and leading to a filtering of the solid particles. In particular, the size of the pores of the material can be chosen to retain also the coffee fines, i.e., the particles of particle size as low as 90 microns. Preferably, the porosity is lower than 200 microns, e.g., comprised between 2 and 200 microns. The pressure drop is also obtained when the overall open surface of the porous band is lower than 50% of the total surface area of the surface of the band. The paper, fabric, meshed or porous material can be formed of a band or bands which can be welded or otherwise combined to the lid. The band could have a width of between 0.5 and 2 cm for example. The lid also comprises an annular recess 116 for collecting the centrifuged liquid which travels through the peripheral filter band. A sealing membrane 108 covers the lid and closes the capsule in a gastight manner. The sealing membrane preferably seals onto the flange-like rim 104 of the body of the capsule. The lid can further comprises a central conical portion 113 extending in the enclosure of the capsule to guide water in the capsule. The capsule has ingredients 122 such as ground coffee which at rest occupies part of the enclosure as illustrated in FIG. 39. However, it is evident that during the centrifugation, the ingredient will be quickly moved by centrifuge effect on the sidewall 107 and against the filter band 720.

Preferably, the enclosure is made large enough, with a head space, to enable the substance to move to the peripheral walls during centrifugation. Preferably, the volume of the substance occupies, before centrifugation, less than 95% of the total volume of the enclosure of the capsule, more preferably less than 85% of the total volume. It can be noted that the substance can be placed in the enclosure, of any of the described capsules, as loose particles being able to flow in the enclosure freely. In an alternative, the substance can be placed as a mass of compacted particles. If the mass of particles is compacted, it is preferred that the mass has the shape of a torus so that water can enter in the centre of the torus at the inner side and then transfer to the external side of the torus by centrifugal effect. Due to the upward centrifugal vector, the torus may also be shaped to have a larger upper surface and a narrower lower surface, e.g., with a triangular cross-section, so as to better conform to the filter part of the capsule.

In another preferred embodiment, the lid comprises a recess 116 which can be filled by a porous compressible material to provide a filtering function as well. For example, the material could be sponge or fabric.

Figure 41:
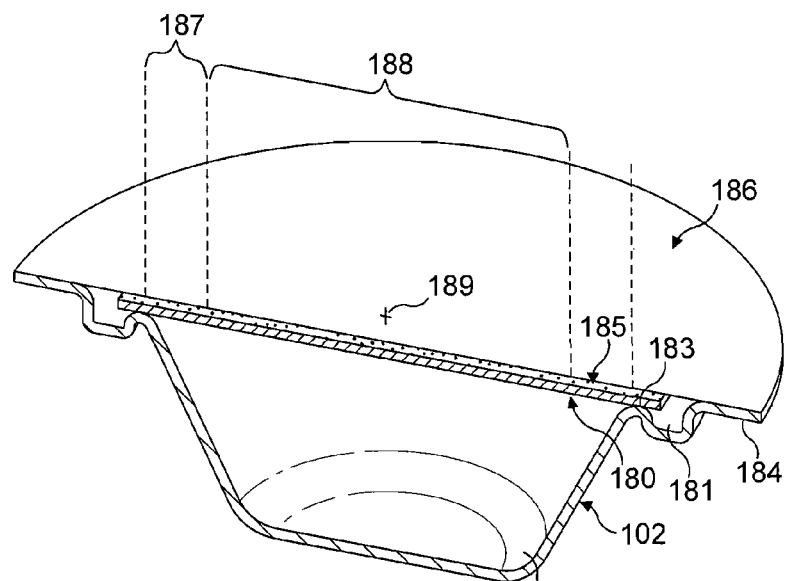
FIG. 41 is a perspective cross sectional view of a capsule (without substance inside) according to another mode of the invention.
Figure 42:
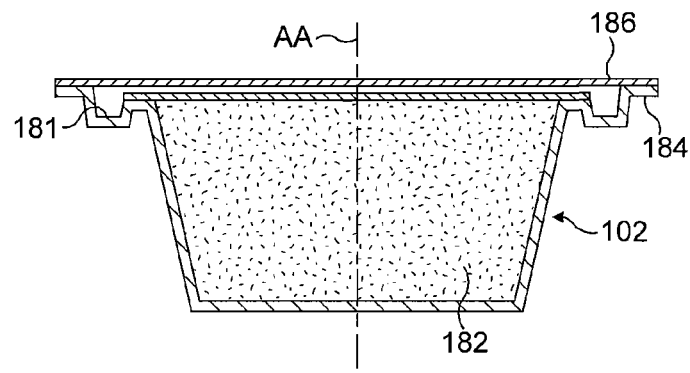
FIG. 42 is a cross sectional view of the capsule of FIG. 41.

According to FIGS. 41 and 42, the capsule in the system of the invention may also comprise an enclosure which is formed of a dished body 102 and a porous wall 180. The dished body comprises a main cavity 182 for storing the food substance and a peripheral recess 181 for receiving the liquid extract that traverses the porous wall 180 during the centrifugation process. The recess 181 is delimited by an inner edge 183 and an outer rim 184. The porous wall 180 can be attached to an inner edge 183 of the recess 181. A gastight foil membrane 186 is preferably attached onto the outer rim 184 of the body. The inner edge is preferably placed below the outer rim in order to leave a free space 185 between porous wall 180 and the foil membrane 186. The porous wall can be sealed by heat or ultrasonic welding onto the inner edge 183. In order to leave a certain gap to let liquid travels to the recess, the inner edge 183 is slightly lower than the outer rim 84 onto which is sealed the outer membrane 186.

The porous wall 180 can have openings (i.e., pores) along its whole surface or along a peripheral portion of wall only. FIG. 41 shows a portion of the wall 187 of wall 180, which normally have the openings whereas the central portion 188 is free of openings.

In another slightly different embodiment, the two portions 187, 188 of wall 180, both have openings or pores.

The pressure of the release liquid is dependent on various factors, in particular, the rotating speed of the capsule in the device, the radius at the peripheral portion of wall 187 (specially, determining the relative centrifugal force "g" at the portion 187) and the size of the openings. The size of the openings is preferably comprised between 1 and 600 microns. More preferably, the size of the openings is comprised between 10 and 200 microns forming a flow restriction means which creates a certain drop of pressure during the centrifugation of the capsule along its central axis. The overall surface area of the pores of the porous wall should be lower than 50% of the total surface area of said wall, most preferably lower than 40%.

The capsule of FIGS. 41 and 42 can be pierced in its center 189 for injecting water in the enclosure 182 containing the substance. As a result both the outer foil 186 and the inner wall 180 are pierced. The capsule is inserted in a device as described before. The capsule is driven in centrifugal rotation at a determined speed, e.g., between 1000 and 16000 rpm, more preferably between 5000 and 12000 rpm. The brewing or dissolution process takes place in the enclosure by water traversing the substance. As a result of the centrifugal effect, the food liquid traverses the porous portion of wall 187, (eventually also part of the portion 188 if porous) and leaves the enclosure via the interspace 185 then via the annular recess 181. The liquid is allowed to leave the capsule via pierced holes made in the foil above the recess 181.

Figure 43:
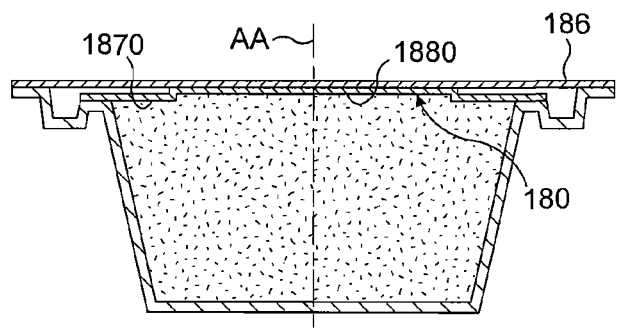
FIG. 43 is a cross sectional view of a capsule according to still another embodiment.

FIG. 43 shows a similar capsule but with the inner porous wall 180 comprising a central portion 1880 which can be sealed to the external gastight foil 186 and a peripheral portion 1870 which is distant from the foil 186 while leaving a small space for the filtered liquid to flow toward recess 181. In this example, the peripheral portion 1870 comprises the outlet openings of the enclosure. The central portion 1880 may have openings or may be free of openings. In this embodiment, no liquid is allowed to go between the outer foil 186 and the inner portion of wall 1880 since both are sealed together. In a variant, a connection member can be inserted between these parts 1880, 186.

If a sufficient pressure drop is created at the portions of wall 1870 in the capsule, the device may not necessarily be provided with an additional flow restriction means such as the valve described previously. In this case, the flow restriction means in the capsule may suffice to maintain a sufficient pressure in the enclosure. Therefore, a good interaction between the substance, e.g., ground coffee, and water can be obtained by delaying the release of the liquid through the openings.

However, the external valve is generally preferred to better control the pressure and flow rate of the released liquid. For example, good espresso-type coffee with crema can be produced with a capsule comprising a woven polymer membrane comprising pores within a range of between 10 to 200 microns.

It can be noted that the peripheral portion of the capsule comprising the restriction means, e.g., openings, can be substantially oriented perpendicularly to the axis of rotation as in the examples of FIGS. 41 to 43 or inclined relative to said axis as in the example of FIGS. 26 to 31.

Figure 44:
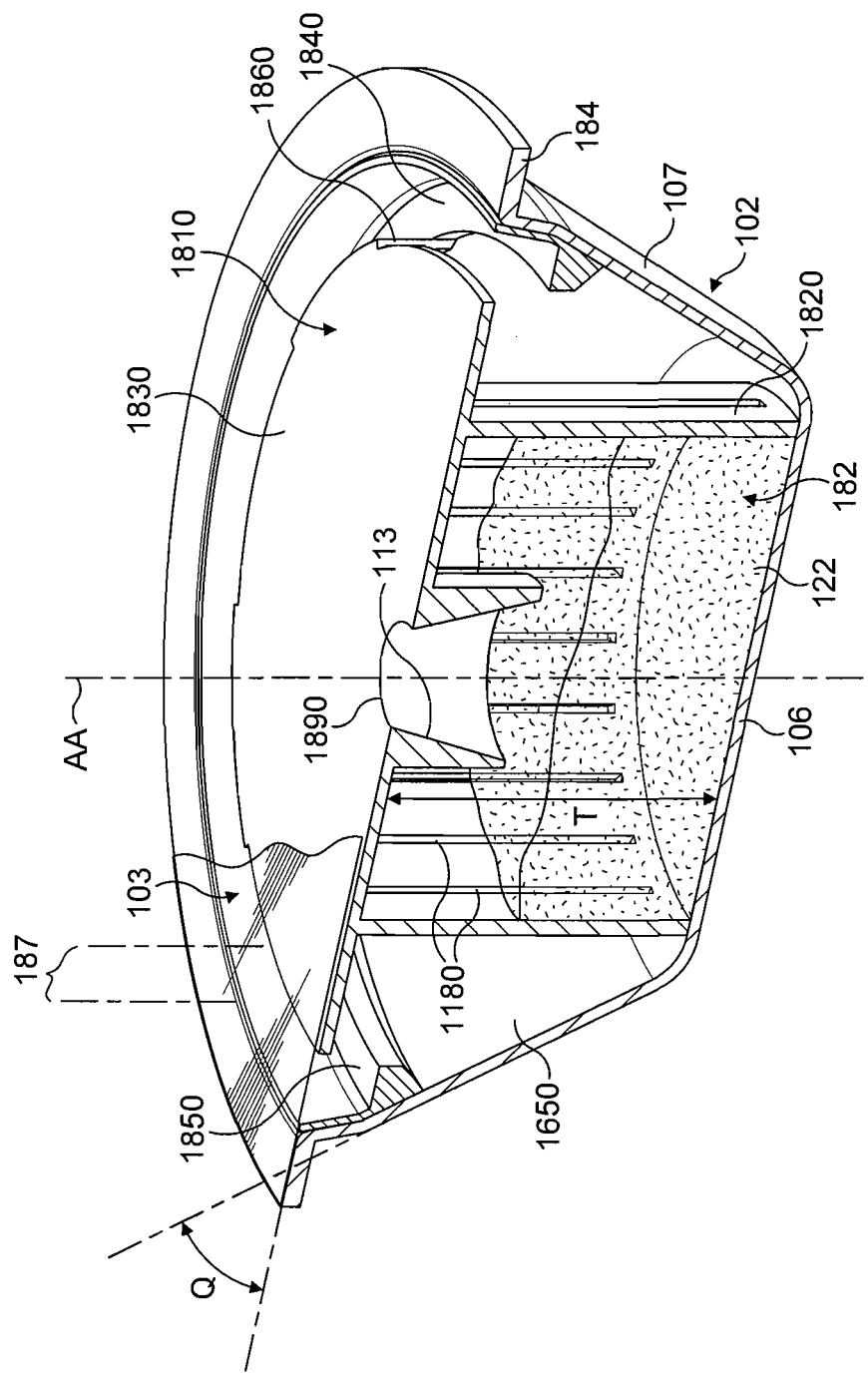
FIG. 44 is a cross sectional view of a capsule according to still another embodiment with the upper sealing membrane being removed for clarity.
Figure 45:
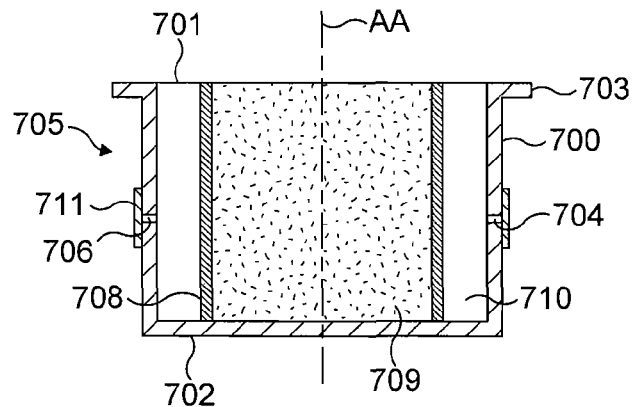
FIG. 45 is a cross sectional view of another variant for cylindrical capsule.

In FIG. 44, another embodiment of the capsule is illustrated in which the upper sealing membrane 103 has been partially removed for clarity. The capsule comprises an upper wall formed by the foil 103, a bottom wall 106 and a sidewall 107 formed by a dished body 102. An internal lid 1810 is also provided to demarcate an internal enclosure with the body 102 and secure a filter part in the capsule. The lid 1810 comprises an apertured cylindrical peripheral portion 1820 extending from a transversal dish 1830. The cylindrical portion 1820 extends substantially across the whole thickness T of the enclosure to separate the cavity 182 containing the substance from a collecting recess 1160 thus demarcated by the body 102 and said portion 1820. The cylindrical portion of wall 1820 comprises a series of elongated slots 1180 distributed at intervals through the portion of wall. The slots are placed vertically but other orientations are possible such as horizontal or inclined orientations. The slots may also be replaced partly or totally by circular openings. The portion could also have larger openings closed by a filter or microfilter membrane, e.g., of paper, woven or non-woven polymer. The upper dish 1810 can extend by a support ring 1840 which engages on the upper inner side of the cup-shaped body 102. The ring enables the lid to be correctly placed in the capsule and to be fixed in the capsule during handling and transport. A large annular recess 1850 is maintained between the dish 1810 and its ring 1840 as the outer edge of the dish 1810 ends before the upper edge of the ring. The recess 1850 is thus closed by the membrane 103 thus delimiting an outlet region 187 intended to be pierced by external piercing means of the beverage preparation device. The outlet region extends continuously at the periphery of the capsule in an annular shape. Therefore, piercing can be carried out at any annular location of the region 187 regardless of the particular angular orientation of the capsule in the device. One may also contemplate to perform as many pierced outlets as necessary since this region 187 is continuously perforable at the periphery of the capsule. Connecting parts 1860 are also distributed at the periphery of the dish to connect the dish 1810 to the ring 1840. It can also be noted that a second dedicated perforable region 1890 of the upper wall 103 can be provided for the introduction of the water injection means. For this, the dish 1810 has a central hole or a breakable part so that when a rigid injector is introduced, this membrane can be readily perforated. Hence, the construction of the capsule is particularly simple and cost effective since the lid can be produced in one single moulded plastic part.

FIGS. 45 to 50 are other variants of capsules according to the invention. For example, the capsule of FIG. 45 has a cylindrical side wall 700, an upper wall 701 and a lower wall 702 both sealed or connected to the side wall 700. The capsule is gastight by choosing materials for the walls, e.g., aluminium and/or suitable plastics, which have gas barrier properties. The upper walls and lower walls can be flexible or rigid depending on said materials. For example, wall 701 can be a flexible sealing membrane welded on upper rim 703 of the body 705 forming the sidewall 700 and lower wall 702. The side wall 700 may comprise outlets 704, 706 for release of the liquid when centrifuged in the beverage preparation device around central axis AA of the capsule. Optionally, the capsule may comprise a filter part 708 delimiting the cavity 709 for the substance and a collecting recess 710 peripherally placed relative to the central cavity. The filter part may, for instance, be an integral part of the body 705 or a part which is added in the capsule, e.g., a filter cylinder. The centrifuged liquid passed through the cylindrical wall 700 in outlets 704, 706 positioned, for example, at about the median transversal plane of the capsule. A series of outlets can be distributed at intervals around the side wall 700. The outlets may be already pre-made in the wall 700 and covered by a gastight sealing membrane 711. The sealing membrane can be a flexible band surrounding the wall which can be pierced at the outlets, cut or removed, e.g., peeled off, by the user for uncovering the outlets before it is inserted in the centrifugal brewing device. The size of the outlets can be small enough to provide a flow restriction to the liquid.

Figure 46:
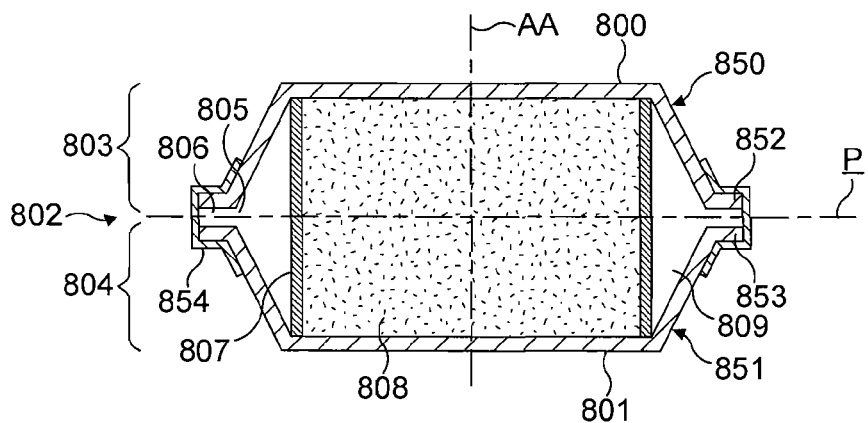
FIG. 46 is cross sectional view of another variant for capsule with a V-shaped side wall.
Figure 47:
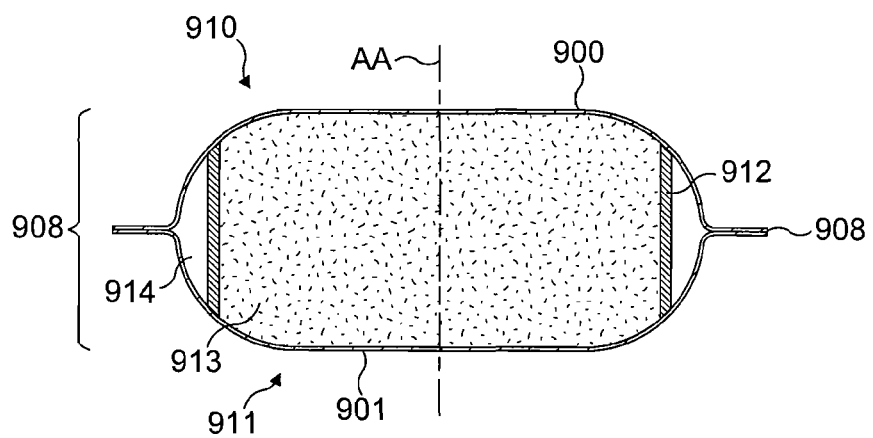
FIG. 47 is a cross sectional view of another variant for a capsule with a U-shaped side wall.

The capsule of FIG. 46 is another possible embodiment. The capsule is formed of an upper wall 800, a lower wall 801 and a sidewall 802 connecting the upper and lower walls wherein the side wall is formed of two truncated portions 803, 804 with their larger section or base being connected towards the transversal median plane P of the capsule. Hence, the assembly formed by the two truncated portions form a vertex 805 at which outlets 806 for the beverage can be provided. In addition, a filter part 807 can be provided in the capsule which also delimits a cavity 808 for receiving the substance and a collecting recess 809 for the centrifuged liquid. As a matter of specific construction, the filter part can be, for instance a rigid tubular member which is inserted between two-half shelves 850, 851 forming the walls 800, 801, 802. The shelves 850, 851 can be made of moulded plastic. The filter part can be made of moulded plastic or of a more complex structure such as a combination of a plastic support frame and a porous filter membrane. The outlets 806 can be formed at the interface of the shelves by small radial channels formed in each shelf for instance. The channels can be distributed at angular intervals at the periphery in the sealing rims 852, 853 of the shelves. Hence, the outlets are formed by aligning the channels of each shelves and, e.g., by heat or ultrasonic sealing or adhesive bonding of the shelves 850, 851 at the rims 852, 853. For instance, 4 to 10 outlets could be provided of a section of about 1-10 mm² each. In order to maintain the enclosure of the capsule protected against the external atmosphere till the use of the capsule, the outlets can be closed by a sealing protective membrane 854, e.g., forming a band surrounding the vertex area or rims 852, 853 of the shelves. The membrane can be removed, pierced or cut just before the centrifugation operation in the device either by the user or by the device itself.

Of course, the capsule could have other shapes without departing from the scope of the invention. For instance, the sidewall could be designed stepwise, i.e., with gradually increasing steps in direction of the transversal median plane (not illustrated).

Figure 48:
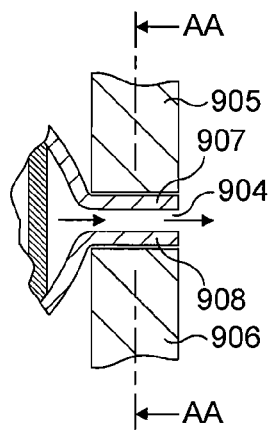
FIG. 48 shows a detail of the capsule of FIG. 47 during centrifugation in a beverage preparation device.
Figure 49:
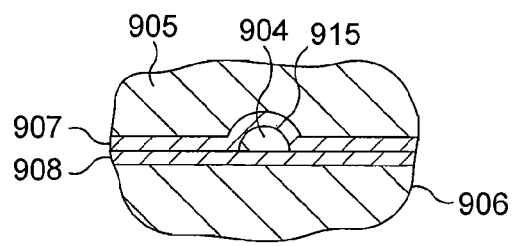
FIG. 49 shows a detail of the capsule of FIG. 47 along direction AA of FIG. 47.
Figure 50:
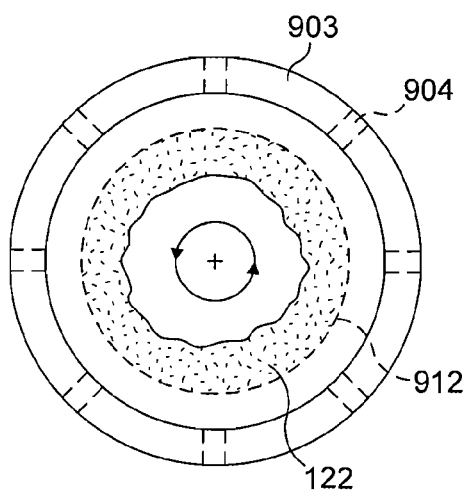
FIG. 50 is a top view of the capsule of FIGS. 47 to 49 during centrifugation.

According to FIGS. 47 to 50, the capsule according to this embodiment, comprises an upper wall 900, a lower wall 901 and a sidewall 902 connecting the upper and lower walls, preferably along a peripheral sealing edge 903. The sealing edge is designed to open as a result of the pressure of liquid which applies against it. Upon opening as illustrated in FIG. 48, one or more outlets 904 are formed. The size of the outlets during opening may be controlled by rim's engaging surfaces 905, 906 of the beverage preparation device or alternatively by a rigid flow control member as a part of the capsule itself (not illustrated). As shown in FIGS. 48 and 49, the sealing edge opens in two plies 907, 908 which abut against the engaging surfaces 905, 906 under the effect of the liquid exiting the capsule. The design of the surfaces 905, 906 will determine the form of the outlets. For instance, flat continuous surfaces 905, 906 over the whole perimeter of the rim and distanced from a controlled gap will provide a continuous outlet for distributing a 360-degree liquid jet toward the impact wall of the beverage production device. On the contrary, at least one of the engaging surfaces 905, 906 may be provided with discrete radially oriented channels 915 of controlled depth enabling to form discrete liquid outlets of controlled size at the flange like rim of the capsule.

The surfaces 905, 906 could be fixed or spring biased to control the degree of opening of the outlets as a function of the rotational speed. The capsule according to this embodiment can be made of rigid or flexible shelves 910, 911 which are sealed at said 90 in a breakable or openable manner to form the outlets. For instance, the two shelves 910, 911 can be gastight flexible foils made of polymer with or without an aluminium layer or an EVOH barrier layer. A filter part 912 can be inserted in the capsule to delimit the enclosure for the substance 913 and the collecting recess 914. For instance, the filter part can be a porous tubular member which can form a support ring for maintaining the upper and lower walls of the shelves at distance.

In any of the described modes, the flow restriction can be obtained or complemented by chicanes in the capsule and/or in the device or a similar structure forming a tortuous flow path for the liquid.

It can be noted that the pressure drop of the restriction means can be measured by a pressure measurement test consisting of filling water under pressure in the capsule and measuring the pressure of water at the injection point at which liquid is allowed to pass the restriction means, i.e., the valve system.

In yet another preferred embodiment, the invention provides for a capsule system for preparing beverages by centrifugation of a capsule in a centrifuging brewing device comprising:

a set of different capsules; each one for selectively delivering a beverage having specific characteristics that differ from the other capsules of the set; each capsule of the set comprising a body with a sidewall and a free rim, an upper wall and an extractable or infusible ingredient; and an insertion diameter (D) of the body of the capsule for insertion in a capsule holder of the brewing device in a referential position, wherein the different capsules in the set having bodies of different storage volumes obtained by a variable depth of the body in the set but the same insertion diameter (D) for all capsules of the set.

Such a configuration of capsules enables to deliver a wider range of beverages, e.g., ristretto, espresso and lungo coffees (or even larger coffee volumes) in a more convenient manner. In particular, the capsules' geometrical configuration enables to accommodate in a same brewing device capsules of different volumes without requiring specific adaptations of the device.

In a mode, the different capsules in the set have at least one upper body portion having substantially the same angle or the same stepped profile in the set.

The upper body portion can be, for instance, a truncated or cylindrical portion. In mode, the body comprises a lower portion of variable length whereas the upper portion can be of constant length for all capsules in the set. The lower portion can be convex, flat or concave.

In another mode, different capsules of the set have a body that is convex along its entire surface and has a variable depth in the set. In this mode, the upper and lower portions of the body are not distinct portions but merge together in single convex portion.

Preferably, the amount of infusible or extractable ingredient increases as a function of the storage volume (i.e., depth) of the body increasing in the set. As a result, each capsule in the set can deliver beverages of different volumes and with different characteristics, e.g., taste, strength, foam or crema, colour, etc.

In particular, the different capsules contain roast and ground coffee having different roasting and/or grinding characteristics in the set. The capsules can be adapted for delivering different coffees such as ristretto, espresso, lungo, etc., or coffees of the same type but different characteristics, e.g., different taste or crema.

The capsule system further comprises an identification means associated to the different capsules in the set for identifying each capsule and adjusting brewing parameters accordingly. The adjustable parameters can be the rotational speed, the back-pressure at the outlet of the capsule, and/or the volume of liquid fed in the capsule. The identification means participates to deliver a wider range of beverages having differentiated characteristics (volume, taste, strength, crema, colour, etc.). The identification means are associated to control means placed in the centrifugal brewing device which controls the adjustment of the said parameters, by controlling the rotational motor driving the capsule holder or/and the pump supplying liquid in the capsule.

In another feature of the invention, the brewing device comprises a rotary capsule holder with a support surface arranged for supporting a portion of the body of the capsules in the set; said portion of sidewall comprising a referencing diameter matching the insertion diameter of the capsules. For this, the support surface of the capsule holder thus comprises a referencing diameter that corresponds to the insertion diameter of the capsules in the set in order to maintain any capsule of the set in the same position of reference. This same position can be determined, e.g., by a position of reference of the free rim of the body of the capsule along a reference plane (P) before closure of the brewing unit. Furthermore, the support surface of the capsule holder holds an upper portion of the body of the different capsules in the set whereas providing no support for a lower portion of the body of the capsules.

As a result, the risk of producing vibrations during centrifugation is reduced because all the capsules of the set are snugly fitted in the device with limited possible relative movement between each capsule and the device during rotation, i.e., capsule holder.

The invention also relates to a capsule for preparing a beverage by centrifugation in the rotary capsule holder of a centrifuging brewing device comprising a body with a sidewall and a free rim, an upper wall and an extractable or infusible ingredient; and an insertion diameter (D) on the body of the capsule, such insertion diameter (D) being positioned at a certain distance below the free rim of the body for matching a referencing diameter of the support surface of the rotary capsule holder and providing a self-blocking of the capsule when inserted in the capsule holder.

Preferably, the capsule comprises an upper portion extending from said diameter (D) that has an angle ($\alpha$) slightly lower than the angle ($\beta$) of the support surface of the capsule holder.

The angle ($\alpha$) of the upper portion is preferably 1 to 8 degrees, most preferably 1 to 5 degrees, lower than the angle ($\beta$) of the support portion of the capsule holder. Such configuration enables to form a self-blocking function of the capsule in the capsule holder when the closing force is applied onto the rim of the capsule and it consequently reduces the risk of vibrations during the centrifugal process.

By convention, the "angle" refers here to the angle that the said surfaces form, in the axial direction of the capsule, with respect to the central axis of the body of the capsule, corresponding to the axis of rotation. It should be noted that the measured surfaces could not be purely rectilinear but could have a slight line of curvature without departing from the scope of the invention.

Furthermore, in addition to snugly supporting all the capsules for avoiding vibrations, the capsule holder can be hollow at its centre to be able to accommodate all capsules of the set. In another mode, the capsule holder could have a bottom wall which is deep enough to receive the longer (i.e., deeper) capsule of the set. The advantage is essentially that a unique capsule holder is sufficient to receive all the capsules of the set.

The present invention further relates to a system for brewing a beverage using a capsule which is centrifuged in a centrifugal brewing device comprising:

a set of capsules having different volumes, identification means corresponding to different capsules of the set, a centrifugal brewing device comprising control means capable of operating the device in centrifugation for any capsule of the set according to predetermined brewing parameters including: the flow rate and/or the volume of injected liquid in the capsule.

In particular, the flow rate is controlled by varying the rotational speed and/or the back-pressure exerted on the centrifuged liquid by flow restriction means of the device and/or capsule.

For instance, for coffee beverages, the flow rate can be varied from 0.2 mL/s to 10 mL/s thereby providing a large diversity of coffee characteristics.

The flow rate is preferably controlled as a function of the volume of the capsule.

The control can also be obtained by passive means such as an identifiable shape or opening characteristic of the capsule of the capsule which alters the back-pressure of the flow restriction means. For instance, capsules of different volumes in the set can be given different outlet cross-sections thereby providing different back-pressure values exerted on the centrifuged liquid.

Preferably, the system of the invention contemplates the adjustment by the control means of the volume of injected liquid and the rotational speed and, optionally the back-pressure by selective flow restriction means.

The identification means can be sensed by sensing means connected to the control means for an active control of the parameters or can be passive identification means, e.g., selective flow restriction means.

In particular, the identification means comprises capsule recognition means which are recognized by the sensing means connected to the control means of the brewing device which controls the brewing parameters accordingly.

The recognition means can be differentiable by a visual code such as a barcode, a colour, a sign, a logo, etc., or by a radio-frequency code (RFID), a magnetic element or by an identifiable shape.

The invention further relates to a method for brewing a beverage using a capsule which is centrifuged in a centrifugal brewing device comprising:

providing a set of capsules having different volumes, selecting a capsule amongst the set of capsules and centrifuging said capsule in the brewing device for brewing a beverage, wherein the flow rate and/or the volume of injected liquid are adjusted as function of the selected volume of the capsule.

The method contemplates the adjustment of the flow rate by way of adjusting the rotational speed and/or the back-pressure exerted on the centrifuged liquid.

In an alternative, the identification means can be formed as selection means of a user interface.

Figure 51:
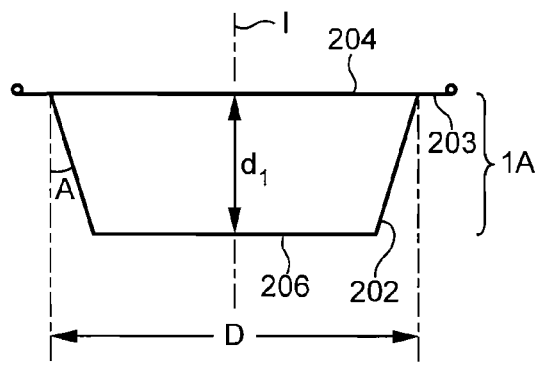
FIG. 51 is a schematic side view of a capsule of small volume.
Figure 52:
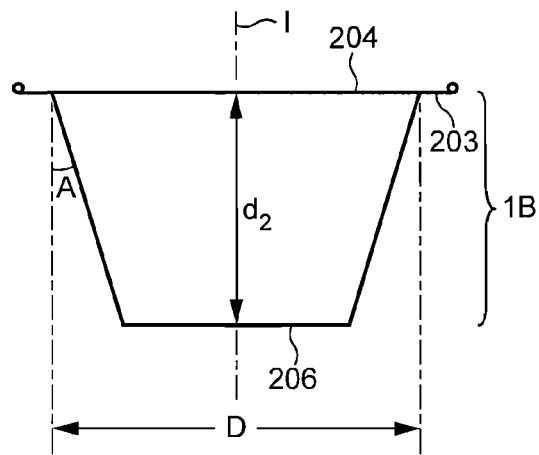
FIG. 52 is a schematic side view of a capsule of larger volume but same insertion diameter.
Figure 53:
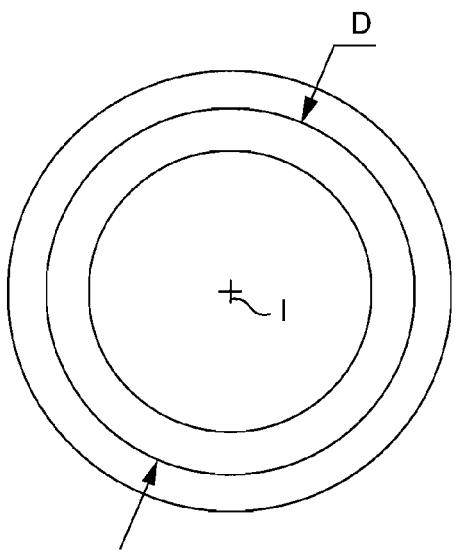
FIG. 53 is a bottom view of the capsule of FIG. 51.

The capsule system of the present invention as illustrated in FIGS. 51 to 55 comprises a set of capsules 1A, 1B of different volumes but a same insertion diameter "D". The capsule of FIG. 51 shows a small volume capsule 1A whereas the capsule of FIG. 52 shows a larger volume capsule 1B. The two capsules comprise a body 202 having a cup shape with a free rim 203 extending outwardly and a top upper wall 204. The upper wall is connected to the free rim of the body by a seal such as a heat or ultrasonic weld line. The upper wall can be a perforable membrane, a porous wall or a combinations thereof. The capsules comprise a central axis "I" which represents the axis of rotation during centrifugation of the capsule in the brewing device (FIG. 53).

The volume difference between the small and large capsules is obtained particularly by varying the depth (d1, d2) of the body of the capsules in the set. In particular, the depth of the body of the smaller capsule 1A is lower than the depth of the body of the larger capsule 1B. In the present example, a single body portion of truncated form is provided which starts from the insertion diameter D and extends toward the bottom 206 of the capsule. The body portion of capsules 1A and 1B is identical and forms a same angle "A'". The angle can vary from 1 to 55 degrees relative to the central axis I. The insertion diameter "D" is here determined at the line of intersection between the lower surface of the free rim 203 and the upper portion of the body.

The small volume capsule contains an amount of extraction and infusion ingredient, e.g., ground coffee, smaller than the amount for the large volume capsule. The small capsule 1A is intended for delivery of a short coffee of between 25 mL and 60 mL with an amount of ground coffee comprised between 5 and 15 grams. The larger capsule 1B is intended for delivery of a longer coffee, i.e., above 60 mL (e.g., between 80 and 500 mL) and contains an amount of ground coffee comprised between 8 and 30 grams.

Figure 54:
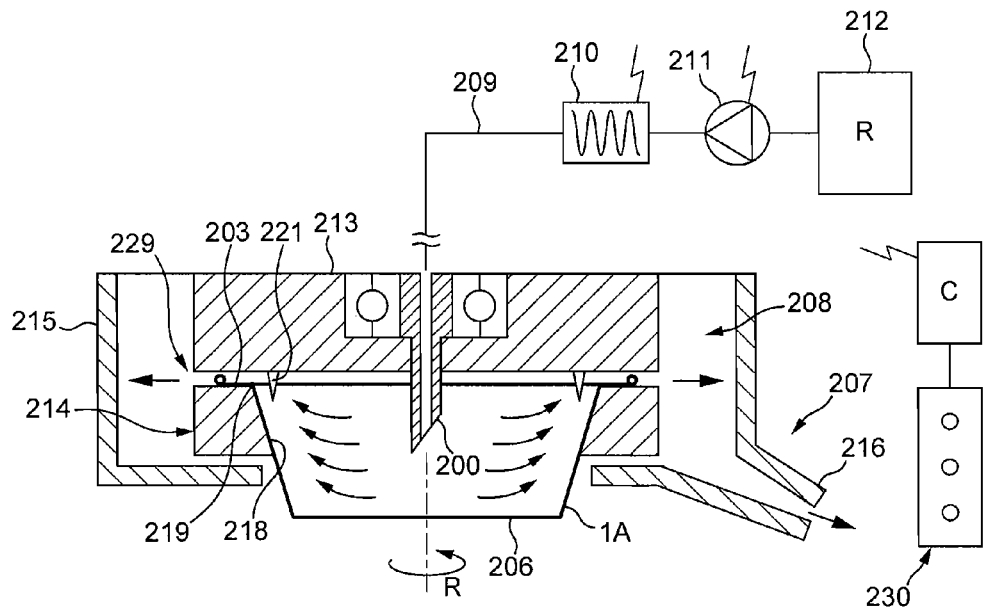
FIG. 54 is a schematic representation of the centrifugal device into which is inserted the capsule of FIG. 51.
Figure 55:
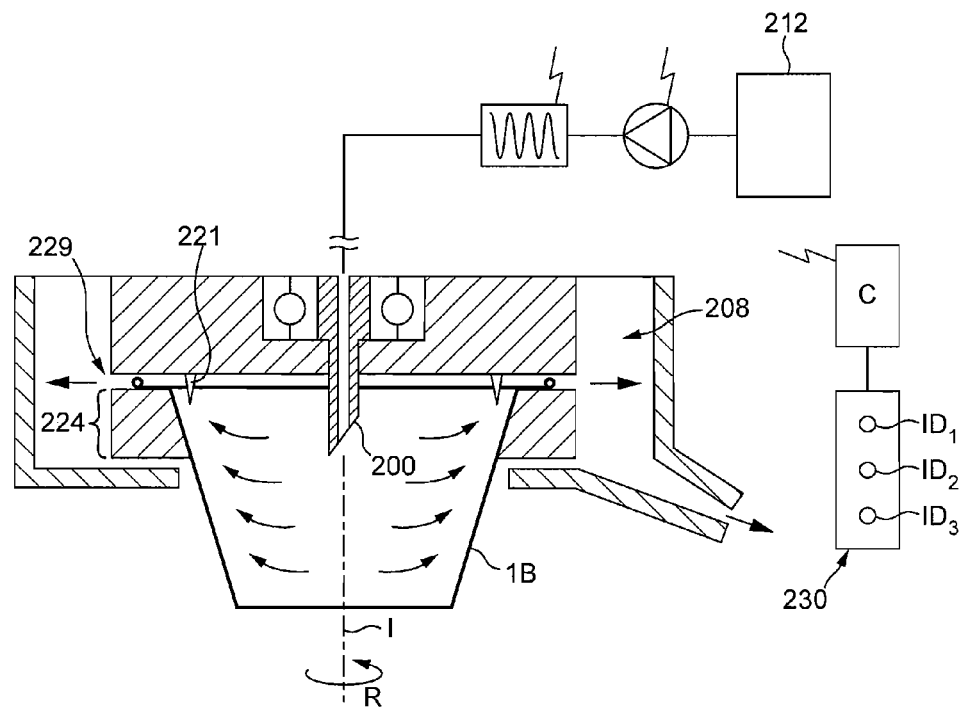
FIG. 55 is a schematic representation of the device into which is inserted the capsule of FIG. 52.

The capsules 1A, 1B are indented to be inserted in the centrifuge brewing device 207 (FIGS. 54 and 55). As illustrated in FIG. 54, the device comprises a brewing unit 800 fed with heated liquid, preferably hot water, by a fluid circuit 209 comprising a heater 210, a pump 211 for metering liquid in the capsule and a liquid supply, e.g., a water reservoir 212. The brewing unit comprises an interface assembly 213, a capsule holder 214 and a collector 215. A peripheral outlet 29, forming a flow restriction for the centrifuged liquid, is provided, at the periphery of the capsule, e.g., between the interface assembly 213 and the capsule holder or capsule 206. A flow restriction can be formed by a spring-biased valve situated at and acting on the rim of the capsule as described above. Part of the valve can be formed by the capsule itself as described in co-pending European patent No. 08171069.1. Such flow restrictions provide a back-pressure on the centrifuged liquid. The collector terminates by a beverage outlet 216 such as formed as an open duct directed to the cup. The capsule holder 214 is designed with portion 224 forming a support surface 218 that is complementary shaped to the upper body portion of the capsules 1A, 1B.

In particular, the capsule holder has a referencing annular line 219 at its upper opening that forms a referencing diameter substantially equal to diameter "D" so as to ensure a snug fit of the capsule in the capsule holder without possible radial play that could provide an unbalance and, consequently, vibrations during centrifugation. The capsule also lies solidly on its upper rim onto the upper flange of the holder without the body substantially deforming radially. In this configuration, the brewing unit is closed onto the upper wall of the capsule by the interface assembly 213. The assembly 213 comprises a central injection needle 200 capable of being introduced precisely along the axis of rotation I of the capsule. At its periphery the interface assembly 213 can comprise a series of outlet perforators 221 for allowing centrifuged beverage to leave the capsule through the peripheral outlet 229 between the capsule holder 214 and the interface assembly 213. A device without outlet perforators can be envisaged when the capsules have a permeable upper wall. Similarly, the injection needle can be omitted and replaced by a simple injection hole if the upper wall is also permeable. Preferably, the outlet 229 forms a flow restriction provided in the flow path of the beverage to provide a gradient of pressure in the capsule. Such restriction can be obtained by small orifices or a restriction valve such as described in above.

As illustrated in FIGS. 54 and 55, the capsule holder can be hollow at its centre to allow different volumes, i.e., variable depths, of capsule to be inserted in. The capsule holder can also have a closed or a partially closed bottom. In this case, the depth of the capsule holder is at least equal to the depth of the larger (i.e., deeper) capsule in the set, e.g., capsule 1B.

The extraction of the beverage out of the capsules 1A or 1B is obtained by driving the interface assembly 213 and capsule holder 214 together with the capsule, in rotation (R) along axis I, at relatively high speed, e.g., between 500 and 15000 rpm. The rotation is driven by a rotational motor (not shown). Liquid is forced to traverse the ingredient and leave the capsule at the upper periphery of the capsule, i.e., by outlet perforations provided in the upper wall by perforators 221. Since many perforators are placed evenly at the periphery of the upper wall, liquid can also exit by making a laminar flow of beverage dispersed radially along the whole periphery of the upper wall. The centrifuged liquid is projected between the rim of the capsule and the upper surface of the interface assembly 213 against the collector 215. The liquid beverage is then collected and dispensed through the duct 216.

Figure 56:
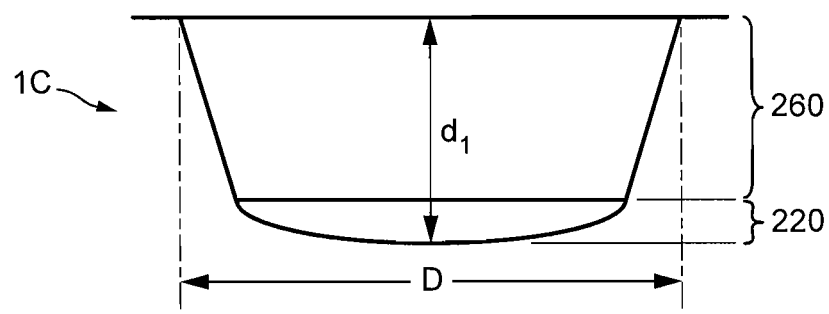
FIG. 56 is a small capsule with a convex bottom portion.
Figure 57:
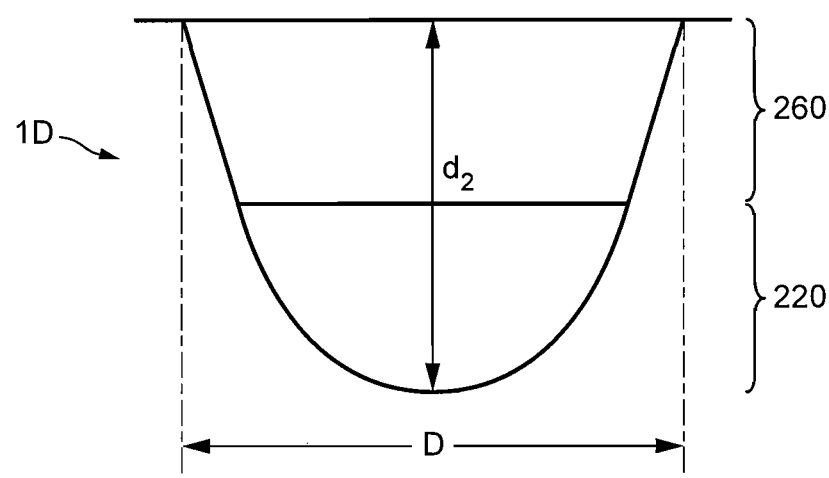
FIG. 57 is a larger capsule with a convex bottom portion.

FIGS. 56 and 57 show a second embodiment for another set of capsules in which the capsules 1C, 1D comprise an upper portion 260 and a lower portion 220 of body forming an extension for varying the depth d1, d2 of the capsule. The upper portion 260 forms a truncated portion comprising the same insertion diameter D necessary for referencing the capsule in the capsule holder and a constant angle. The lower portion can have a shape different from a truncated shape and can be, as shown, a convex portion. In the larger volume capsule 1D, the depth d2 of the capsule is increased by a longer (i.e., deeper) lower portion 220. In the smaller volume capsule 1C, the depth d1 of the capsule is reduced by a shorter lower portion 220.

Figure 58:
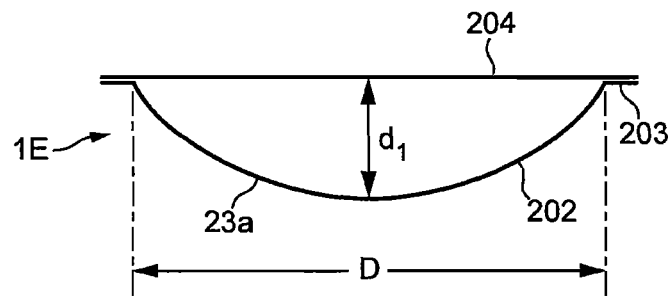
FIG. 58 is a small-volume capsule of convex body.
Figure 59:
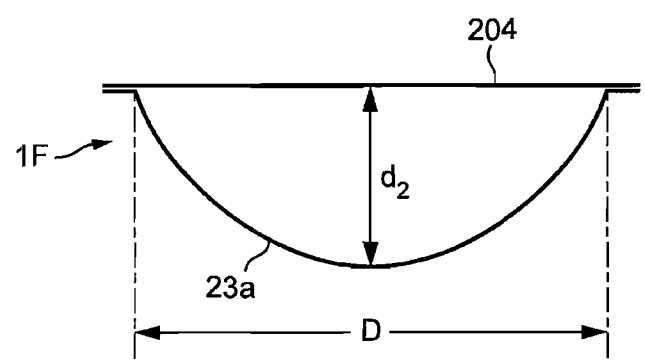
FIG. 59 is a medium-volume capsule of convex body.
Figure 60:
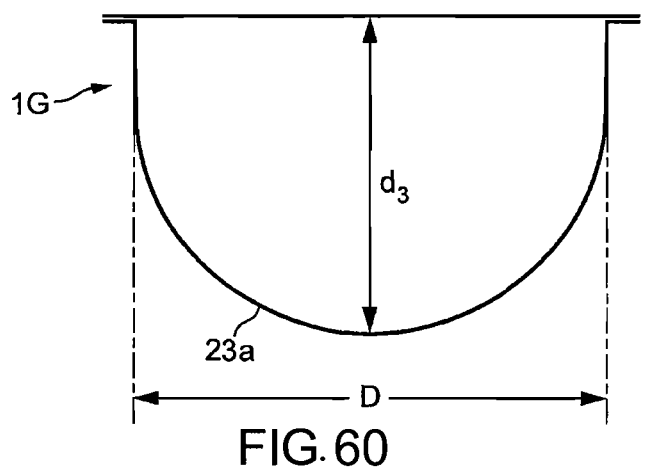
FIG. 60 is a large-volume capsule of convex body.

FIGS. 58, 59 and 60 show a third embodiment for another set of capsules according to the invention in which the body has a single convex portion 23a, 23b, 23c of variable depth, respectively, d1, d2, d3. The portion can be continuously convex for certain capsules of the set (e.g., capsules 1E, 1F) with no zone of truncated or cylindrical portion. The larger capsule 1G may comprise an upper portion of truncated or cylindrical portion.

Figure 61:
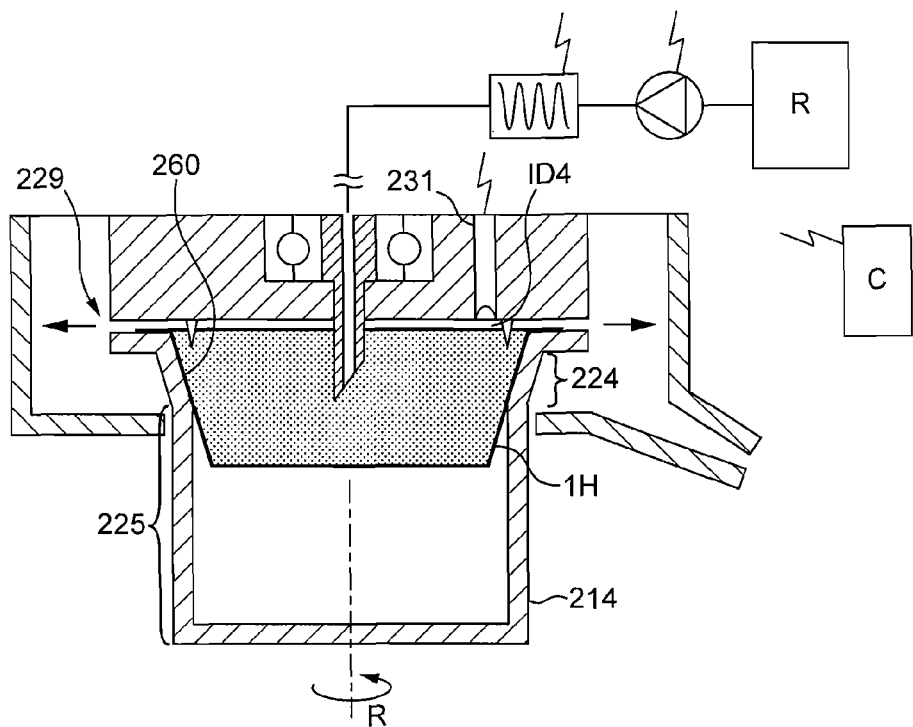
FIG. 61 represents a centrifugal brewing device into which is inserted a capsule of small volume.
Figure 62:
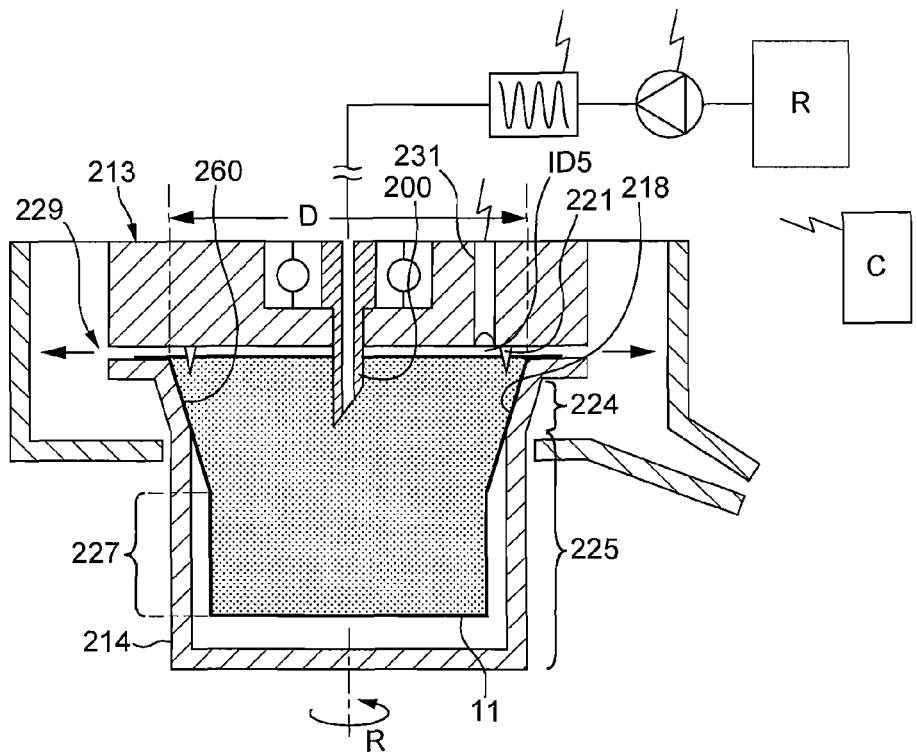
FIG. 62 represents a centrifugal brewing device into which is inserted a capsule of larger volume.

In the embodiment of FIGS. 61 and 62, the capsule holder 214 of the brewing device comprises a first portion 224 forming the support surface 218 for the upper portion 260 of the capsules and a lower portion 225 forming a closing surface below the capsule of sufficient length to accommodate both the smaller capsule 1H (FIG. 61) and the larger capsule 1I (FIG. 62).

In this embodiment, the smaller and larger capsules 1H, 1I may comprise an upper portion 260, e.g., of same angle. The length of the upper portion 260 may be the same or may also slightly vary provided that it is sufficient to match the surface 218 of the capsule holder. The larger capsule 1I may comprise a lower portion 227 forming the extension portion which may be shaped with a different angle, e.g., a trunk of cone or a cylinder of smaller diameter than the insertion diameter "D" (FIG. 62).

Of course the number of capsules of variable depth is not limited in the set in all the described embodiments.

Of course, in all the embodiments, the truncated portion can be replaced by a succession of stepped portions or another equivalent arbitrary/ornamental shape forming a reduction of diameter in direction of the bottom of the capsule which is equivalent to a continuous truncated surface.

Figure 63:
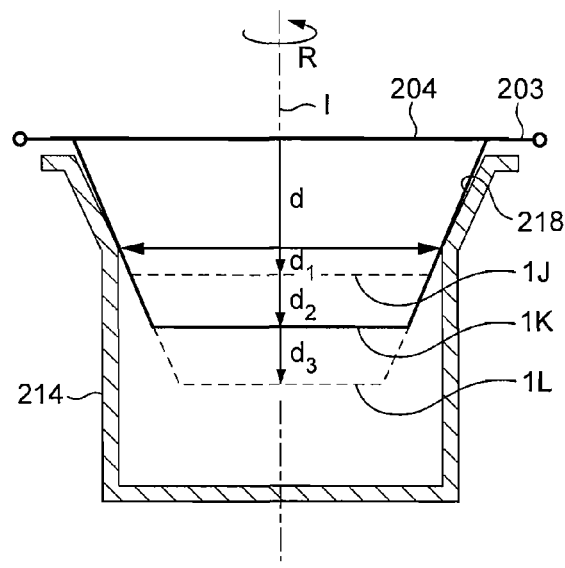
FIG. 63 represents a general representation of manner the capsules of different volumes fit into the same capsule holder.
Figure 64:
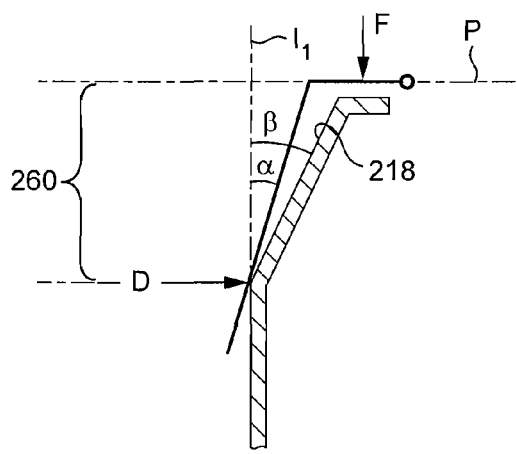
FIG. 64 shows a detail of FIG. 63 before closure of the device.
Figure 65:
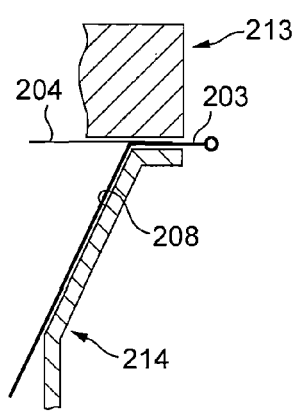
FIG. 65 shows a detail of FIG. 63 after closure of the device.

In the embodiment of FIGS. 63 and 64, contrary to the previous embodiment, the capsules of the set are referenceable in the capsule holder with an insertion diameter D which is positioned at a distance below the rim of the capsule on the upper portion of the body sidewall. The insertion diameter D is constant to all capsules in the set. Capsules of different volumes 1J, 1K and 1L are illustrated in position in the capsule holder before closure of the brewing unit (Smaller capsule 1J and deeper capsule 1L are represented in dotted lines only and medium-volume capsule 1K is represented in solid lines). As it can be noticed, all the capsules are maintained at their insertion diameter D along a constant referencing position. More particularly, all the capsules of the set have their upper rim 203 coming along a common referencing plane P. On the contrary, the introduction depth (d1, d2, d3) of the body varies in the capsule holder 214 to adapt the volume accordingly.

In this mode, it is advantageous to design the upper portion such that its inclination angle $\alpha$ is slightly lower than the angle $\beta$ of the support surface 218. The angle is measured relative to the axis of rotation I of the capsule or a parallel axis $I_1$ to this axis as illustrated in FIG. 64. As a result, all capsules of the set are self-blocking in the capsule holder when introduced. Therefore, when the capsule is pressed by the interface assembly 213 during closure of the brewing unit at the rim 203, the body slightly deforms to take its final rotational configuration whereas all the plays are properly compensated. The angle α is preferably 1 to 5 degrees lower than the angle β of the support portion of the capsule holder.

The capsules in the set according to the invention contain roast and ground coffee having preferably different roasting and/or grinding characteristics in the set.

The coffee beans are generally roasted to form roasted coffee beans and then ground to produce roast and ground coffee powder that is filled in the capsules. Any suitable process comprising roasting can be used. Suitable roasting techniques can include, but are not limited to, oven roasting, extrusion roasting, steam roasting (e.g., with no post roasting), infrared roasting, microwave roasting, di-electric/induction heating roasting, and combinations thereof.

The coffee beans can be roasted to any desired roast colour. The roasted coffee beans can then be ground using any coffee grinder (e.g., Probat or Matsubo grinders). Depending upon the specific particle size distribution desired in the final product of the present invention, the coffee fractions can be ground to the particle volume distributions or "grind volumes". For determining the granulometry of coffee, the particle size distribution ($D_{4,3}$) and fines level are typically determined by laser diffraction using a "Mastersizer S" instrument from Malvern®.

The system of the invention advantageously comprises an identification means ID1, ID2, ID3 (FIGS. 54 and 55) or ID4, ID5 (FIGS. 61 and 62) associable to each capsule to ensure control of the brewing parameters, in particular, the flow rate and the volume of injected liquid in the capsule, as a function of the volume of the capsule and/or the product characteristics of the capsule (granulometry, roasting, etc.) and/or the beverage to be delivered (ristretto, espresso, lungo, etc.). The system of the invention is capable of delivering different flow rates which are influenced by two key parameters: the rotational speed of the capsule in the device and the back-pressure exerted on the centrifuged liquid. For a given back-pressure, the higher the rotational speed, the larger the flow. Conversely, for a given rotational speed, the larger the back-pressure, the smaller the flow. The back-pressure can be varied by varying the closing force of a flow restriction valve placed downstream of the enclosure of the capsule and/or by varying the cross-section of the restriction outlets, such as described in co-pending patent application WO 2009/106175.

As known per se, the control of the rotational speed is carried out by the control means selectively activating the rotational motor (not shown) which drives part of the interface assembly 213, the capsule holder 214 and the capsule together in rotation. The control of the volume of liquid injected in the capsule is carried out by the control means selectively activating the pump 211 to meter the proper volume of liquid.

In particular, the identification means can set different volumes of injected liquid for delivering different beverage volumes and/or set the rotational speed of the device. In particular, for the larger capsules in the set, the identification means can set larger liquid volumes than for smaller capsules. Also, the identification means can also set different rotational speeds for smaller capsules than for larger capsules in order to provide different residence time of liquid in the capsule or provide different flow characteristics in the set of capsules. Finally, the identification means may also set different back-pressure values in the capsule or at the outlet 229 where the flow restriction is positioned. Preferably, the volume of injected liquid, the rotational speed and the back-pressure in the capsule are adjustable/adjusted by the control means (C) as a function of the volume. In addition, the temperature of the injected liquid can be varied as a function of the volume of the capsule, by the control means selectively activating the liquid heater 210. For instance, the temperature of the liquid can be heated at a higher temperature for compensating the temperature losses of the liquid in larger volumes.

As illustrated in FIGS. 54 and 55, the identification means can be formed as selection means ID1, ID2, ID3 of a user interface 230. The selection means can be physical switches or any other sort of selectors such as a multi-choice interface of a touch screen. Each selector corresponds to a certain type of beverage to be delivered, e.g., a particular coffee type such as ristretto, espresso, lungo, etc., a particular volume of beverage (e.g., 25, 40, 80, 110, 250 mL, etc.) and/or a particular selection of aroma strength and/or level of foam/crema. The user interface being connected to the control means C, the brewing parameters are adjusted according to the selection made by the user of the selection means for operating the centrifugal brewing device.

In an alternative illustrated in FIGS. 61 and 62, the identification means are directly associated to the different capsules. In this case, the identification means ID4, ID5 are capsule recognition means attached to or embedded in the capsules. The recognition means can be any mechanical, optical, magnetic or radio-frequency recognition means capable of delivering information to the brewing device, via a sensing device 231, as to which type of capsule is inserted in the device. For example, the recognition means is a barcode, a colour code, a RFID tag, a magnetically sensitive element, or a mechanical key or shape.

The main benefit of controlling the adjustment of these different parameters is essentially linked to the possibility to provide a wide variety of beverages, in particular coffees, of different volumes (e.g., ristretto, espresso, lungo, americano, etc.), aroma strength and foam/crema volume. The possibilities offered by the invention exceed the traditional brewing methods where these parameters cannot be adjusted all together properly.

The system and method of the invention also provide remarkable brewing results with solid contents which are higher than usual methods and devices. The results are very reproducible from capsule to capsule. Surprisingly, crema is also remarkably improved with a creamier, more stable and thicker texture.

Of course, the invention may encompass many variants which are included in the scope of the patent claims that follow.

EXAMPLE

The preceding disclosure is exemplified by the following preferred embodiment.

A capsule according to the embodiment of FIGS. 26 to 31 was filled with 6.5 grams of ground coffee. The coffee was ground at an average particle size ($D_{4,3}$) of 260 microns. A prewetting of the capsule was carried out for a few seconds. During centrifugation at about 8000 rpm, the flow rate was controlled at about 2 grams per second. A volume of 40 grams of coffee extract was delivered in an espresso cup. The liquid extract had a total solids (TC) of about 4%, a yield of about 25%. The layer of crema at the top was of about 5-6 mm. The foam looked very dense with very fine bubbles and was very stable over time.

What is claimed is:

1. A method for preparing a liquid food from a capsule containing one or more extractable or infusible ingredients, which comprises piercing the capsule with at least one needle, injecting a liquid into the capsule, and passing the liquid through the ingredient(s) in the capsule while applying centrifugal forces to the capsule to urge the liquid to pass through the ingredient(s) in a radial or centrifugal flow path to prepare the liquid food, wherein the centrifugal forces are applied to the capsule in a device comprising:
        means for receiving the capsule;
        means for introducing the liquid into the capsule; and
        means for centrifugally rotating the capsule about an axis of rotation;
    wherein the capsule receiving means positions and references the capsule in a removable manner in the device and in an operational relationship with the liquid introducing means with the central axis of the capsule in alignment with the axis of rotation of the centrifugal rotating means such that upon introduction of the liquid, the centrifugal rotation of the capsule urges the liquid to flow through the ingredients in a radial or centrifugal flow path to prepare the liquid food;
    wherein the liquid introducing means comprises at least one needle arranged for introduction through the capsule along its central axis and for injection of liquid into the capsule at or near its central axis; and
    wherein the capsule receiving means comprises a capsule holder associated with the centrifugal rotating means for allowing the capsule to be rotated around its central axis at a centrifugal speed of at least 500 rpm.

2. The method of claim 1, wherein the capsule is centrifugally rotated at a centrifugal speed of at least 500 rpm, and the liquid is introduced into the capsule at or near its central axis at substantially no pressure, and which further comprises providing an outlet in the capsule at a peripheral location of the capsule at least after the liquid food is prepared to enable the liquid food to leave the capsule.

3. The method of claim 1 which further comprises restricting flow of the liquid food to provide a pressure drop of at least 0.5 bar of relative pressure during the centrifugal rotation of the capsule to enable the liquid to have a higher residence time in contact with the extractable or infusible ingredient(s) in the capsule prior to collecting the centrifuged liquid food from the capsule.

4. The method of claim 1, wherein the capsule is sealed in a gas tight manner before preparation and the extractable or infusible ingredient(s) comprises ground coffee powder, soluble coffee, tea, chocolate, whitener, flavours or combinations thereof, with the extractable or infusible ingredient(s) present in an amount for forming one or two servings of the liquid food, and with the capsule being rotated at an axis of rotation that is vertical or inclined relative to vertical at an angle that is less than 90 degrees.

5. The method of claim 1, wherein predetermined parameters for preparing the liquid food are adjusted as a function of volume of the extractable or infusible ingredient(s) contained in the capsule; including at least one of liquid flow rate, speed of rotational, volume of liquid introduced into the capsule, temperature of injected liquid and combinations thereof

6. The method of claim 5, wherein the capsule comprises identification means for adjusting the liquid food preparation parameters.

7. The method of claim 1, wherein the volume of the capsule differs as a function of the volume or type of liquid food to be prepared.

8. The method of claim 7, wherein the volume or type of liquid food represents at least two, preferably three or more different coffee beverages.

9. The method of claim 1, which further comprises configuring the capsule to include an enclosure containing the extractable or infusible ingredients which enclosure is configured and dimensioned to have a perimeter that is radially symmetrical about a central axis to facilitate rotation of the capsule, wherein liquid can be introduced into the capsule to form the liquid food; and opening means or an opening arrangement to facilitate allowing liquid food to leave the capsule after passing through the ingredient(s), wherein the opening means or arrangement is configured and positioned near or upon the perimeter of the enclosure to allow the liquid food to leave the capsule radially due to the application of the centrifugal forces.

10. The method of claim 9, wherein the capsule enclosure includes a top, bottom and side wall, and the opening means or arrangement comprises one or more outlet openings located in the top or the side wall near or upon the perimeter of the enclosure, with the opening(s) either being (a) initially present in the enclosure along with a gas-tight covering or (b) formed by centrifugal forces during preparation of the liquid food after injection of the liquid into the capsule by movement of the liquid food to exert a flexure on at least one deflectable portion of the capsule, with the deflectable portion including an elastic lip acting in closure on the side wall of the capsule or inserted in a peripheral cavity of the enclosure.

11. The method of claim 9, wherein the capsule enclosure has a flared design with a widening side wall located between top and bottom walls, and an outer surface or structure for engaging external rotational driving means of a centrifugal device with the outer surface or structure configured to offer resistance to torque during rotation of the capsule or for frictionally engaging or receiving a complementary surface or structure of the driving means to enable the driving means to rotate the capsule, and the opening means or arrangement comprises a series of spaced radial outlets positioned or created at or close to the largest perimeter of the flared design of the enclosure.

12. The method of claim 9, wherein the capsule enclosure has a flared design with a widening side wall located between top and bottom walls and with the capsule further comprising a collecting cavity for receiving the prepared liquid food with the cavity positioned adjacent to the largest perimeter of the flared design of the enclosure, and a filter part separating the extractable or infusible ingredient(s) and the collecting cavity food.

13. The method of claim 9, which further comprises providing the capsule with an injection tubular portion having a water inlet on a top surface of the capsule and a water outlet communicating internally in the capsule, wherein the water outlet is close to or in contact with the bottom of the capsule.

14. The method of claim 9, which further comprises providing the extractable or infusible ingredient(s) in the form of particles: providing the opening means or arrangement with or as a porous material or a series of slits, slots or holes distributed substantially evenly around the enclosure, with the porous material, slits, slots or holes having open dimensions that are smaller than the particles of the extractable or infusible ingredient(s): and providing the capsule with a sealing membrane or foil covering the opening means or arrangement to make the capsule gas-tight before use with the sealing membrane or foil being peelable or puncturable by a piercing member for injecting liquid into the capsule.

15. The method of claim 9, wherein the enclosure is further provided with at least one peripheral recess that forms a collector for liquid food passing through the opening means or arrangement, wherein the collecting recess extends around the perimeter of the enclosure at its greatest circumference.

16. The method of claim 9, wherein the opening means or arrangement is provided with flow restriction means comprising outlet openings of less than 200 microns for providing a pressure drop of at least 0.5 bar of relative pressure during the centrifugal rotation of the capsule to enable the liquid to have a higher residence time in contact with the extractable or infusible ingredient(s) in the capsule.

17. The method of claim 9, which further comprises thermoforming the enclosure of a food grade plastic; wherein the enclosure is provided with a top wall or lid that includes at least one inlet port defining a passage for receiving a liquid that is to be introduced into the capsule, with the inlet port aligned with the central axis of the capsule, wherein the liquid to be injected into the capsule is water and wherein the extractable or infusible ingredient(s) is ground coffee, soluble coffee, a dairy based powder, a dairy or non-dairy creamer, cocoa, a sweetener, leaf tea, herbal tea, a culinary powder, a soluble or dispersible nutritional composition, a liquid food concentrate or any combination thereof.

18. The method of claim 1, wherein the device further comprises a control unit adapted to vary the speed of the centrifugal rotation means for rotating the capsule at least two different centrifugal speeds to provide different centrifugal pressures of water in the capsule, wherein the liquid introducing means is operatively associated with a pump and injection tube connected to a reservoir for injection of the liquid into the capsule under the effect of rotational momentum, and the centrifugal rotating means comprises an electrical motor and drive shaft operatively associated with the capsule holder for rotating the capsule holder about the axis of rotation.

19. The method of claim 1, wherein the device further comprises a collector for collecting the liquid food, the collector including a by-pass conduit arranged to add water into the collector without passing into the capsule.

20. The method of claim 1, wherein the device further comprises flow restriction means arranged in the flow path of the liquid food for providing a pressure drop of at least 0.5 bar of relative pressure during the centrifugal rotation of the capsule to enable the liquid to have a higher residence time in contact with the extractable or infusible ingredient(s) in the capsule.

21. The method of claim 20, wherein the flow restriction means comprises a valve which is arranged in the flow path adjacent an outlet of the capsule, wherein the valve makes, opens or enlarges a passage in response to increasing pressure of centrifuged liquid so that the liquid food can exit the capsule and the device through the passage.

22. The method of claim 1, wherein the capsule receiving means comprises a capsule holder having an interior surface or structure for engaging the capsule with the interior surface or structure configured to offer resistance to torque during rotation or for frictionally engaging or receiving a complementary surface or structure of the capsule to enable the driving means to rotate the capsule.

23. The method of claim 1, wherein the device further comprises identification means for identifying different capsules, and control means capable of operating the device in centrifugation for different capsules according to predetermined liquid food preparation parameters including the flow rate and the volume of liquid to be injected into the capsule, with the identification means comprising capsule recognition means which are recognized by sensing means connected to the control means of the device to control the preparation parameters accordingly.

24. A method for preparing a liquid food from a capsule containing one or more extractable or infusible ingredients, which comprises passing a liquid through the ingredient(s) in the capsule while applying centrifugal forces to the capsule to rotate the capsule about a central axis of rotation to urge the liquid to pass through the ingredient(s) in a radial or centrifugal flow path to prepare the liquid food, and piercing the capsule to allow the liquid food to exit the capsule, wherein the capsule is pierced by piercing means radially positioned with respect to the axis of rotation of the capsule and the piercing means comprises a series of needles positioned in a circular pattern and arranged in relation to the capsule to pierce radial holes in the capsule.

\* \* \* \* \*

UNITED STATES PATENT AND TRADEMARK OFFICE
CERTIFICATE OF CORRECTION

PATENT NO. : 8,431,175 B2
APPLICATION NO. : 12/776155
DATED : April 30, 2013
INVENTOR(S) : Yoakim et al.

It is certified that error appears in the above-identified patent and that said Letters Patent is hereby corrected as shown below:

Title Page:

Item (63) Related U.S. Application Data, please make the following changes:

after "12/602,542, filed on Dec. 1, 2009," insert -- which is a 371 of PCT/EP2008/054401, filed on Apr. 11, 2008, --;
after "12/602,553, filed on Dec. 1, 2009," insert -- which is a 371 of PCT/EP2008/056412, filed on May 26, 2008, --;
after "12/602,562, filed on Dec. 1, 2009," insert -- which is a 371 of PCT/EP2008/056310, filed on May 22, 2008, --;
after "8,409,646," insert -- which is a 371 of PCT/EP2008/056345, filed on May 23, 2008, --;
after "12/602,577, filed on Dec. 1, 2009," insert -- which is a 371 of PCT/EP2008/056968, filed on Jun. 5, 2008, --; and
after "12/602,730, filed on Dec. 2, 2009", insert -- which is a 371 of PCT/EP2008/054810, filed on Apr. 21, 2008 --.

The Related U.S. Application Data will correctly appear as follows:

(63) Continuation-in-part of application No. 12/602,542, filed on Dec. 1, 2009, which is a 371 of PCT/EP2008/054401, filed on Apr. 11, 2008, and a continuation-in-part of application No. 12/602,553, filed on Dec. 1, 2009, which is a 371 of PCT/EP2008/056412, filed on May 26, 2008, and a continuation-in-part 12/602,562, filed on Dec. 1, 2009, which is a 371 of PCT/EP2008/056310, filed on May 22, 2008, and a continuation-in-part of application No. 12/602,568, filed on Dec. 1, 2009, now Pat. No. 8,409,646, which is a 371 of PCT/EP2008/056345, filed on May 23, 2008, and a continuation-in-part of application No. 12/602,577, filed on Dec. 1, 2009, which is a 371 of PCT/EP2008/056968, filed on Jun. 5, 2008, and a continuation-in-part of application No. 12/602,730, filed on Dec. 2, 2009, which is a 371 of PCT/EP2008/054810, filed on Apr. 21, 2008.

Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 8,431,175 B2

Title Page (continued):

Item (56) References Cited, OTHER PUBLICATIONS, change "JP 200618226 A" to -- JP 2006-518226 A --.